United States Patent [19]

Barbari

[11] Patent Number: 5,532,838

[45] Date of Patent: Jul. 2, 1996

[54] METHOD & APPARATUS FOR DYNAMICALLY CREATING AND TRANSMITTING DOCUMENTS VIA FACSIMILE EQUIPMENT

[76] Inventor: Edward P. Barbari, 2941 Belmont Woods Way, Belmont, Calif. 94002

[21] Appl. No.: 422,630

[22] Filed: Apr. 14, 1995

Related U.S. Application Data

[63] Continuation of Ser. No. 175,212, Dec. 27, 1993.

[51] Int. Cl.$^6$ ..................................................... H04N 1/00
[52] U.S. Cl. ........................... 358/400; 358/403; 358/442; 358/444
[58] Field of Search ..................... 358/400, 403, 358/407, 442, 434, 440, 444, 402, 468, 404; 340/995, 990, 998; 364/449, 443, 444, 436

[56] References Cited

U.S. PATENT DOCUMENTS

| 4,360,875 | 11/1982 | Behnke | 364/436 |
|---|---|---|---|
| 4,546,439 | 10/1985 | Esparza | 364/444 |
| 4,907,274 | 3/1990 | Nomura et al. | 379/100 |
| 5,197,009 | 3/1993 | Hoffman, Jr. et al. | 364/443 |
| 5,229,947 | 7/1993 | Ross et al. | 364/443 |
| 5,282,052 | 1/1994 | Johnson et al. | 358/407 |
| 5,317,628 | 5/1994 | Misholi et al. | 358/403 |
| 5,321,520 | 6/1994 | Inga et al. | 358/403 |

OTHER PUBLICATIONS

Milwaukee, "Software Helps city Plan Trash Pickup", Government Computer News, V6, N18, p60(1), Sep. 11, 1987.
Map Info Corp., "W Marks the Spot–Map Info 2.0 for Windows", Data Based Advisor, V10, N12, p22(3), Dec., 1992.
A Status Report, "Front–Line Uses of GIS in Public and Private Sector Real Estate Today", Property Tax Journal, V12, N1, pp. 77–85, Mar. 1993.
Horizons Technology, "Horizons Releases SureMaps Version 2.0", Computer Reseller News, P. 172, Aug. 30, 1993.
MapInfo, "New MapInfo (TM) 4.0: Desktop Mapping on a Network", News Release, May 10, 1990.

*Primary Examiner*—Edward Coles, Sr.
*Assistant Examiner*—Fan Lee
*Attorney, Agent, or Firm*—Feix & Feix

[57] ABSTRACT

Computerized system for dynamically creating a document from a database responsive to telephonic input from a remote user, and transmitting the document to the user's facsimile machine. When a user desires to access a remote database according to the present invention, that user calls the apparatus of the present invention and in response to a voice menu system creates queries to the database. After receipt of the user's request, the system processes the request into a dynamically created document which meets the user's specifications and automatically transmits the document to the user's facsimile machine. A real estate sales support system constructed according to the principles of the present invention presents the user with a document comprising a listing of properties best meeting the user's needs and series of maps of varying scale enabling the user to locate the properties for inspection. Supporting the real estate sales support embodiment of the present invention is a methodology for geocoding listed properties with their respective latitudes and longitudes.

11 Claims, 40 Drawing Sheets

FIG. 16

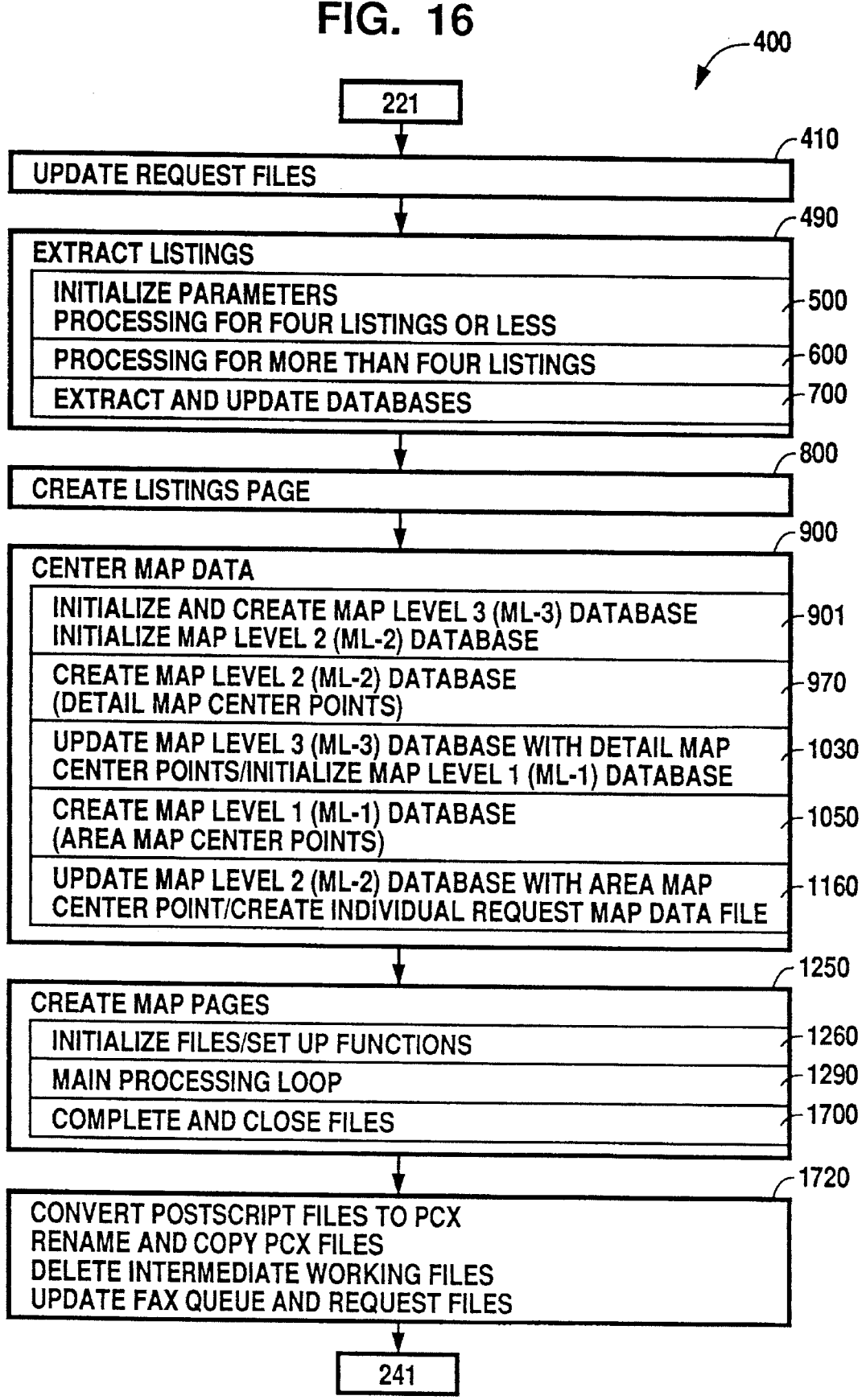

- 221
- 410 UPDATE REQUEST FILES
- 490 EXTRACT LISTINGS
  - 500 INITIALIZE PARAMETERS / PROCESSING FOR FOUR LISTINGS OR LESS
  - 600 PROCESSING FOR MORE THAN FOUR LISTINGS
  - 700 EXTRACT AND UPDATE DATABASES
- 800 CREATE LISTINGS PAGE
- 900 CENTER MAP DATA
  - 901 INITIALIZE AND CREATE MAP LEVEL 3 (ML-3) DATABASE / INITIALIZE MAP LEVEL 2 (ML-2) DATABASE
  - 970 CREATE MAP LEVEL 2 (ML-2) DATABASE (DETAIL MAP CENTER POINTS)
  - 1030 UPDATE MAP LEVEL 3 (ML-3) DATABASE WITH DETAIL MAP CENTER POINTS/INITIALIZE MAP LEVEL 1 (ML-1) DATABASE
  - 1050 CREATE MAP LEVEL 1 (ML-1) DATABASE (AREA MAP CENTER POINTS)
  - 1160 UPDATE MAP LEVEL 2 (ML-2) DATABASE WITH AREA MAP CENTER POINT/CREATE INDIVIDUAL REQUEST MAP DATA FILE
- 1250 CREATE MAP PAGES
  - 1260 INITIALIZE FILES/SET UP FUNCTIONS
  - 1290 MAIN PROCESSING LOOP
  - 1700 COMPLETE AND CLOSE FILES
- 1720 CONVERT POSTSCRIPT FILES TO PCX / RENAME AND COPY PCX FILES / DELETE INTERMEDIATE WORKING FILES / UPDATE FAX QUEUE AND REQUEST FILES
- 241

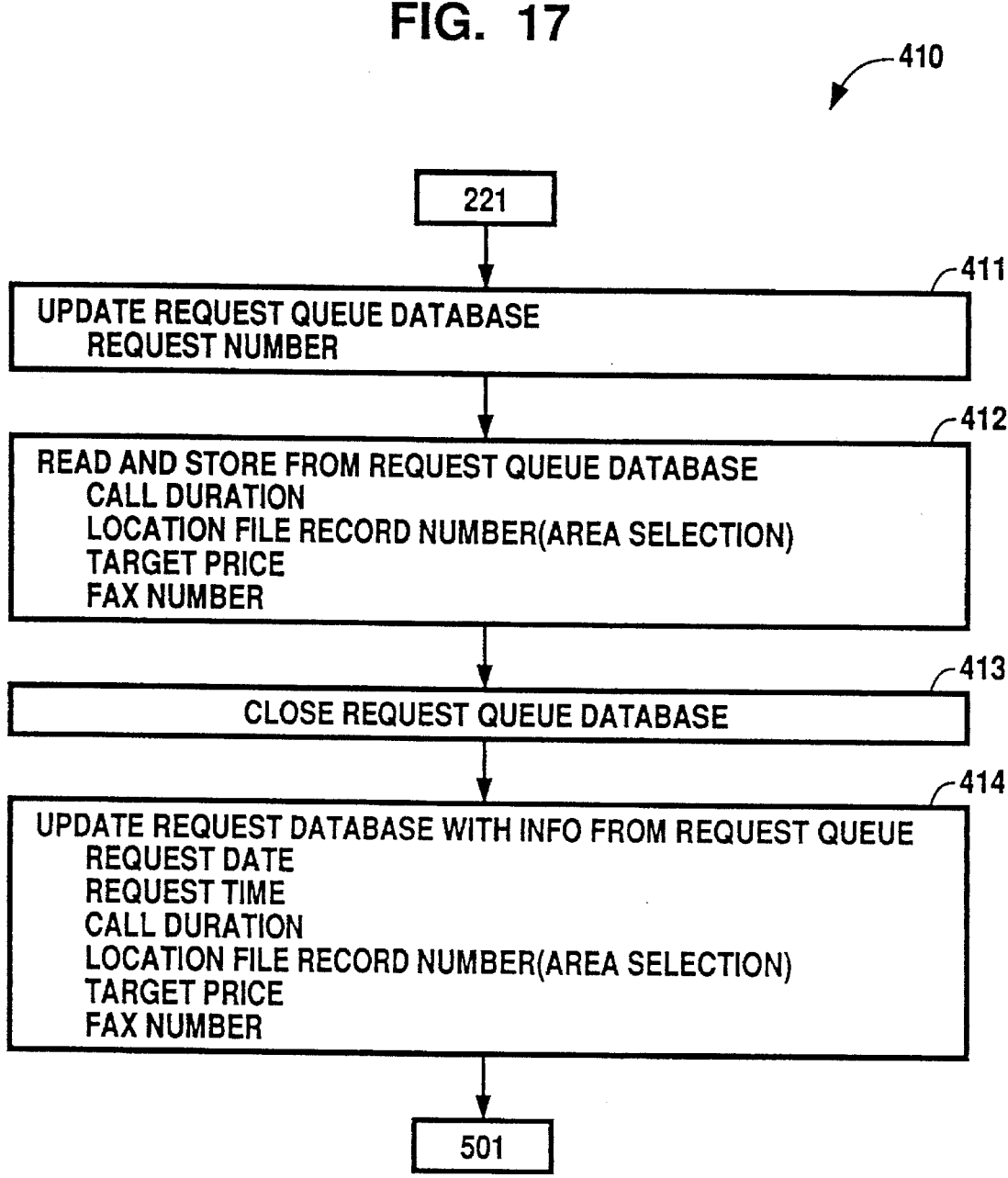

FIG. 33

*Open Home Faxets*™
Copyright © 1993 Brendan Alexander Barbari Enterprises.
All rights reserved. Patent pending.

This Request Is Based On The Following:

Area/Neighborhood: ALAMO SQUARE
Target Price: $450,000 ± 5.00%

Properties Best Meeting The Above Criteria:

| Property Location | Price | BR | Date and Time Open |
|---|---|---|---|
| ❶ 2169 Green<br>McGuire Real Estate<br>415-921-5555 | $429,000 | 1 | Sun(2-4) |
| ❷ 288-900 Parker<br>Pacific Union<br>415-929-7100 | $429,000 | 2 | Sun(2-4) |
| ❸ 345 Locust Street, #1<br>TRI<br>415-474-1845 x245 | $429,000 | 2 | Sun(2-4) |
| ❹ 321-323 Parnassus<br>Friia & Co.<br>415-931-4500 x106 | $439,000 | | Sun(2-4) |
| ❺ 684A Sanchez<br>Hartford<br>415-863-7502 | $439,000 | | Sun(2-4) |
| ❻ 875 Castro<br>BJ Droubi<br>415-550-1300 | $439,500 | 4 | Sun(2-4) |
| ❼ 10 Golden Court<br>Zephyr<br>415-552-9500 | $449,000 | | Sun(2-4) |
| ❽ 2904 Bush<br>McGuire Real Estate<br>415-929-1500 | $449,000 | 3 | Sun(2-4) |
| ❾ 277 Douglass<br>Jon Douglas Co. Real Estate<br>415-771-8500 | $449,000 | 2 | Sun(2-4) |
| ❿ 1 Loma Vista Terrace<br>TRI<br>415-474-1845 x213 | $450,000 | 3 | Sun(2-4) |
| ⓫ 2016 Pacific Avenue, #407<br>Madison Co.<br>415-459-1550 | $459,000 | 2 | Sun(1-4) |
| ⓬ 2123 Jackson<br>707-876-3513 | $469,000 | 2 | Sun(1:30-4:30) |

LIMIT FOR LOCATION UPDATE (LOC_UPDATE IN GCUTIL.PRG)

| [(AREA_SIZE * 2) - (BUFFER * 2)] / 2 * .014482935 DEGREES/MILE |
|---|

EXAMPLE: ( 2.5 * 2 ) - ( 0.4 * 2 )

( 5.0 MILES ) - ( 0.8 MILES )       HEIGHT OR WIDTH
                                    INSIDE OF BUFFER ( 4.2 MILES ) / 2                   OUTER LIMIT FROM
                                    CENTER POINT ( 2.1 MILES ) * .014482935          CONVERT TO DEGREES

FIG. 40

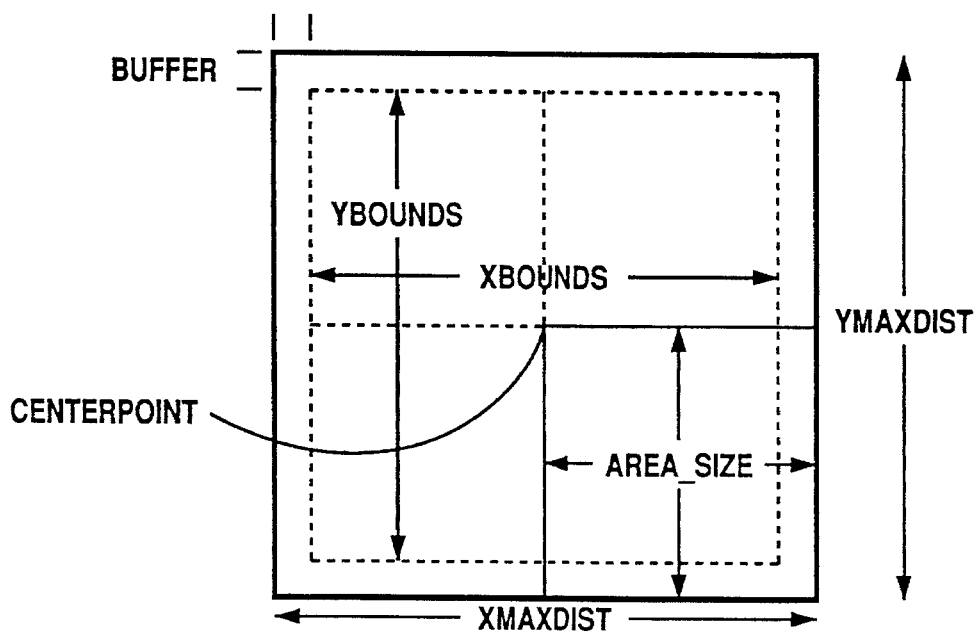

XMAXDIST AND YMAXDIST FOR LISTINGS TO DETAIL MAPS (IN XYCEN.PRG)

| (AREA_SIZE * 2) * .014482935 DEGREES/MILE |
|---|

( 0.4 * 2)
( 0.8 MILES )    * .014482935 = .0115863 DEGREES

XBOUNDS AND YBOUNDS FOR LISTINGS TO DETAIL MAPS (IN XYCEN.PRG)

| MAXDIST - (BUFFER * 2) |
|---|

.0115863 - (.001 * 2)    BUFFER IN DEGREES = .069046778 MILES
.0115863 -   .002                                         OR 364.567 FEET
.0095863                    BOUNDS IN DEGREES = .661903126 MILES

XMAXDIST AND YMAXDIST FOR DETAIL MAPS TO AREA MAP (IN XYCEN.PRG)

| (AREA_SIZE * 2) * .014482935 DEGREES/MILE |
|---|

EXAMPLE:  ( 2.5 * 2)
          ( 5.0 MILES )    * .014482935        CONVERT TO DEGREES

XBOUNDS AND YBOUNDS FOR DETAIL MAPS TO AREA MAPS (IN XYCEN.PRG)

| MAXDIST - (BUFFER * 2) |
|---|

EXAMPLE:  MAXDIST - (0.4 MILES * .014482935 DEGREES/MILE)   CONVERT BUFFER
          MAXDIST - (.00579317 * 2)                          TO DEGREES
          MAXDIST -   0.0115863 ered, and a map produced for that location. A system
METHOD & APPARATUS FOR DYNAMICALLY CREATING AND TRANSMITTING DOCUMENTS VIA FACSIMILE EQUIPMENT This is a continuation of copending application(s) Ser. No. 08/175,212 filed on Dec. 27, 1993.

TECHNICAL FIELD

The present invention relates to the automated dynamic creation of documents, including maps, from a database, responsive to a user's request transmitted by DTMF telephone, and the subsequent transmission of those documents to a destination facsimile machine by facsimile transmission equipment. Specifically, the present invention provides method and apparatus for dynamically creating and transmitting, via automated facsimile equipment, a list of real estate properties and real estate locator maps for those properties to a remote user's facsimile machine, responsive to the user's telephonic request, including area and price preferences.

BACKGROUND ART

Database management systems, implemented on general purpose programmable digital computing equipment, for the logical storage, retrieval and processing of related data types, are well known in the prior art. In general, users of these systems who wish to retrieve data stored therein require not only access to computers, but the necessary technical expertise with the database systems implemented thereon to effect the data retrieval. One application area for database technology is the field of sales support.

Database management systems configured to support sales efforts (hereinafter, sales support systems) enable a user to access information regarding the items being sold. This information could include information regarding the items being sold, inventory, cost, availability, deliverability, and in the case of real estate, location of the property for sale. A sales support system organizes the individual data elements by fields as records in a database. The user specifies his or her needs and the system retrieves data from the database, preparing a sorted list according to the user's specifications. Where a sales support system has been configured to provide sales support for real estate brokers, those user specifications could include locality or area, price, number of bedrooms and so forth. By utilizing such a system, brokers save considerable amount of time in matching listed properties with a buyer's needs.

One useful adjunct of sales support systems for real estate sales support is the provision of maps to the seller's location. A map can be a valuable sales tool and is particularly useful to sellers of real estate in that it makes locating properties easier. Providing one map reference for one property is not a particularly difficult or time consuming task. When a broker or other wishes to prepare a list of several properties for consideration however, looking up map references for ten or more such properties, and then making photocopies of each, is less trivial. To this end, automated map generation has been the subject of efforts by several workers.

Typically, automated map systems will provide a map taken from a database of maps for a given location. To match the requested location with the correct map, or portion of a map, some kind of geocoding system is used, most often based on latitude and longitude. Again, users of automated map generation systems require knowledge of the system, a computer and, if printed output is desired, a connected printer. To produce a map for a given location, the location's latitude and longitude (or other geocoding input) are entered, and a map produced for that location. A system which would input a list of locations and extract from the map system a map or series of maps for these locations would provide real estate sellers with a powerful sales tool at minimal expense of effort. To be truly useful, however, maps provided by the system should have several characteristics not found in the map systems currently available.

Detail maps often do not adequately depict a listed property's location with respect to known landmarks in a given area: major highways, waterways, shorelines, etc. Area maps which would show these references often will not show sufficient detail to enable a user to locate a property, yet may not adequately depict the area's location within the city. A general map lacks almost all detail but shows the location of a particular area within, for instance, a city. A series of maps in decreasing scale would enable a user to visualize the location of a property within a city, to locate the area within which the offered property is found, and finally to locate the specific property. This implies a series of three maps: a general map of small scale to show a very large area; an area map of medium scale to depict a smaller area and finally a detail map of very large scale to show a small area in great detail.

A common fault of automated map systems currently available is that a map produced therewith for a given location often depicts that location at the map boundary. A map with a listed property shown at one edge or in a corner of the map has limited utility. Maps presented to the user which "center" the location of the property or other point of interest on the map produced would maximize the utility of those maps. Furthermore, assuming the user is provided with a series of maps of varying scale as discussed above, the location of the detail maps should be centered on the area maps, and the location of the area maps should be centered on the general maps. In this manner, the user is given the most useful presentation of map data.

To maintain a dynamic database of listed real estate properties, properties need to be removed when sold or otherwise removed from the market and added when they come on the market. In order to create a map which will accurately depict newly listed properties, each property in the database must contain geocode references for a mapping system to refer to. Manually geocoding each new property as it is listed would be a significant effort; absent a large expenditure of man-hours it cannot be timely done for the large pool of available properties typically found in even medium sized cities. An automated geocoding process which takes advantage of geocode references inherent in an available mapping system would solve the problem, if those geocode references are accurate and up to date. Geocode references in available automated mapping systems are constantly changing to reflect changes to the areas they map; furthermore, these systems almost always have inherent errors or inaccuracies. A purely automated process to provide geocode references for a large number of newly listed properties is not, therefore, predestined for success. An automated process, capable of manual intervention to resolve errors, would enable a database manager to geocode the greatest number of properties by maximizing the utility of the geocoding capability of existing mapping systems, while minimizing the impact of those errors.

In presenting data to a database user, it is often desirable to present that information, in whatever form it is ultimately extracted from the database, in printed format. In a typical real estate office, this presents no particular difficulty in that such offices typically have one or more computers or even a network of computers accessible to users. Moreover, in an office environment, users of such systems tend to have experience, even expertise, in their use. In the case where the user is not in an office, does not have access to such equipment, or is not trained in the use of computers, getting printed information from a database presents a significant challenge. If a means could be found, absent the aforementioned equipment and training, to sort through a database of listed properties to find only those which meet a potential buyer's needs, and then print corresponding maps to enable that buyer to find those properties, a significant sales support opportunity could be realized.

A potential solution to the equipment dilemma exists in that facsimile (fax) equipment is becoming increasingly common both in the workplace as well as in the home office. By transmitting printed data to an end user's fax machine, that machine can function as a remote printer for the computer.

Using a facsimile machine to receive printed output from remote storage locations has been the subject of efforts by several workers. U.S. Pat. No. 4,918,722 to Duehren et al. teaches a method for storing at one location messages, receiving at the first location commands via telephone lines from a second location which select one of the stored messages, fetching the selected message responsive to the commands, calling the second location and sending the selected message to that location via facsimile equipment.

This goal of delivering one or more of a plurality of prerecorded messages to a remote user via facsimile equipment has been addressed by several others and is the subject of U.S. Pat. Nos. 5,068,888 to Scherk et al; 5,072,309 to Brown; 5,136,634 to Rae et al.; 5,153,744 to Nobuta; and 5,196,943 to Hersee et al.

Each of these referenced patents shares, to an extent, a common goal: the retrieval of selected documents, or in one case images, from a database. Each of the preceding references provides a means to allow a user to access an existing file and transmit that file to the user via facsimile means. In this manner, each of these inventions enables a remote user to access a database on a host computer and select from the database a file or record to receive via facsimile machine. While these devices have utility, a system which would enable a user to cause a database system to specifically create a document from data stored in the database and responsive to the user's needs, and then transmit that document to the user via facsimile equipment, would have significantly greater usefulness. In the case of the real estate sales support system example, such a system would enable a remote user to access the database, specify the user's requirements to the system, effectively sort the records from the database into a file which is subsequently used to create a map specific to the user's needs and send the resultant document thus created to the user's facsimile machine.

Generally speaking, a methodology is needed which would allow an individual to access a database using nothing more sophisticated than a telephone, direct queries to that database which result not in the transmission of a "canned" or pre-defined message but in a document created and formatted suitable to his specific needs, and have that document transmitted to a facsimile receiving unit to which he has access. Such a methodology would enable much of the inherent power of database technology to be made available to essentially naive users without their need for computational resources.

If such a system were available it would allow a user to call a specifically configured computer, using dual tone multi-frequency (DTMF or touch tone) telephone equipment, and request of the system a listing of, for instance, real estate property listings in a given area. The system would respond with a dynamically created document, specific to the user's needs, and could include not only a simple listing of properties, but other information useful in real estate sales. In this embodiment, the system could also provide a series of locator maps to assist the user in locating listed properties. In tailoring such a document to a user's needs, input from the user such as area desired, target price and number of bedrooms could be input using DTMF signals responsive to voice prompts from the system.

DISCLOSURE OF INVENTION

The present invention comprises method and apparatus to enable a remote user to access a database and dynamically create from it a listing of properties which meet the user's needs. The listing of properties is accompanied by at least one detail map which shows the detailed location of each of the listed properties; at least one area map which depicts the location of the detail map or maps with reference to a larger area; and at least one general map which depicts the location of the area map with regards to an even larger area. The properties listing page and map pages comprise a document which is transmitted via automated facsimile transmission means to the user's fax machine.

To practice the present invention, a database containing real estate offerings is implemented on a computer using a commercially available database management system. The present invention provides means to process the database, geocoding the real estate listings with their respective latitude and longitude to a pre-determined degree of accuracy. When a given listing cannot be automatically geocoded, the present invention provides means for the system operator to manually intervene in the geocoding process.

Once the database is geocoded, the present invention enables a remote user or subscriber (hereinafter the user) to access a computerized database system via DTMF telephone, and to create from that database system a document in response to the user's specific needs. In the real estate sales support embodiment of the present invention, the resultant document comprises a listings page with a selection of real estate properties best meeting the user's needs as input, and a corresponding series of real estate locator maps. The maps produced by this embodiment of the present invention include one or more detail, area, and general maps. The detail map or maps show the detailed location for each of the property listings; the area map or maps show the location of each of the detail maps on a smaller scale map; and the general map or maps show the locations of the area maps on a very small scale map.

It is a particular feature of the present invention that neither the entire database nor specific "canned" messages are transmitted to the user, but rather, the user specifies the nature of his or her request to the system of the present invention, and the system answers with a document created to meet the user's specific needs. It is another specific feature of the invention that no computer knowledge is required on the part of the user, and that no equipment is required of him except a touch tone telephone and access to facsimile receiving apparatus.

The user's request is input via DTMF telephone codes in response to voice prompts from the present invention. Among other information, the voice prompts of the present invention ask the user to input the area the user is interested in, the target price the user desires to pay for a property in this area, and a valid fax number where the resultant document will be sent. The present invention then processes the user's request, creates a customized document in response to that request, and transmits the document via telephone lines to a facsimile machine to which the user has access. The voice prompts are created by a voice processing card, installed in a computer, the card being responsive to a voice processing control software loop. Voice processing cards are well known in the art, but a particular feature of the present invention is the methodology used therein to interactively couple the voice prompts with the user's responses to query the several databases of the system.

Once the user's request is received and verified, the system processes the request, then creates and transmits the document created in response to that request. After document transmission, the fax files resulting from processing the request are deleted to save computer storage space.

Once the database containing the real estate listings has been geocoded, the present invention is designed to operate essentially continuously with minimal system operator input. The present invention iteratively and continually tests incoming phone lines for incoming calls and automatically processes each call. As a user calls the system, he or she is greeted by a voice prompt, and asked to input the area desired. This is done by using the letter codes on a DTMF telephone. Testing has determined that approximately 80% of all areas can be accurately input using the first five letters of an area's name. Accordingly, the present invention requires only those first five letters, in order to save both user and processing time.

In the case where the first five letters of an area are non-unique, or fail to adequately specify the area, the present invention provides means for processing these "multiple matches" between an area input by the user, and the areas found in the system's databases. The effect of multiple match processing of the present invention is to resolve the user's request as a single, unique area.

After the user inputs the desired area, the voice prompts of the present invention ask for a target, or desired, price the user regards as being the price he or she is interested in paying. Finally, the system asks the user for a valid telephone number for the destination facsimile machine which will receive the resultant document.

Each of the previously discussed prompt/input cycles is followed by a verification of the data input by the user prior to proceeding to the next prompt/input cycle. A real estate sales support system according to the principles of the present invention then processes the request and creates a document containing a listings page and several map pages as previously discussed.

Individual document pages created by the present invention in response to a given user request are stored as separate files. All related files representing a single request document are stored until transmitted by the fax transmission means of the present invention. The present invention provides for multiple attempts at facsimile transmission to minimize the impact of busy lines at the facsimile receiving number specified by the user. Once documents are transmitted, the present invention provides means for deletion of their corresponding files to save computer storage space. Means are likewise provided by the present invention for several record keeping functions of import to the system operator. These functions are discussed in detail in the section entitled "BEST MODE OF CARRYING OUT THE INVENTION".

After each request is processed and the resulting document created and transmitted, the present invention tests if any other requests require processing. If so, the preceding processing functions are repeated for each such pending request.

It will be immediately apparent to those skilled in the art that the principles of the present invention are applicable to a wide variety of sales support and remote database utilization tasks. The present invention specifically contemplates such applications.

Other features of the present invention are disclosed or apparent in the section entitled "BEST MODE OF CARRYING OUT THE INVENTION".

BRIEF DESCRIPTION OF THE DRAWINGS

For fuller understanding of the present invention, reference is made to the accompanying drawing in the following detailed description of the Best Mode of Carrying Out the Invention. In the drawing:

FIG. 16 is an overview flow diagram of the process new request module of the new request test loop.

FIG. 17 is a detail flow diagram of the update request files module of the process new request module.

FIG. 33 is a listings page created in response to a user's request.

FIG. 40 is an example of the map centering process from individual property listings to detail maps.

Figure 1:
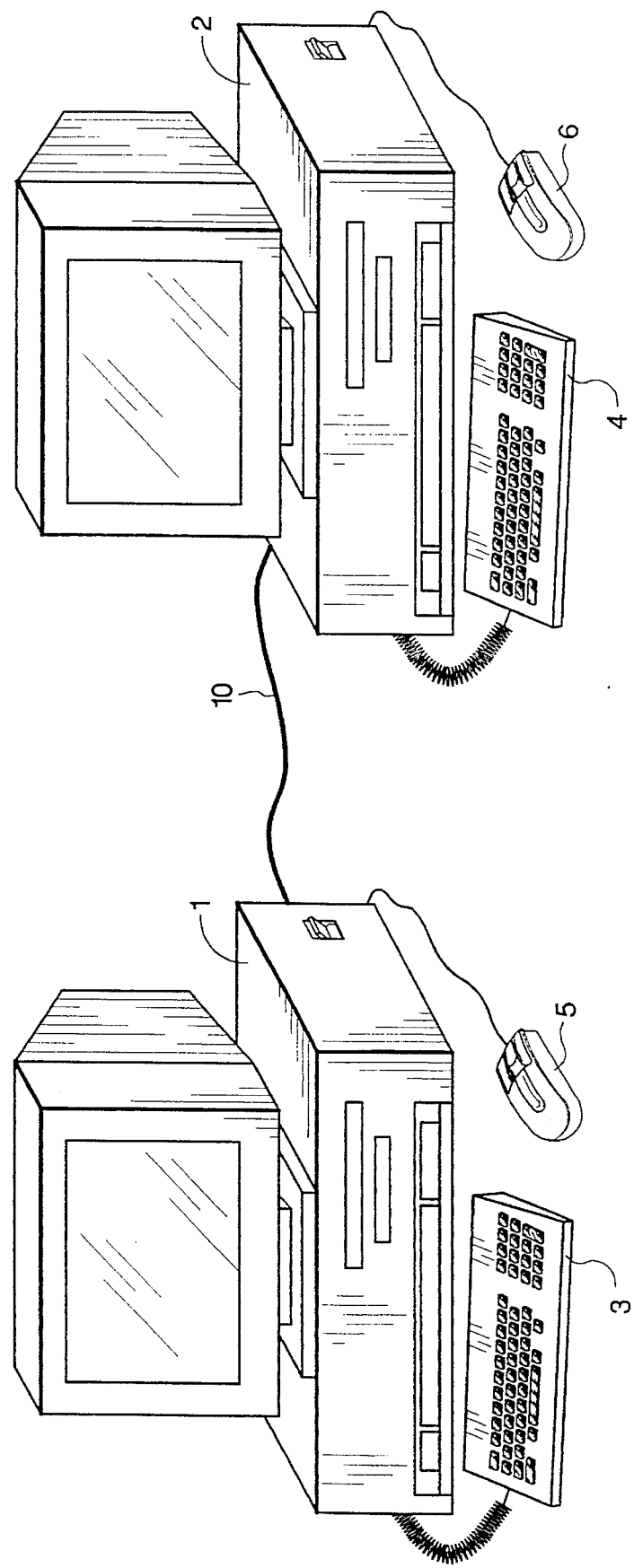
FIG. 1 is a view of two computers configured as a local area network in order to practice the present invention.

Reference numbers refer to the same or equivalent parts of the invention throughout the several figures of the drawing.

BEST MODE OF CARRYING OUT THE INVENTION

To practice the present invention, a database containing real estate offerings is implemented on a computer using a commercially available database management system. Each real estate offering is accompanied in its database record with a unique positional locator comprising its latitude and longitude. The association between a listed property and its latitude and longitude is accomplished through a process called geocoding. The present invention is practicable using a wide variety of geocoding methodologies. The simplest method would be to have a subscriber who desired to have his property listed with a system operator using the present invention to provide the positional locating data for his property, as latitude and longitude, to the system operator when subscribing. Another method could be for a subscriber to furnish this data through a second source provider, i.e., another firm providing automated mapping capabilities. Still another methodology would be a combined manual and automated process practiced by the system operator in conjunction with the present invention. In this scenario, the system operator, through a combination of manual and automated means processes the database, geocoding the real estate listings with their respective latitude and longitude to a pre-determined degree of accuracy. When a given listing cannot be automatically geocoded, the present invention provides means for the system operator to manually intervene in the geocoding process.

Geocoding is the process by which mapping coordinates in terms of longitude and latitude can be associated with or determined for a given location. Most proprietary mapping databases have some geocoding capability. In general, on one extreme, the geocoding process can be highly interactive requiring considerable human involvement and decision making on a location-by-location basis. On the other extreme, the geocoding process can be highly automated requiring pre-defined search strategies applied to large numbers of locations. In both cases, the geocoding is a reiterative process in which multiple degrees of accuracy are applied during each geocoding attempt. In the present invention, it is necessary to geocode a large number, often several thousand, locations in a rather short period of time. Ideally, the process should be capable of accomplishment in one to two hours. To accomplish such a task, the geocoding process must be automated as much as possible.

In order to plot the position of a given location on a map, its mapping coordinates must be known. In an application providing locator maps for groups of locations, this information must be determined in advance. Source information in terms of address (the numeric portion of a street address), street, city, state, and ZIP code must be processed in a systematic manner under a predefined geocoding strategy. The geocoding strategy applied must be designed to take into consideration the completeness and accuracy of the source information, the completeness and accuracy of the mapping database geocoding index files, and the processing capabilities available to address weaknesses in both sources of information.

During the process, success for a given attempt is measured by a single set of coordinates being returned which are within a pre-defined range of positional accuracy. Non-successful attempts can be classified into two groups. One group is characterized as those which must be investigated or processed manually to determine their viability for geocoding. The other group is characterized as those which can continue to be processed automatically under less restrictive parameters for positional accuracy.

The success rate for a totally automated geocoding process will vary according to the accuracy of the address information submitted and the accuracy and completeness of the mapping database geocoding index files. Given the potential for errors in both sets of information and the difficulty of maintaining geocoding index files for the latest information on new streets and addresses, a totally automated geocoding process cannot be expected to be successful on all attempts.

For the percentage that cannot be geocoded within a pre-defined range of positional accuracy, the objective is to then geocode to within a pre-defined area. This geocoding process can also be highly automated.

For the percentage that cannot be geocoded either within a predefined range of positional accuracy or within a predefined area, the geocoding process is a manual effort. It is quite possible that a very small percentage of locations will not be able to be geocoded without a substantial manual effort.

Since geocoding strategies are highly dependent on the capabilities of the geocoding tools and the geocoding index files associated with a given mapping database, the following discussion will focus on specifics pertaining to the mapping products developed by ETAK, Inc.

Geocoding information from ETAK is encoded in a proprietary format in a GeoIndex file. The information contained in this file consists of street name, city, state, postal code (ZIP code in the United States), address range, and coordinate range. According to ETAK, geocoding is the process of fetching information about a location on a map from a given description of the location. Its primary goal is to provide a set of geographical coordinates in response to an input address specification.

The input address specification can consist of six possible components: 1) an address number, 2) a street name, 3) a cross street name, 4) a city name, 5) a state name, and 6) a postal code. Because cross street names are generally not available and because the geocoding results from their use does not provide the positional accuracy required by the present invention, they are not used in the geocoding strategy outlined below. The street name as well as the cross street name components can be broken into three smaller components: a prefix, such as a directional modifier—north, south, east, west, etc.; a suffix such as a street type—drive, avenue, boulevard, court, etc.; and a body. The body is the part of the street name that is left after stripping the prefix and suffix. The street name body is the only required component for a geocoding search since it is present in every GeoIndex entry and must be present in any valid street address.

When submitting an input address specification for geocoding using ETAK's GeoIndex file, the street body is required. All other address components, including address number, prefix, suffix, city, state, and postal code are optional. ETAK provides the capability to set search flags on each of these components. These flags can either require an exact match or allow a non-match, or wild card.

Since there are a large number of permutations of components and search flags using ETAK's GeoIndex file, an optimized automated geocoding strategy must be designed to maximize the success rate with the minimum number of iterations. In processing a large number of input address specifications, the iterative processing to execute a geocoding strategy can be applied in its entirety to each record or as separate iterations applied to the entire file of records. The geocoding—processing overview in FIG. 38 outlines the processing for a strategy applied as separate iterations to an entire file of records.

The geocoding process starts as a manual process. Certain errors in the data are corrected prior to submission to the automated process. At the beginning of the automated process, the criteria used to initiate the searching process is set. This includes the various search flags on each of the components. Each of the components are then tested for a valid entry in the GeoIndex file. If any of the components of an address are not valid, then the address is considered to contain bad components and cannot be submitted for geocoding. These bad components must be manually examined to determine the source of the problem. In the initial stage of applying a geocoding strategy, the source of the problem is usually the data itself. Errors are corrected manually and the corrected information is resubmitted to the automated geocoding process as soon as possible at the test components step. In the later stage of applying a geocoding strategy, the source of the problem is usually the GeoIndex file where information may be either incorrect or missing. After identification of GeoIndex file errors and possibly omissions, the data can be resubmitted to the automated geocoding process where it is adjusted prior to the test components step.

If all of the components are valid, the address is geocoded. If there is a single match, a determination is made as to whether the criteria being applied provide for acceptable positional accuracy. If the accuracy is acceptable, this is considered a successful geocode and the coordinates from the process are stored for that location. If there are multiple matches, a determination is made as to how these will be processed. If manual processing is appropriate, these will be reviewed manually and the correct coordinates will be stored.

If there is a non-match, or a single match but with unacceptable positional accuracy, or multiple matches which can be processed in an automated manner, a determination is made relative the geocoding strategy. If the strategy has not been exhausted in terms of options as designed, the search criteria is changed and the records are resubmitted at the test components step. If the strategy has been totally applied, the unsuccessful attempts will be processed manually.

The specific geocoding strategy used in conjunction with the present invention makes several passes with specific objectives in mind. On the first pass, the objective is to successfully geocode as many locations as possible with the highest degree of positional accuracy possible working from the tightest criteria and gradually loosening the search criteria. On the second pass involving only the unsuccessful records from the first pass, the objective is to separate the data into two groups. One of these groups represents data which cannot be geocoded in an automated manner using ETAK's GeoIndex file and will ultimately be geocoded by some other means. The other group represents data which may be geocoded within some range of positional accuracy. On the third pass involving only this last group, the objective is to successfully geocode as many locations as possible within the pre-defined limits of positional accuracy again working from the tightest criteria and gradually loosening the search criteria. After these three passes, the remaining unsuccessful matches are adjusted for errors and/or omissions known to exist in the ETAK GeoIndex file. At this point, another three passes with the same objectives as the first three are applied to the data. After this process, the remaining unsuccessful matches are submitted to a geocoding strategy based upon ZIP code information contained in a non-ETAK file. By the end of this process, the number of locations requiring manual processing is minimal.

As a user calls the system, he or she is greeted by a voice prompt, and asked to input the area desired. The area, as well as all other data relating to the user's request is entered by the user in response to voice prompts, from the system, by actuating the keys of his telephone instrument to initiate DTMF codes which represent the requested information. When a user makes an area selection, there are three possible outcomes:

1. No match between the area as input by the user and the areas in the database;
2. A single match between the area as input by the user and the areas in the database; and
3. Multiple matches between the area as input by the user and the areas in the database.

If no match exists between the area input by the user and the areas in the database, the user is informed by voice response and given the option to try again. If there is a single match, there are two possible conditions:

1. Area has no listings—the user is informed and given the option to try again; or
2. Area has some listings—the user is informed and given the option to continue or to try another area.

If there are multiple matches, the user is informed, again by voice prompt, and the system executes a loop which recites the area list one area at a time. For each area recited, the user is given the option to select that area, which is then treated as a single match with the two possible conditions shown above, or to move forward or backward through the list. After the user inputs the desired area, the system of the present invention resolves the user's requested area as input as a single, unique area. The voice prompts of the present invention then ask for a target, or desired, price the user regards as being the price he or she is interested in paying. Finally, the system asks the user for a valid telephone number for the destination facsimile machine which will receive the resultant document. Each of the previously discussed prompt/input cycles is followed by a voice verification of the data input by the user, and a request that the user confirm the data prior to proceeding to the next prompt/input cycle.

After receiving a user's request, the sales support embodiment of the present invention first files that request as a request database record. As processing the request continues, key parameters of the request are read and compared with listings maintained by the system operator in a location database. If a relatively small number of listings exists which meets the user's request, e.g. four or less, all the listings are forwarded to the user, regardless of target price. If more than four listings exist which meet the user's location specification, the listings are processed to provide a reasonable number for the user's consideration.

The mechanism for this aspect of processing is the price range factor. Initially set to include all listings which fall within ten percent of the user's target price, the price range factor is manipulated to vary the number of listings presented to the user. The initial count of listings which fall within the initial target price range factor is used in conjunction with the total count of listings for a given area to determine the number of listings that will actually be presented to the user. If the initial count of listings is high compared to a pre-defined value (10 or more) and the total number of listings is high compared to another predefined value (more than 12), then the initial count is considered high. A high initial count results in a different set of minimum and maximum number of listings than a low initial count. These minimum and maximum number of listings are then used to determine whether or not the price range factor needs to be adjusted. If the count of listings which fall within the target price range factor is below the minimum number set by the initial count, the price range factor is increased to increase the number of listings. If the count of listings which fall within the target price range factor is above the maximum number set by the initial count, the price range factor is decreased to decrease the number of listings. After either increasing or decreasing the price range factor, the listings count is again checked to see if the altered price range factor resulted in an acceptable number of listings. The cycle consisting of altering the price range factor and checking the resulting number of listings iterates until the number of listings is within a pre-defined range.

After determining which listings meet the user's area and target price requirements and the system's numerical requirements, those listings are extracted into an individual request database. The listings in this individual request database form the data whereby the present invention creates individual pages of the dynamically created document which is ultimately delivered to the user in response to his or her request. It is a particular feature of the present invention that neither the entire database nor specific "canned" messages are transmitted to the user, but rather, the user specifies the nature of his or her request to the system of the present invention, and the system answers with a customized document created to meet the user's specific needs.

In the real estate sales support system according to the present invention, the dynamically created document consists of a listing of properties is accompanied by at least one detail map which shows the detailed location of each of the listed properties; at least one area map which depicts the location of the detail map or maps with reference to a larger area; and at least one general map which depicts the location of the area map with regards to an even larger area. The properties listing page and map pages comprise a document which is transmitted via automated facsimile transmission means to the user's fax machine.

The first page created by the system in response to the user's request is the listings page. The listings page takes information from the individual request database, including the area name, target price, and price range factor and prints the area name as part of the listings page header. In the event that relatively few listings exist for a user's specified area, the target price is not printed, but a notice given that all listings available are printed. In the event the target price and price range factor are used to numerically limit the number of listings presented to the user, the target price and price range factor are also printed as part of the listings page header. After the header is printed, the individual request database is opened and the listing information for each listing is sequentially printed on the listings page. The real estate sales support embodiment of the present invention includes information such as address, street, unit, price, number of bedrooms, broker, and phone number. Once all the listings from the individual request database have been printed, the database and listings page file are closed.

Figure 39:
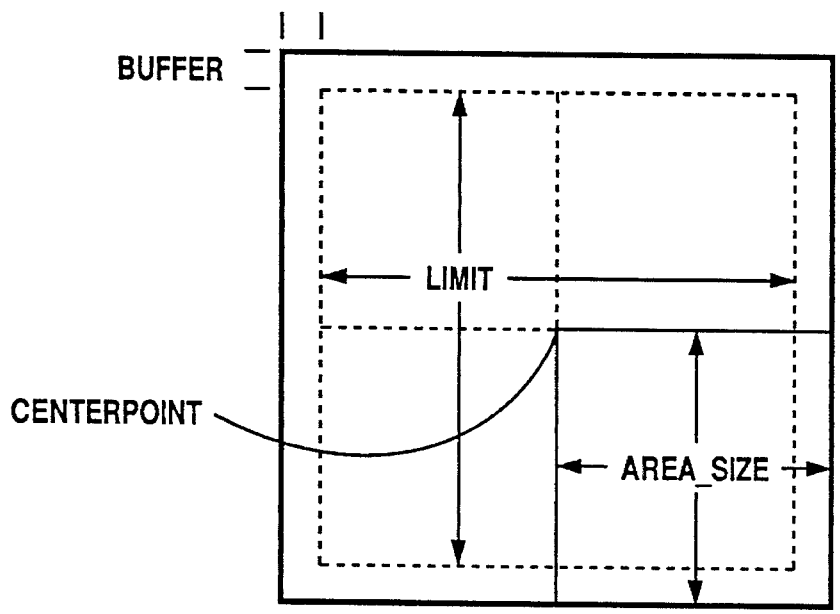
FIG. 39 is an example of the linkage process linking individual property listings to areas.

A particular feature of the real estate sales support embodiment of the present invention is the manner whereby listings are centered on the maps presented to the user as part of the document which is ultimately delivered. Prior to processing user requests, the system operator creates the location database which defines the several areas/neighborhoods requestable by users when they access the system. Open home listings are linked to the various areas/neighborhoods defined in the location database. Referring to FIG. 39, each area/neighborhood is defined by latitude and longitude coordinates representing its center point, and an area size in miles which represents one-half of the width and height of the area. To eliminate the possibility of detail map boxes drifting off the page, a buffer of 0.4 miles on all sides is used to reduce the area size for purposes of calculating the parameters for linking open home listings for any given area/neighborhood.

While the size of areas/neighborhoods is variable, a default area size is defined for each area/neighborhood. Most areas/neighborhoods in the San Francisco Bay Area, for instance, are set at 2.5 miles for a 25 square mile area (5*5). All of the areas/neighborhoods for San Francisco County, for instance, are set at 2.0 miles for a 16 square mile area due to the density of the housing available. Some of the outer areas/neighborhoods have default area sizes above 2.5 miles—some as high as 3.7 miles which represents a nearly 55 square mile area. A default area size for any given area/neighborhood may be adjusted upward in order to pick up any open home listings that were not linked to any area/neighborhood at the default area size.

Responsive to processing a user's request, open home listings meeting a user's specifications are linked to detail maps. As the request is processed, the latitude and longitude of the first selected property listing becomes the center point of a detail map. When an additional property listing will fit on an existing detail map, coordinates representing the detail map's center point are recalculated based on the midpoints of the latitudinal and longitudinal extremes of the selected locations sited on each detail map. Each detail map therefore is dynamically changed pursuant to processing the user's request. Referring to FIG. 40, each detail map is defined by its centerpoint which is based on the midpoints of the latitudinal and longitudinal extremes of the selected locations and an area size in miles which represents one-half of the width and height of the detail map area. The default area size for detail maps is set at 0.4 miles for a 0.64 square mile area (0.8 * 0.8). To eliminate the possibility of open home listings appearing too near the edge, a buffer of 0.1 miles on all sides is used to reduce the area size for purposes of calculating the parameters for linking open home listings to any given detail map.

Just as detail map center coordinates are dynamically modified to center the detail map around adjacent property listings, so are area maps dynamically modified to center the area map around the midpoints of the several detail maps produced responsive to a user's request. Referring to FIG. 40, as detail map center coordinates are linked to the area map, coordinates representing the area map's center point are recalculated in the same manner. The area map is therefore defined by these coordinates and its area size in miles, which represents one-half of the width and height of the area map area.

As verification that detail maps should not drift off the page, a buffer of 0.4 miles on all sides is used to reduce the area size for purposes of calculating the parameters for positioning the detail maps on the area map. This buffer was originally used for linking open home listings to the various areas/neighborhoods defined in the location database.

The centerpoint of the general map produced by the present invention is the centerpoint of the area map.

This embodiment presents three levels of mapping. Specifically, detail maps, area maps and general maps. Detail maps are large scale maps in that they portray a small area at great detail. Area maps are medium scale maps and general maps are small scale maps in that they portray a large area. In the embodiment of the present invention under discussion, the user is presented with one or more detail maps. Each detail map has imprinted thereon one or more numbered dots, also referred to herein as map points. Each numbered dot corresponds with a located property as well as the property listings shown on the listings page of the document prepared by the present invention. It is a specific feature of the present invention that these numbered dots are centered with respect to the detail maps. In the event where a detail map has only one numbered dot, the present invention provides means whereby that dot appears at the center of the detail map. In the event a detail map has two or more numbered dots corresponding to property locations, the center of the detailed map is based on the midpoints between the longitudinal extremes and latitudinal extremes of all the data points associated with that map. In similar fashion, the location of the detail maps on the area map is centered using the same methodology. Furthermore, the location of the area map or maps on the general map is likewise centered.

The principal databases used in centering map data are as follows: Map Level 3, or ML3 is a database which has records stored therein pertaining to each individual listing point selected by the system as most closely approximating the user's requirements. The records in Map Level 2, or ML2 define the center points of each detail map. The center coordinates of the detail maps will become the locational point on the area map. Each record in ML2 will result in one detail map created by the system. Map Level 1 or ML1 will result in the center point or locational point for the area and general maps. The data in each of these databases are dynamically created by the system responsive to each user's input, and are based on property listings previously stored in the listings database. ML3 will typically have several entries contained therein for each user request. ML2 will have one or more entries, each of which contains the center point for one detail map. As ML2 database is created, the centerpoint for any map represented by one of its records may change, as explained below. ML1 will contain, after the map centering process, a number of records equal to the number of areas the system will allow the user to input in the user's request.

Map centering is effected as follows: the ML3 database is created from the individual request database and updated to include information pertaining to the location of the several listings selected for inclusion by the system in the document. Once the ML3 database has been updated, it is indexed by its latitude and longitudinal coordinates from north to south and west to east. Before the system opens and initializes the ML2 database, the system then defines the map size, border buffer and calculates positional boundaries. Positional boundaries are the map size dimension less the border buffer dimension—for both latitude and longitude. The positional boundaries represent the maximum distance from the center point of a map that a point can be and still be associated with that particular map.

It will be appreciated that in order to adequately represent an urban area, the scale of the map must be sufficiently large to enable the user to discriminate between the relatively dense housing units typically found in a city. In contrast, suburban or rural areas offer less dwelling density, and require smaller scale maps to portray a meaningful scope of property. By way of illustration, if the same scale map were to be used for downtown San Francisco and a farm in Oklahoma, the location dots on the San Francisco map would likely overlap, rendering the map useless. The Oklahoma map, on the other hand, could contain one dot at the end of a dirt road, presenting so little location detail as to, once again, render the map useless.

It is a particular feature of the present invention that maps created by the system are defined with respect to their population density context, and scaled accordingly.

Another feature particularly pointed out by the present invention is the use of border buffers. Border buffers are minimum areas around the perimeter of a map which, while they contain all the detail of the map, will contain no location points. This is to ensure that no map is produced with a position location at the edge of the map, and hence possibly lacking sufficient locational detail as to allow a user to find the property.

The first record in ML3 causes the system to create the first record in ML2. This is equivalent to a first detail map being created to display a first location. Each subsequent record in the ML3 database is then sequentially processed, and checked to see if it will fit on the map corresponding to the current ML2 record. If the point will fit, without exceeding the positional boundaries for the detail map, it is added to that map, and the ML3 database map number is updated from the ML2 database. The internal windows are re-adjusted and the map center coordinates are re-calculated. This information is updated to ML2 so when the next set of tests are conducted, the positional boundaries of the map in the ML2 database record are re-determined. If it will not fit, the system tries to fit the point, in similar fashion, to each of the previously recorded ML2 records. If a fit is found, the system adds the point to the map which fits the point. If no such fit is found, the system creates a new ML2 record, and hence a new detail map before checking the next ML3 record.

When the first point is put in an ML2 record, that record defines a detail map centered around that first point. When a second or subsequent point is put on the same detail map, the system recalculates a new map center based on the midpoints between the longitudinal extremes and latitudinal extremes of all the data points associated with that map. This new map center is stored in the ML2 database to form the center of the detail map as it is eventually drawn.

At this point in executing the program of the present invention, the ML2 database is created, and each of the detail maps defined thereby has had its center point calculated. The ML3 database has been updated to include corresponding map numbers on the ML2 database. The present invention now indexes both databases by map number, links ML3 to ML2 by map number and ensures that the detail map center coordinates from ML2 are updated on ML3. The ML1 database is now opened and initialized, the map size and border buffer defined, and the positional boundaries calculated for the area map.

The first record in ML2 causes the system to create the first record in ML1. This is equivalent to a first area map being created to display a first detail map. Each subsequent record in the ML2 database is then sequentially processed, and checked to see if it will fit on the map corresponding to the current ML1 record. If the point will fit, without exceeding the positional boundaries for the area map, it is added to that map, and the ML2 database map number is updated from the ML1 database. The internal windows are re-adjusted and the area map center coordinates are re-calculated. This information is updated to ML1 so when the next set of tests are conducted, the positional boundaries of the map in the ML1 database record are re-determined. If it will not fit, the system tries to fit the point, in similar fashion, to each of the previously recorded ML1 records. If a fit is found, the system adds the center point of the detail map to the area map which fits the center point. If no such fit is found, the system creates a new ML1 record, and hence a new area map. When the first detail map center point is put in an ML1 record, that record defines an area map centered around that first detail map center point. When a second or subsequent detail map center point is put on the same area map, the system recalculates a new map center based on the midpoints between the longitudinal extremes and latitudinal extremes of all the data points associated with that map. This new map center is stored in the ML1 database to form the center of both the area and general maps as they are eventually drawn. If the embodiment of the present invention allows several areas to be selected by the user, the number of records in the ML1 database will equal the number of areas the user selects. If the present invention is configured to allow only one user selected area, there will be only one record in the ML1 database.

After the ML1 database has been created and populated with data, each record in the ML2 database is again updated to include map center coordinates from ML1, and that database is updated with map level information, description information, map and box scales At this point the map data database is opened and initialized, and records from the ML3, ML2 and ML1 databases are merged into it. Data is then copied from the map data database into the individual request map data file, and the map data database is closed.

The several map pages of the document are created using any of several commercially available computerized mapping systems. One such system, well known in the art is MapAccess™ manufactured by ETAK. Each of the records in the individual request map data file is read, and for each of the ML2 records, a detail map is drawn. For each ML1 record, an area and general map is drawn.

After each request is processed and the resulting document created and transmitted, the present invention tests if any other requests require processing. If so, the preceding processing functions are repeated for each request.

Referring now to FIG. 1, two computers, 1 and 2, are shown configured as a local area network. Well known is the fact that such computers each typically comprise a CPU, input and output means, bus means, display means, storage and memory means. In the best mode for carrying out the invention, each of computers 1 and 2 is equipped with dual input means specifically both a keyboard 3 and 4 and a mouse 5 and 6. In order to connect computers 1 and 2 to form a local area network for carrying out the present invention, they are connected by cable 10 to network interface cards 14 and 15 (shown in FIG. 2), installed in computers 1 and 2 respectively. It will be obvious to those skilled in the art that this is not the only methodology whereby the present invention may be carried out. A single computer capable of multiprocessing or a computer with one or more attached co-processors could be configured to carry out the present invention in a single computer configuration. In addition to the previously discussed general architecture requirements for a general purpose, digital programmable computer, computer 1 in the present invention has installed therein a voice processing card 13 capable of receiving one or more incoming telephone lines. Computer 1 has further implemented thereon one or more fax modem card 60 capable of transmitting facsimile copies generated by the system. Fax modem cards are in turn connectable to one or more outgoing telephone lines.

The present invention is executable on two Gateway 2000 computers as described above. Each of the computers having a 486-DX-33 MHz CPU, at least a 200 Mbyte hard disk and 8 megabytes RAM, and an Intel EtherExpress LAN adapter card. Computer 1, providing both voice processing and fax transmission capabilities is also configured with a Dialogic D/41D voice card and an Intel SatisFAXtion 200 internal facsimile/modem card. The network operating system is Lantastic. Technical reference for the Lantastic software can be found in Lantastic technical manual version 5.0.

Technical reference for the computers can be found in the Users' Guide number MAN0943220, revision 2.20. The fax modem is described in Intel manual 306948-001. The voice card is described in Dialogic Corp. manual 05-0012-002. The computer programs of the present invention were developed using dBASE IV™ for overall program control and relational database functionality; C++ language by Borland for accessing ETAK's mapping database and associated libraries of functions, ProVIDE™ from Telephone Response Technologies for voice processing and fax processing functionality, and GS32 from LaserGo for PostScript™ conversion functionality.

The operating system used in perfecting the real estate sales support system embodiment of the present invention is Microsoft MS-DOS version 5.0. C language programming was carried out using Borland C++ version 3.1. The database processing is conducted using Borland's dbase IV™ version 2.0. Voice processing software from Telephone Response Technology comprises 3 modules: ProVIDE Application Processor version 4.2c; DBA module version 4.1b; and INTELEFAX module version 1.7e. Map drawing routines utilize MapAccess™ tools from ETAK: MapDraw library version 2.0.2 and MapRetreive library version 1.0.2. MapAccess™ GeoCode library version 1.4.1 provides the interface for the automated geocoding process of the present invention. The conversion from PostScript™ format to PCX is conducted by GS32 from LaserGo.

Figure 2:
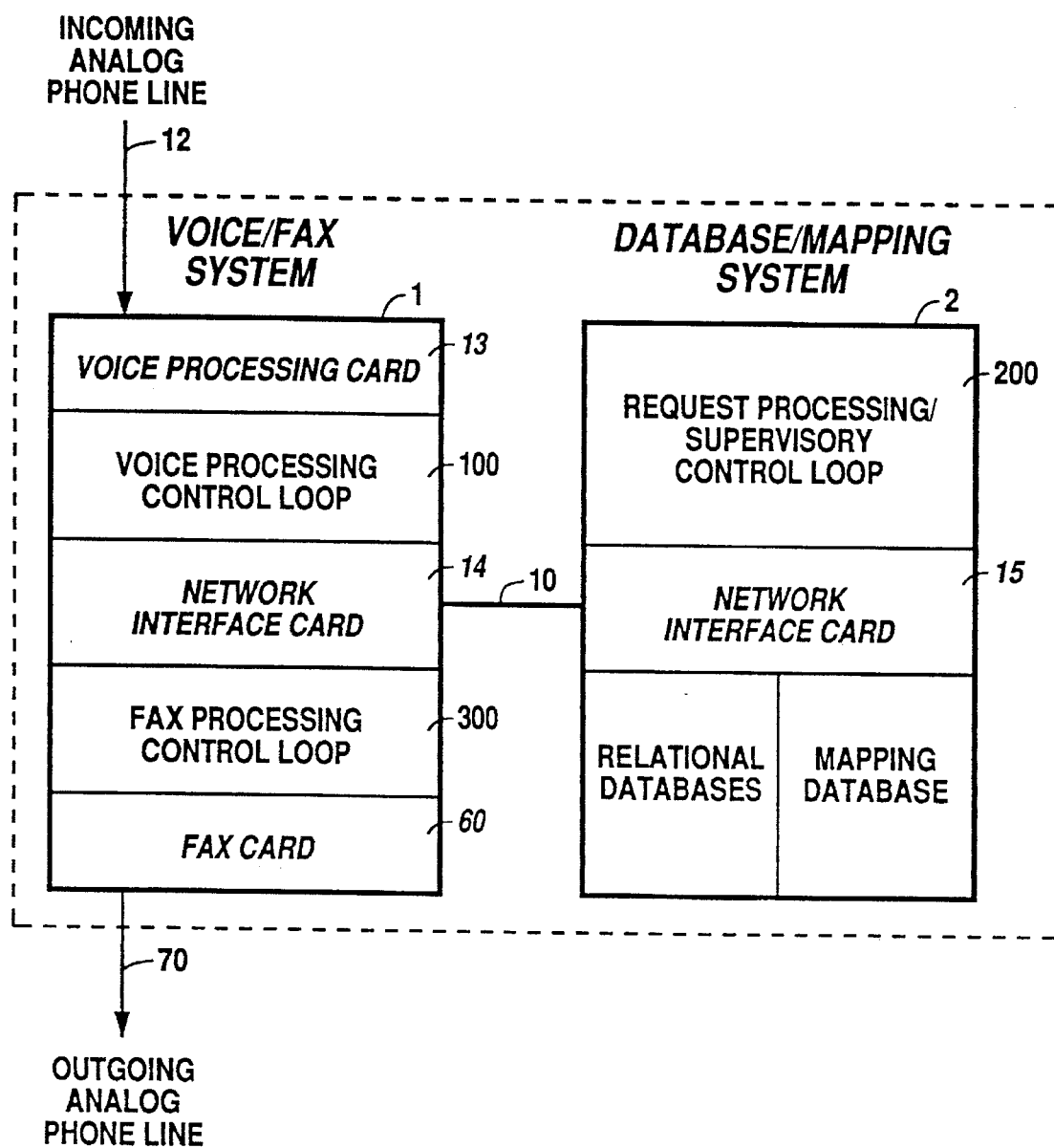
FIG. 2 is a system overview of the present invention.

An overall system view of the present invention is shown in FIG. 2. Incoming analog phone line 12 connects to voice processing card 13. Voice processing card 13 operates on computer 1 which executes voice processing control loop 100. Voice processing control loop handles incoming telephone calls during which a user is interactively prompted to make a request for information via touch tone responses. Each request requires the user to select an area, enter a target price, and provide a telephone number to which the requested information will be sent.

Also resident on each of computer 1 and computer 2 is a network interface card, 14 and 15 respectively, connected by cable 10 to configure the computers as a peer-to-peer local area network, shown in FIG. 2. Voice processing card 13 and fax card 60 serve to connect the present invention to incoming and outgoing telephone lines 12 and 70, respectively. Requests for information generated by the voice processing control loop are forwarded to the database system resident on computer 2 via the local area network. The request processing and supervisory control loop 200 resident on computer 2 processes all new requests, monitors fax transmissions of requests, and automatically deletes fax files at a predetermined time.

Requests which have been processed and the documents created responsive to those requests are sent from computer 2 to computer 1 again by the peer-to-peer local area network. Facsimile transmission of the maps and listings sheets produced by the system is controlled by fax processing control loop 300. Fax processing control loop 300 executes and monitors transmission of the finalized map set from fax card 60 via outgoing analog telephone line 70.

Figure 3:
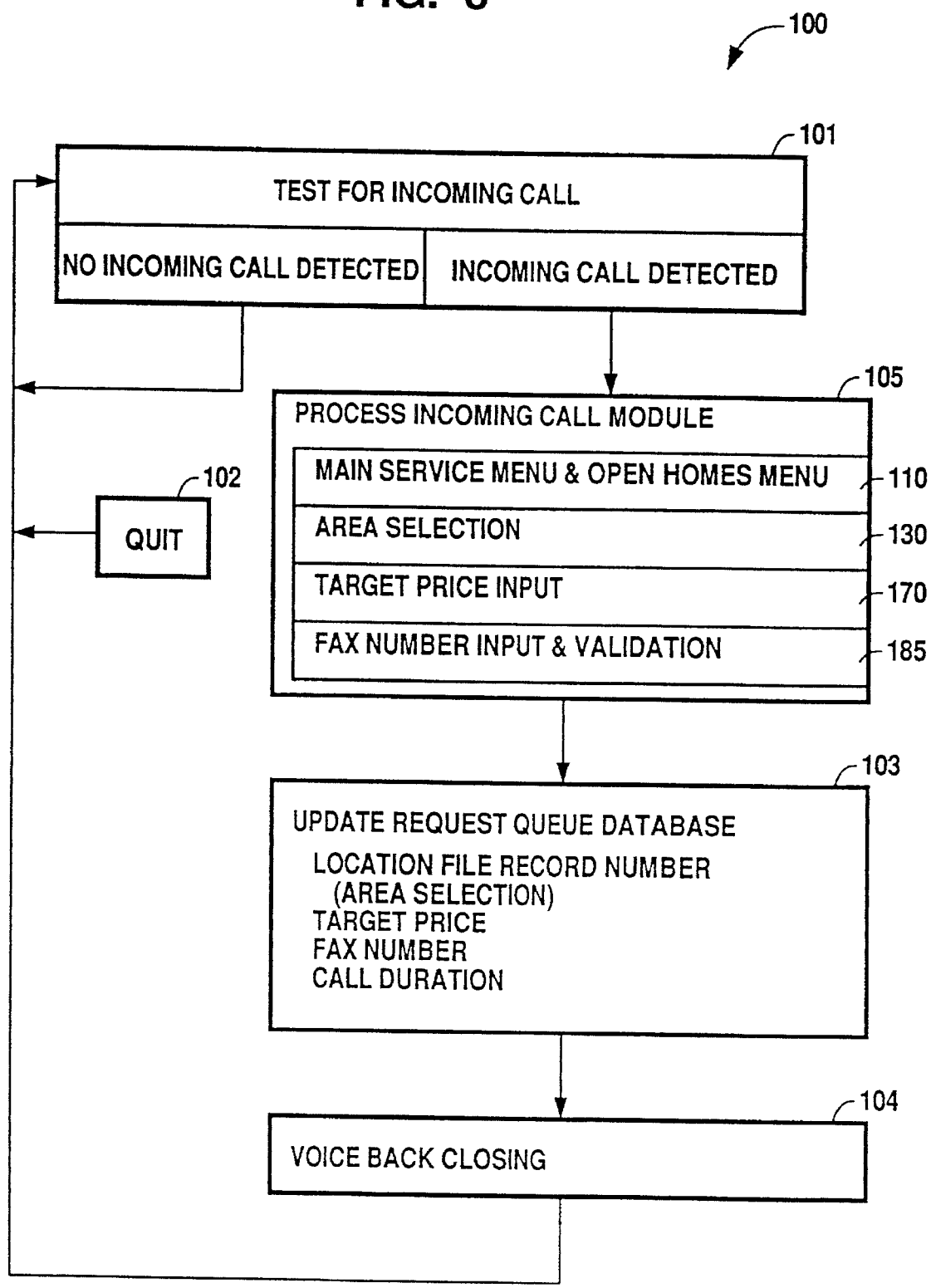
FIG. 3 is an overview flow diagram of the voice processing loop.

Voice processing control loop 100 is detailed in FIG. 3. The present invention is designed to operate essentially continuously with minimal system operator input. The present invention iteratively and continually tests incoming phone lines for incoming calls and automatically processes each call. At 101 the loop tests voice processing card 13 for an incoming call. If no incoming call is detected, the test is repeated. If an incoming call is detected, the call is processed by incoming call module 105, which comprises main service menu and open home menu 110, area selection module 130, target price input module 170, and fax number input and validation module 185. After an incoming call is processed by process incoming call module 105, the request queue database is updated at 103. After the request queue has been updated, voice back closing 104 signs the system off to the user, closes the phone line and returns control to test 101, which iteratively continues to test for incoming telephone calls as long as the system is operating.

Figure 4:
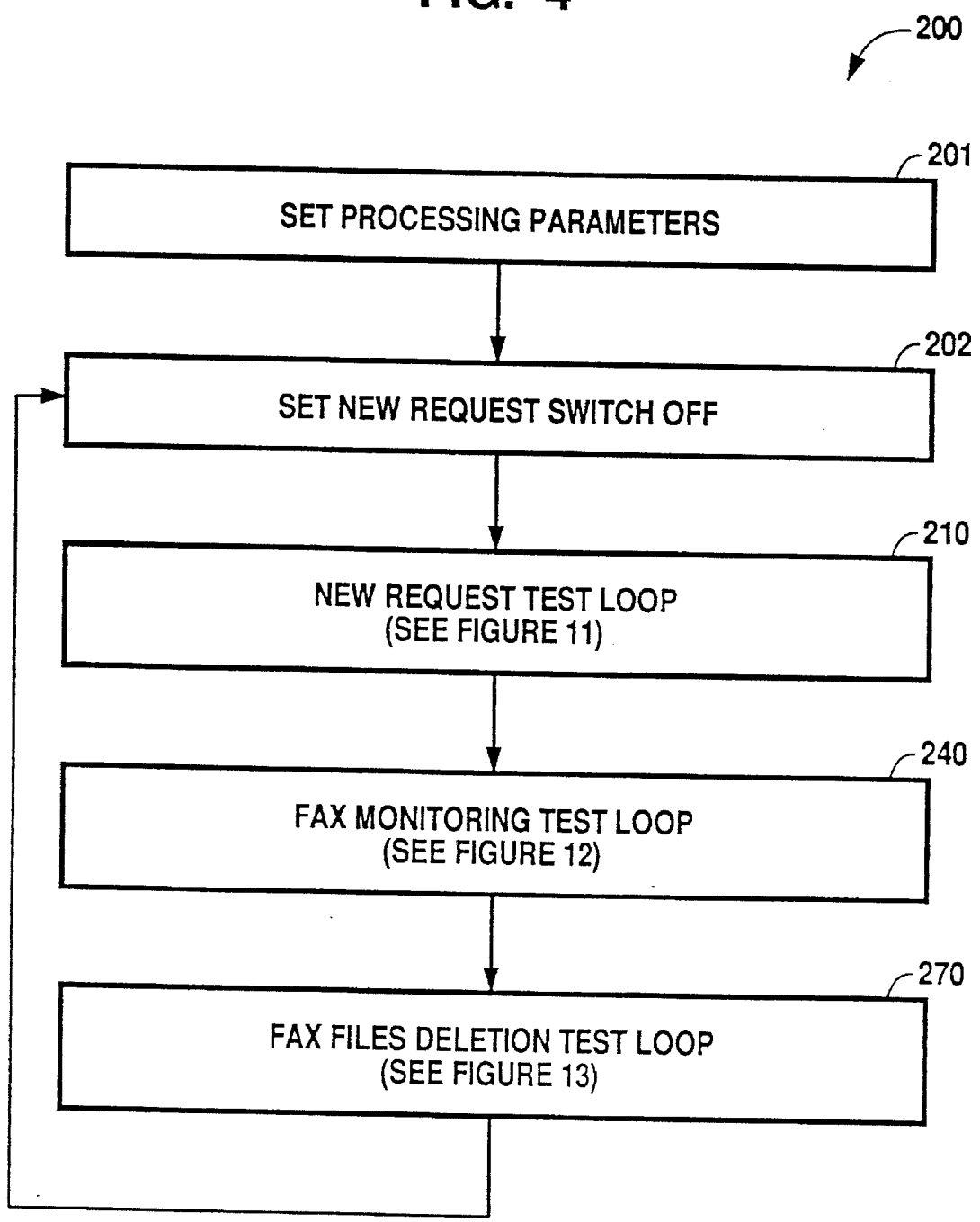
FIG. 4 is an overview flow diagram of the request processing/supervisory control loop.

Request processing and supervisory control loop 200 is outlined in FIG. 4. Processing parameters are set at 201 and the new request switch is set to off at 202. These processing parameters consist of the next sequential number for numbering new requests and the number of facsimile transmission attempts to be made. After step 202, an iterative loop is invoked which comprises three main modules. Step 202 invokes the new request test loop 210 which invokes the fax monitoring test loop 240 which in turn invokes the fax files deletion test loop at 270. After execution of deletion test loop 270, control of the module returns to step 202.

The present invention provides for multiple attempts at facsimile transmission to minimize the impact of busy lines at the facsimile receiving number specified by the user. Fax processing control loop 300 introduced in FIG. 2 is outlined in FIG. 5 as follows. After a pause in processing at 301, the fax processing control loop opens the fax queue database and reads the fax queue database status code at 302. A test is made for new work in the queue at 303. If there is no new work in the queue, a return is made to pause 301, which in the preferred embodiment of the present invention, comprises six seconds. If there is new work in the queue, i.e., the status code has been set to zero, process outgoing call module 304 is invoked. Outgoing fax call module 304 contains two main modules, document queue and transmission module 320 and fax call monitoring module 360. After the sequential invocation of these two modules, process outgoing fax call module 304 invokes update fax queue database module 305. After step 305 updates the fax queue database, the control loop returns to pause processing step 301, previously discussed.

Process incoming call module 105 introduced in FIG. 3 is composed of four main modules. The main service menu and open homes menu module 110, area selection module 130, target price input module 170, and fax number input and validation module 185. Each of these menus contains a prompt/input cycle Menu modules 130, 170, and 185 further include a voice verification request by the system, asking the user to verify his or her entry before proceeding to the next module. These modules will be detailed in FIGS. 6 through 10 as follows:

Referring back to FIG. 3, after the test is made for an incoming call at 101 and an incoming call detected, process incoming call module 105 is invoked. The main service menu and open homes menu module, invoked by step 101 are detailed in FIG. 6. The system answers the incoming call at 111 and presents to the user, via voice processing card 13, the main service menu 112. Menu 112 gives the user two options. The user may either request open home listings at 113 or leave a message at 114. If the user desires to leave a message, the system will record the user's message at 115 and present him with a further message options menu at 116. The user can quit at 117, record a message at 118, or review that message at 119. If the user desires to review the message, the message is played back at 120 and the message option menu 116 is replayed.

If the user opted at 113 for a listing of open homes, open home Faxcts™ menu 121 is invoked. This menu again presents the user with three options. The user may make a request for listings at 122, listen to system instructions at 123, or quit the system at 124. If the user opts to listen to instructions, they are played back at 125, and a menu presenting him with two options is shown at 126. The two options shown are to make a request at 127, or to repeat the instructions at 128. If a user desires to make a request either at 122 or 127, the area selection module 130 shown on FIG. 7 is invoked at step 131.

Figure 7:
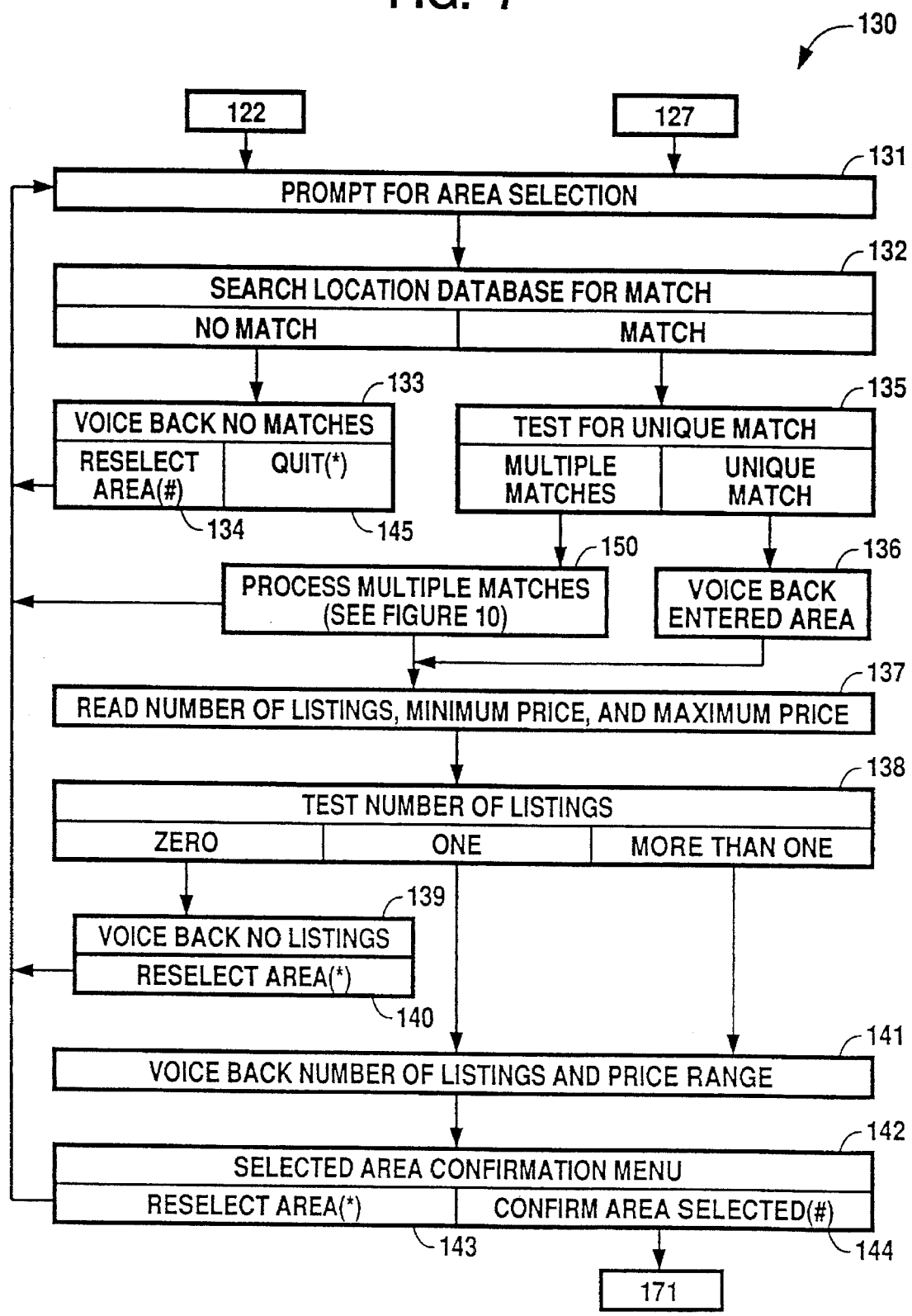
FIG. 7 is a detail flow diagram of the area selection module of the voice processing loop.

Referring to FIG. 7, area selection module 130 is detailed. After a user confirms his intent to make a request at either steps 127 or 122, the system prompts the user to enter via DTMF telephone codes the area where he desires to shop for a home. After the system prompts the user for this information at step 131, a search is made of the location database at 132 for a match with the area the user input. If no match is found, the system responds by informing the user at step 133 that no matches are available and offers him two options. The user can select a different area at 134 or quit at 145. If search 132 finds a match for the user's interest area in the location database, a test is made at 135 to determine if the match between the user's input area and the location database is a unique match or not. If a unique match exists, the system voices back to the user the entered area at 136. If there is more than one match for the input area, the system processes multiple matches at 150. The processing of multiple matches will be discussed in FIG. 10. After voicing back to the user the entered area 136, the system reads the location database to determine the number of listings for the selected area as well as their minimum and maximum prices at 137. The listings are tested at 138 for total number. If there are no listings for the given area, a voice message is sent back to the user stating that there are no listings at 139 and prompting the user to re-select areas at 140. If there are one or more listings for the requested area, the system voices back the number of listings and their price range at 141 before confirming the selected area at 142. The user has the options of re-selecting the area at 143 or confirming the area selected at 144. If the area selected is confirmed at 144, the target price input module 170 is invoked at 171. If the user selects a new area at 143, the systems loops back to step 131.

Figure 8:
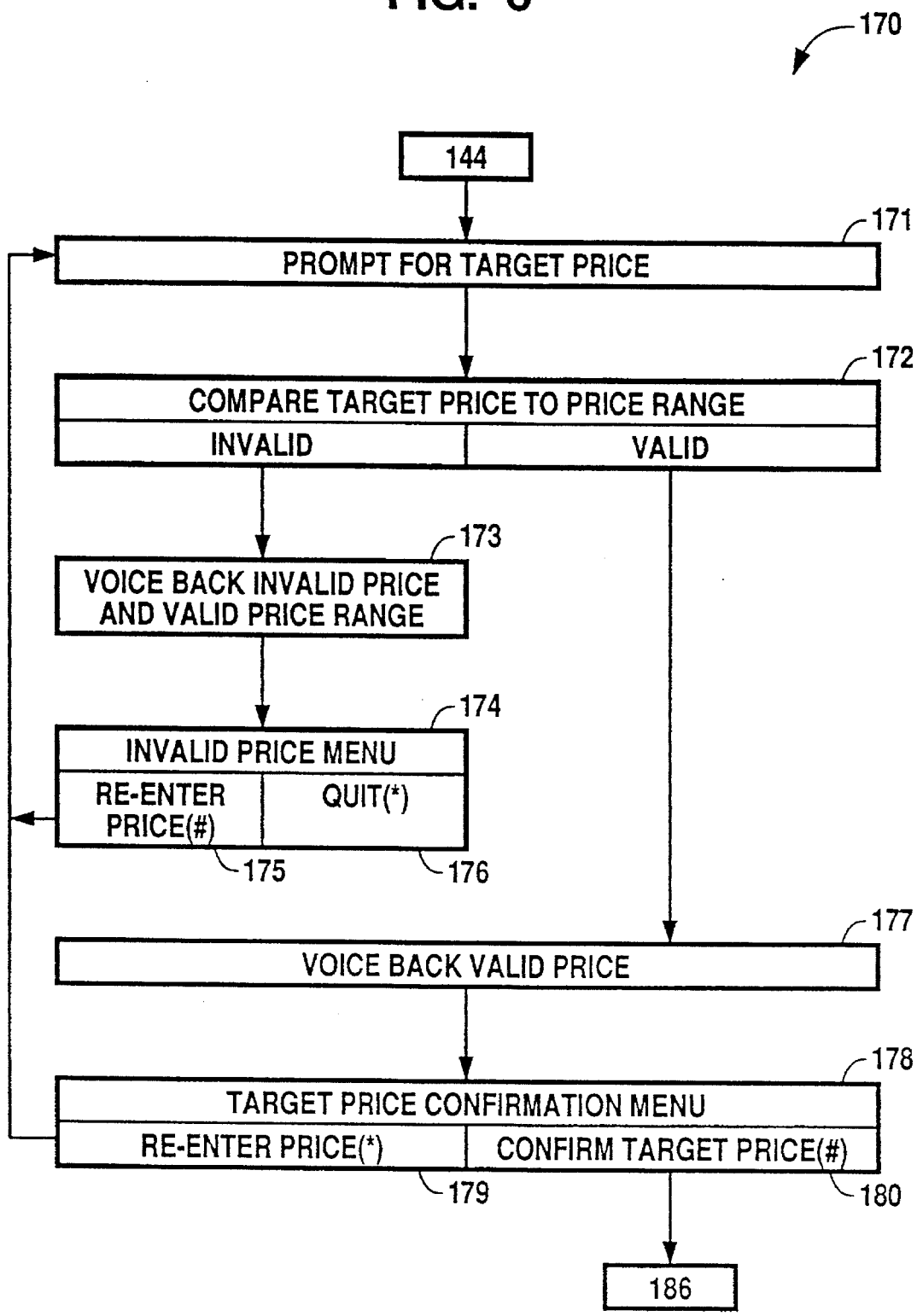
FIG. 8 is a detail flow diagram of the target price input module of the voice processing loop.

Target price input module 170 is detailed at FIG. 8. After invocation by step 144, module 170 prompts the user to input a target price at 171. The system then compares the target price input by the user to the price range in the location database at 172. If the target price is invalid, i.e., it falls outside the price range stored in the database, the system voices back a statement that the target price input is invalid and quotes the valid price range at 173. The system then presents the user with an invalid price menu at 174 which gives the user the options of either reentering the price at 175 or quitting at 176. If the user opts to reenter a new target price, step 175 loops back to step 171. If the target price input at 172 is a valid figure, the system voices back the valid price at 177 and presents the user, again via the voice processing board, a target price confirmation menu at 178. The user has the option of reentering the target price at 179 or confirming the target price at 180. If the user opts to reenter a new target price, step 179 loops back to step 171. Once the target price is confirmed at step 180, the fax number input and validation module 185 is invoked at 186.

Figure 9:
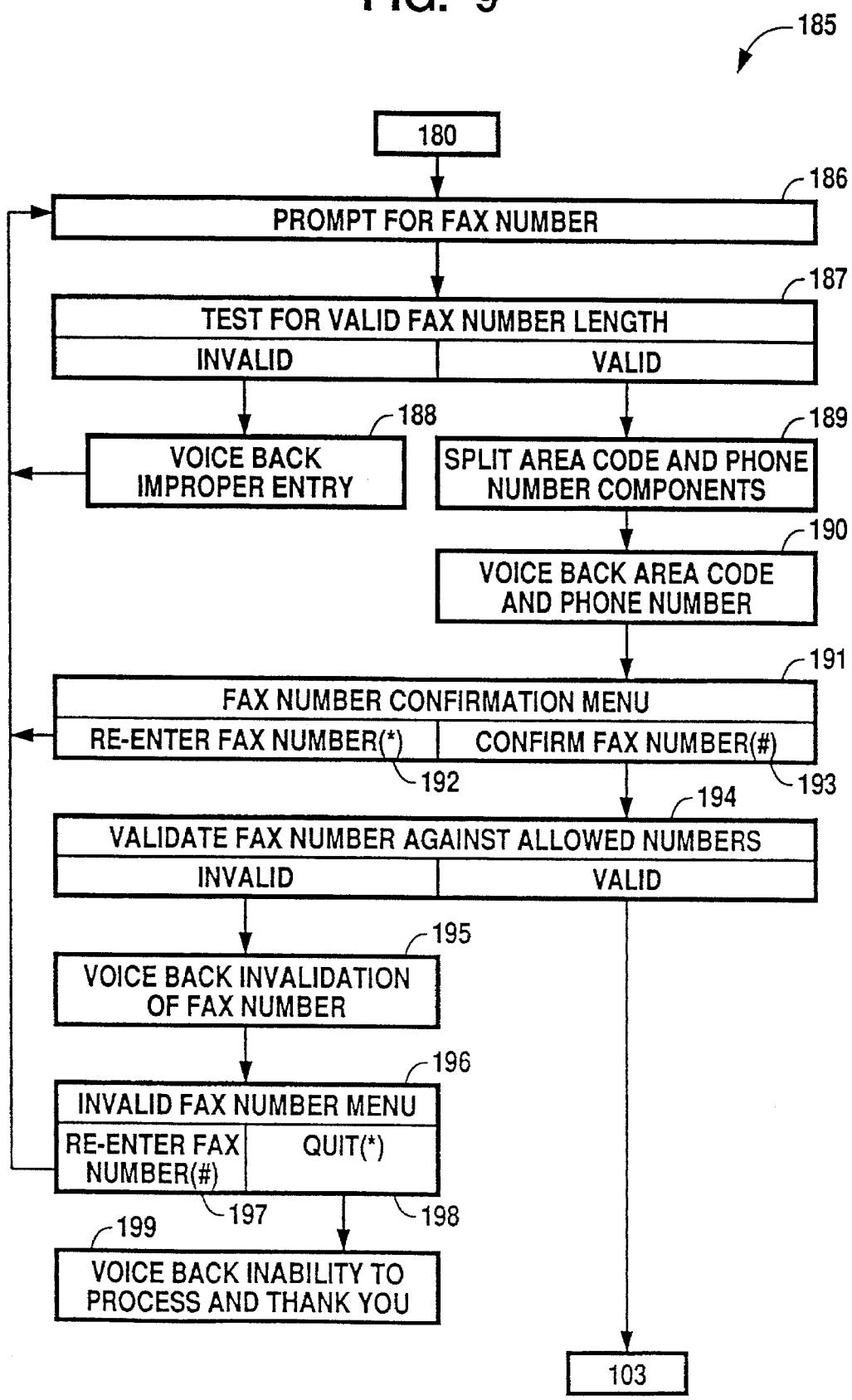
FIG. 9 is a detail flow diagram of the fax number input and validation module of the voice processing loop.

Detailed in FIG. 9 is fax number input and validation module 185. After invocation by target price input module 170, the system prompts the user for a fax number at 186 and tests the fax number input by the user as being a valid fax number with respect to length at 187. If the fax number length is invalid, the system voices back a prompt to the user to input a proper number at 188 and loops back to prompt 186. If the user has input a valid fax number at 187, the system splits the phone number into an area code and phone number components at 189 and voices back both the area code and phone number at 190. After voice back 190, the system voices a fax number confirmation menu at 191 to the user which allows the user once again to reenter the fax number at 192 or to confirm the user's fax number at 193. If the user opts to re-enter the fax number, the system loops back to 186 once again. If the user confirms the previously input fax number, the system validates the input fax number against a database of allowed numbers at 194. If the fax number input is an invalid number, i.e., a system operator has input this number as being invalid for accessing the system, the system will voice back to the user the invalidation of the fax number at 195 and present him with an invalid fax number menu at 196. Step 196 gives the user the option of reentering a fax number at 197, once again looping back to step 186, or quitting the system at 198. If the user opts to quit the system, the system will voice back the inability to process the user's request and thanks the user prior to signing off at 199. If step 194 validates the fax number against allowed numbers, the system updates the request queue database at 103.

Referring back to FIG. 3, step 103 updates the request queue database with the location record file number, the target price, the fax number, and the duration of the call. After the request queue has been updated at 103, the system voices back to the user a closing statement and returns control to test for incoming call at 101.

Figure 10:
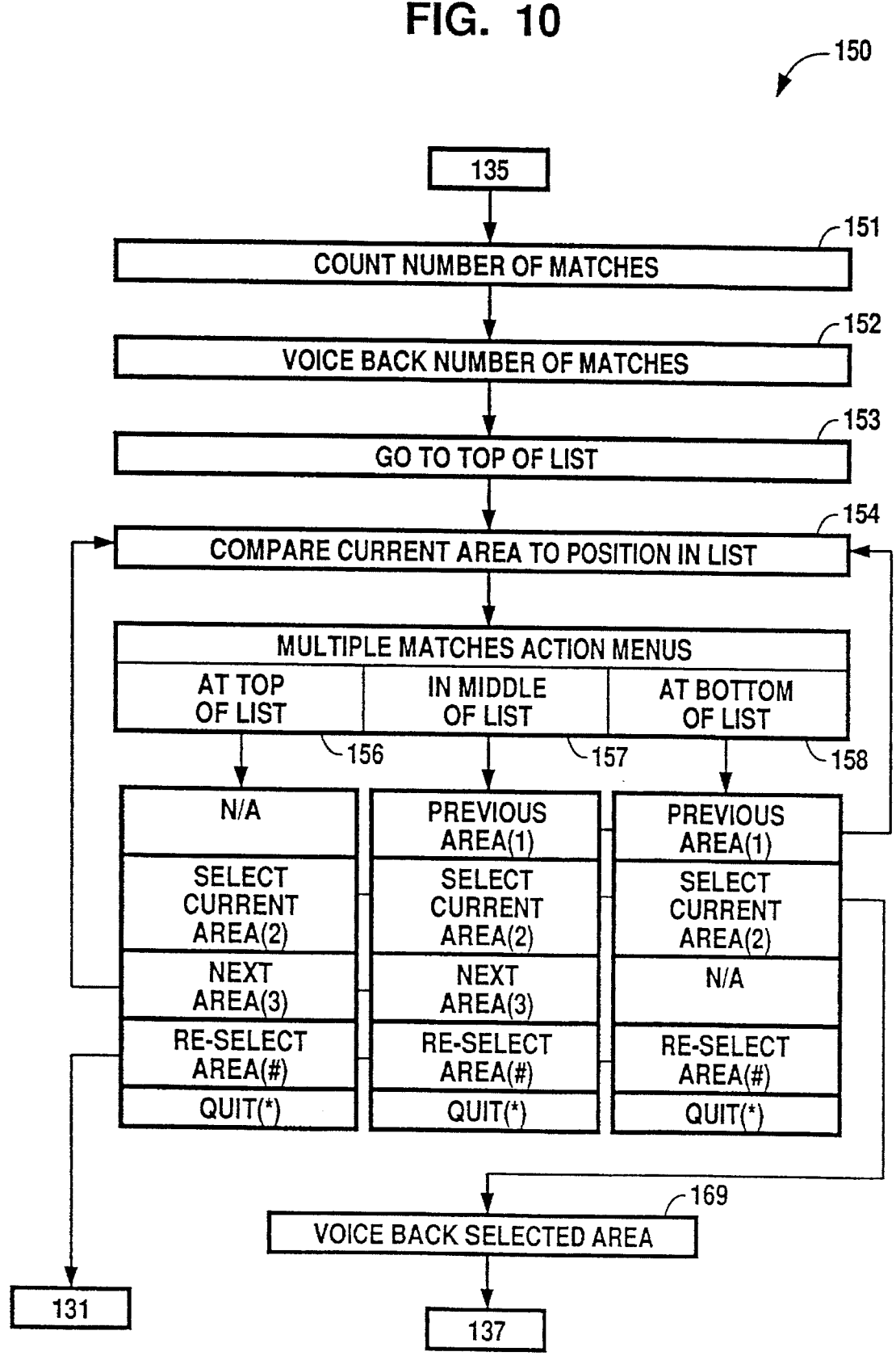
FIG. 10 is a detail flow diagram of area selection—process multiple matches module of the voice processing loop.

Process multiple matches module 150 previously outlined at FIG. 7 is detailed in FIG. 10. After the test for unique match at 135 indicates that there are multiple matches to the user's input, the system counts the number of matches in the area location database at 151 and voices back to the user that number at 152. At step 153, the system moves to the first record in the area location database matching the user's input, which represents the top of a list of areas to be presented to the user one area at a time. At any time during the processing of this list, the user has the option to reselect a new area which would pass control back to step 131 previously discussed in FIG. 7. At step 154, the current record is compared to determine its relative position in the list to be presented. If the current record is at the top of the list, the user is presented the option at step 156 to select the current area or move to the next area in the list. If the current record is at the bottom of the list, the user is presented the option at step 158 to select the current area or move to the previous area in the list. If the current record is in the middle of the list, the user is presented the option at step 157 to select the current area, move to the next area in the list, or move to the previous area in the list. If the user chooses to move to the next record at steps 156 or 157, the system moves to the next record in the list and loops back to step 154. Likewise, if the user chooses to move to the previous record at steps 157 or 158, the system moves to the previous record and loops back to step 154. If the user selects the current area at steps 156, 157, or 158, the system voices back to the user the selected area at 169. Control then passes back to step 137 previously discussed in FIG. 7.

Figure 11:
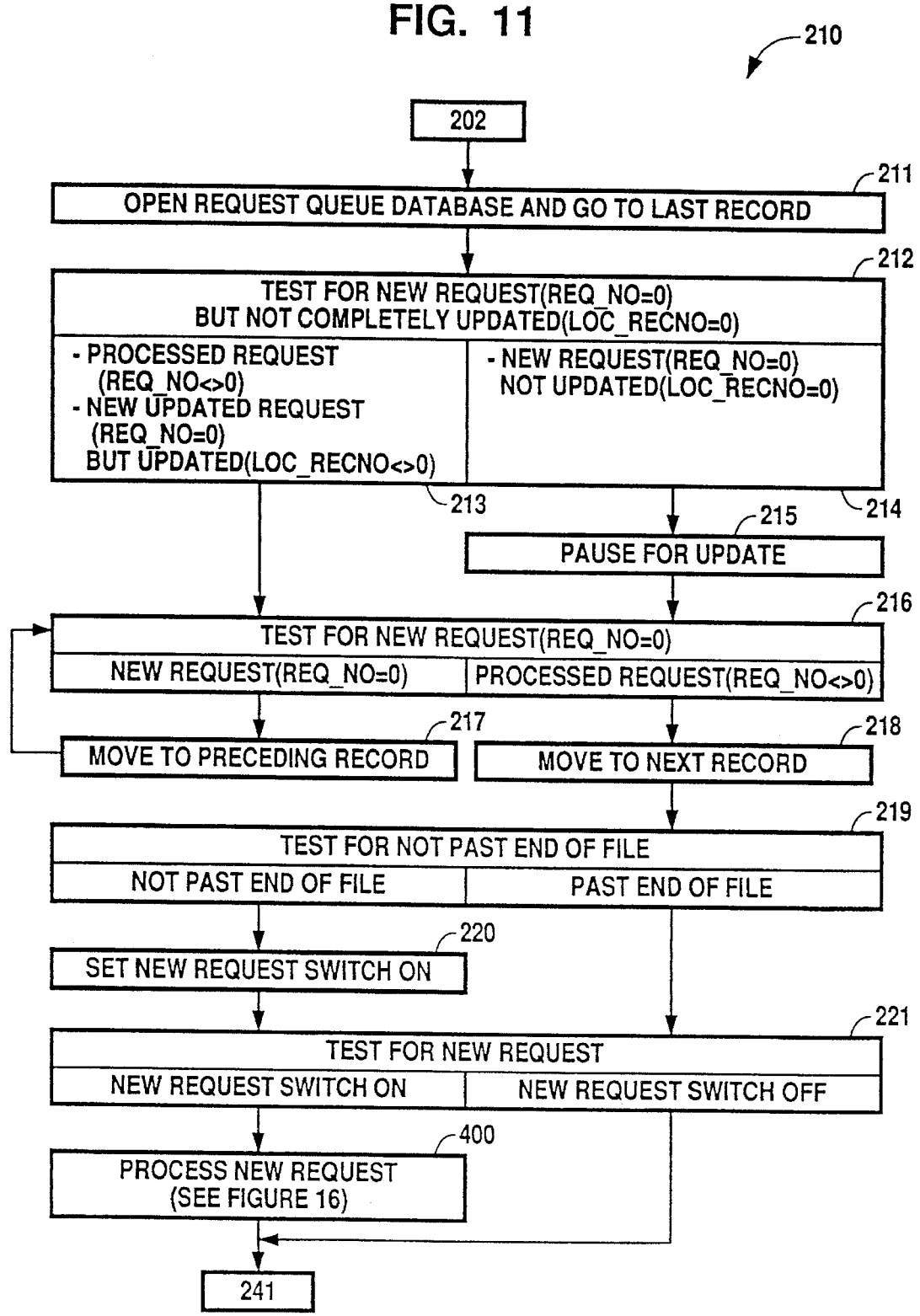
FIG. 11 is a detail flow diagram of the new request test loop of the request processing/supervisory control loop.

The new request test loop previously outlined in FIG. 4 is detailed in FIG. 11. After the system sets the new request switch off at 202, the system opens the open request queue database and goes to the last record thereof at 211, shown at FIG. 11. A test is made at 212 to determine if the last record constitutes a new request, but has not been completely updated. This corresponds to a record where both the request number and the location file record number indicating the selected area are both still zero. If the request is a new request which has not yet been updated, the system pauses for the location file record number to be updated at 215 and then tests for a new request again at 216. If the request is a new request at step 216, the system moves to the preceding record at 217 and then loops back to step 216. If the record tested at step 216 is a processed request, the system moves to the next record at 218 and tests that this record is not past the end of the file at 219. If test step 219 determines the request is not past the end of the file, step 220 sets the new request switch to on before step 221 tests for a new request. If the test at 219 determines that the request is past the end of a file, the system tests for a new request at 221 without setting the new request switch to on. If test step 221 determines the new request switch is set to on, the new request is processed by process new request module 400. After the new request has been processed at 400 or if test 221 determines the new request switch is off, system execution passes to the fax monitoring test loop 240 at step 241.

Figure 12:
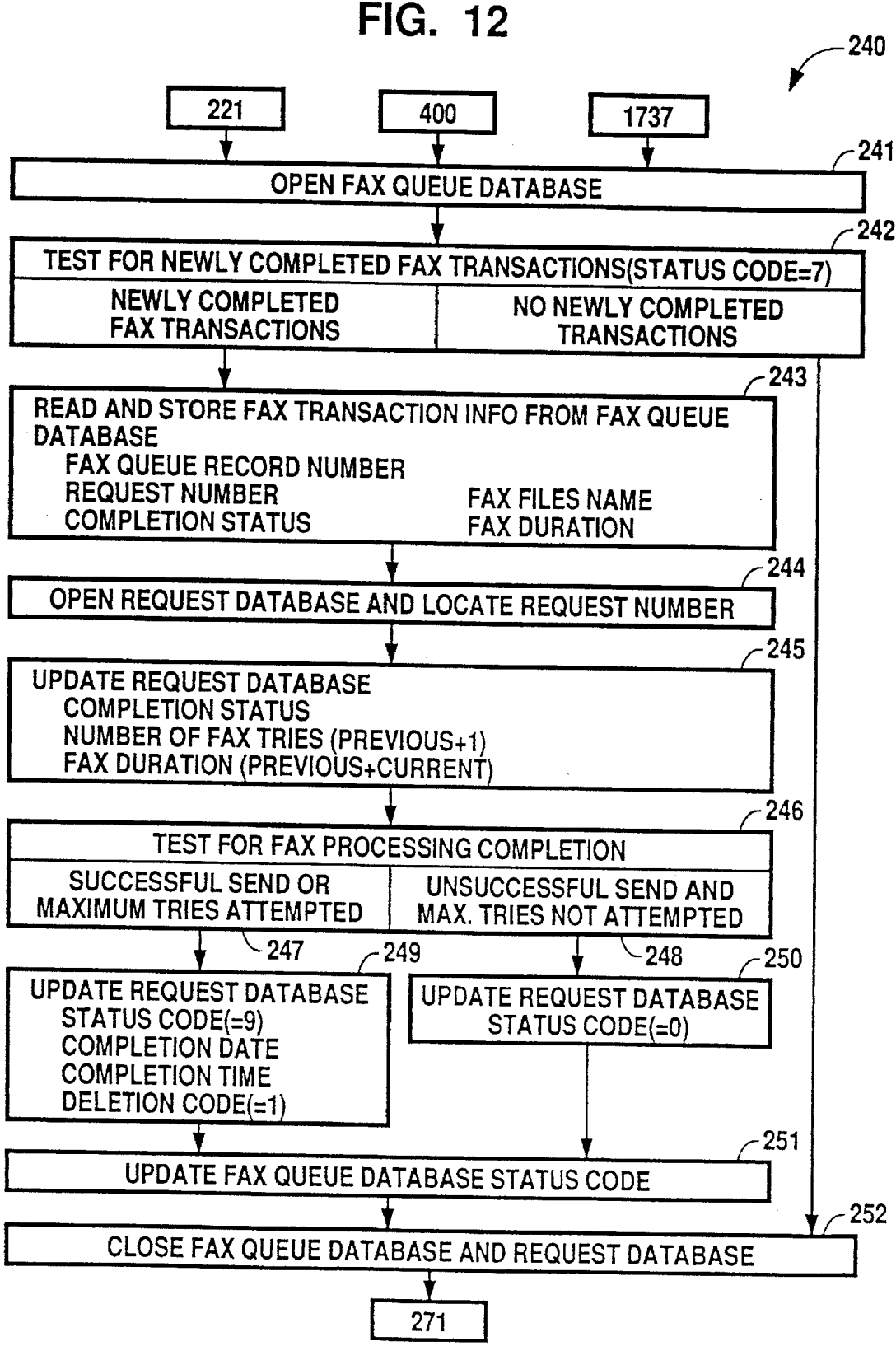
FIG. 12 is a detail flow diagram of the fax monitoring test loop of the request processing/supervisory control loop.

Fax monitoring test loop 240 is detailed in FIG. 12. After completion of the new request test loop 210, fax monitoring test loop 240 opens the fax queue database at 241 and tests for newly completely fax transactions at 242. If there are no newly completed transactions, fax monitoring test loop 240 closes the fax queue database and request database at 252 and moves to the fax files deletion test loop at 271. If there are newly completed fax transactions in the fax queue database, fax monitoring test loop 240 reads and stores as processing variables fax transaction information from the fax queue database at step 243. This information includes the fax queue record number, request number, fax files name, completion status, and fax duration. Step 244 opens the request database and locates the request number. At step 245 the request database is updated to reflect the current request, including the request's completion status, the number of fax tries and the fax duration. A test is then made at 246 to determine if fax processing is completed. If the fax was successfully transmitted, or the maximum number of fax tries has been attempted at 247, the update request database is updated at 249 to include the status code set to 9, the completion date, the completion time, and a deletion code being set to 1. If the fax transmission was not successfully sent and the maximum number of fax tries was not attempted, the request database is again updated to reflect pending work. In this case, the status code is set to zero. The fax queue database is updated at 251 to reflect the recently set status code and the fax queue database and request databases are closed again at 252 and the fax files deletion test loop executed at 271.

Figure 13:
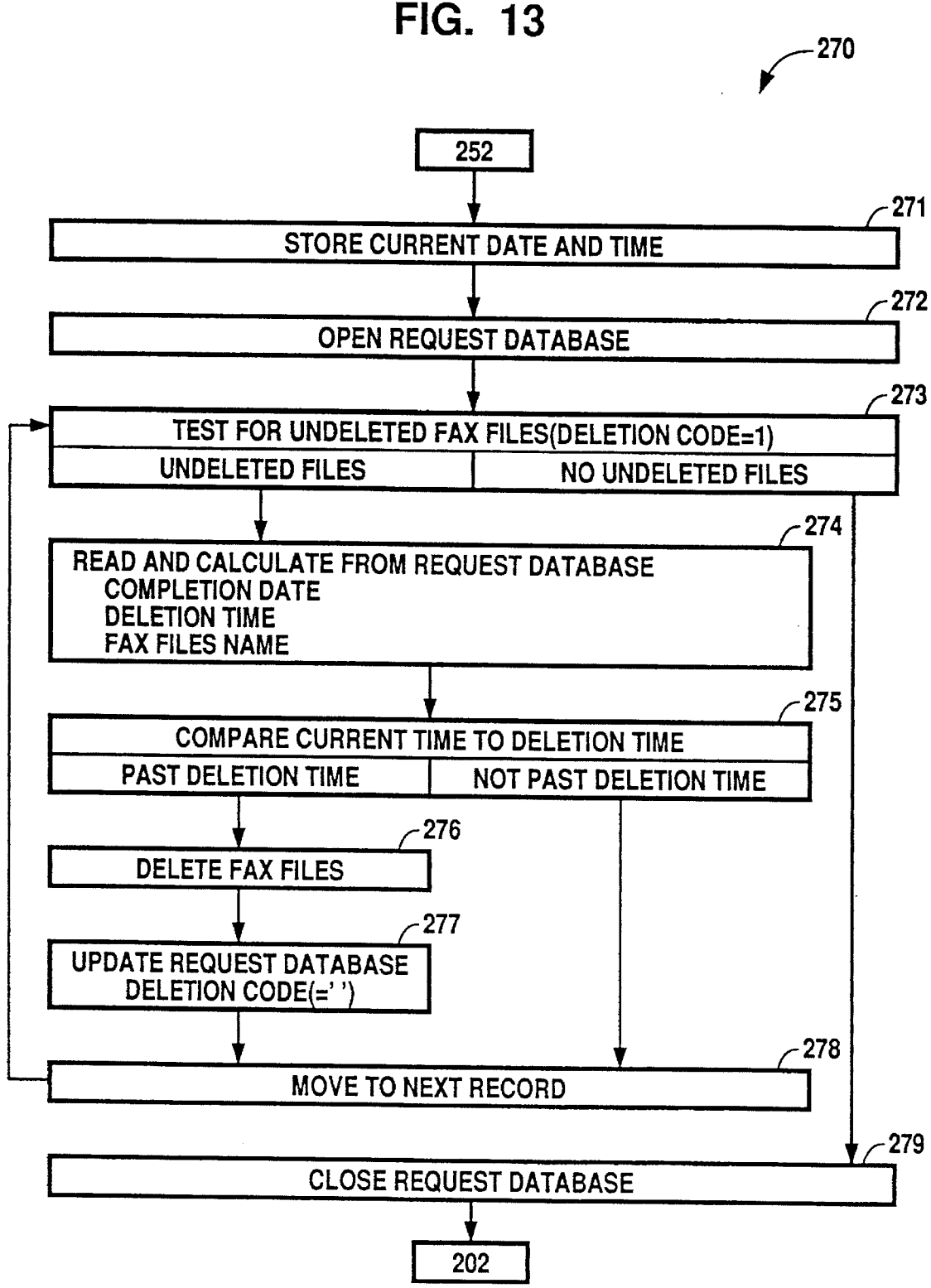
FIG. 13 is a detail flow diagram of the fax files deletion test loop of the request processing/supervisory control loop.

Fax files deletion test loop 270 is detailed in FIG. 13. After completion of the fax monitoring test loop 240, the fax files deletion test loop 270 stores the current date and time to processing variables at 271 and opens the request database at 272. A test is made for undeleted fax files at 273. If there are no undeleted files, the request database is closed at 279. If undeleted files are detected, the request database is read and certain calculations are made at 274. Specifically, the completion date, deletion time, and fax files name are calculated. The comparison is made at 275 between the current time and the deletion time. If the current time is past deletion time, the fax files are deleted at 276 and the request database deletion code is set to a null value at 277. The next record is checked at 278, which loops back to step 273. If the comparison at 275 between the current time and the deletion time determines that the current time is not past the deletion time, step 278 is immediately invoked. The iterative checking of records from step 273 to 278 is conducted until the test for undeleted fax files at 273 determines that no undeleted files remain. At that time, the request database is closed at 279 and control is passed back to the request processing and supervisory control loop at step 202, which sets the new request switch to off.

Figure 5:
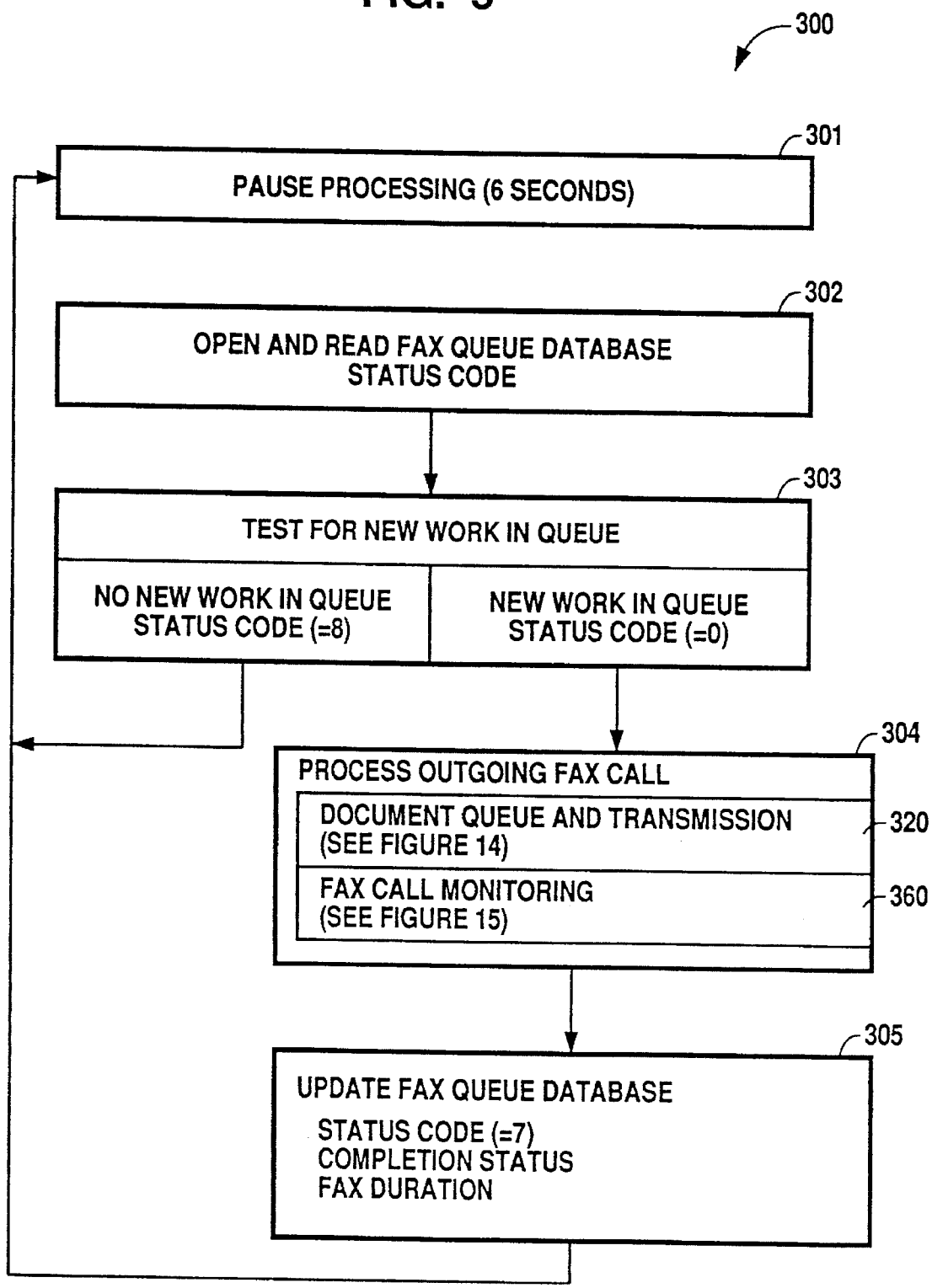
FIG. 5 is an overview flow diagram of the fax processing control loop.
Figure 6:
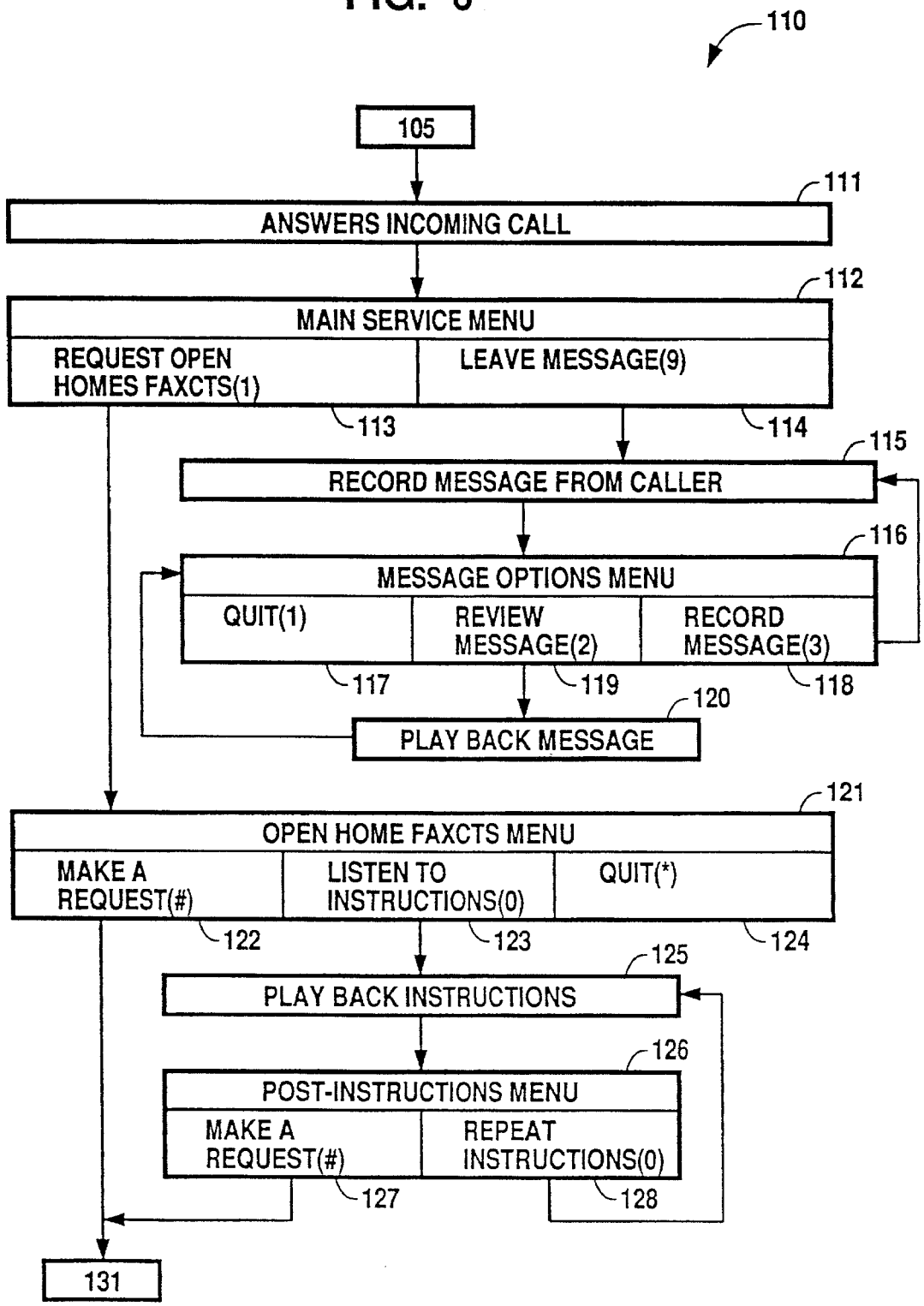
FIG. 6 is a detail flow diagram of the main service and open home menu module of the voice processing loop.

After processing the user's request, the fax processing control loop 300 previously outlined in FIG. 5 detects new work in the queue and invokes outgoing fax call module 304. The two principal modules of outgoing fax call module 304 are document queue and transmission 320 and fax call monitoring 360.

Figure 14:
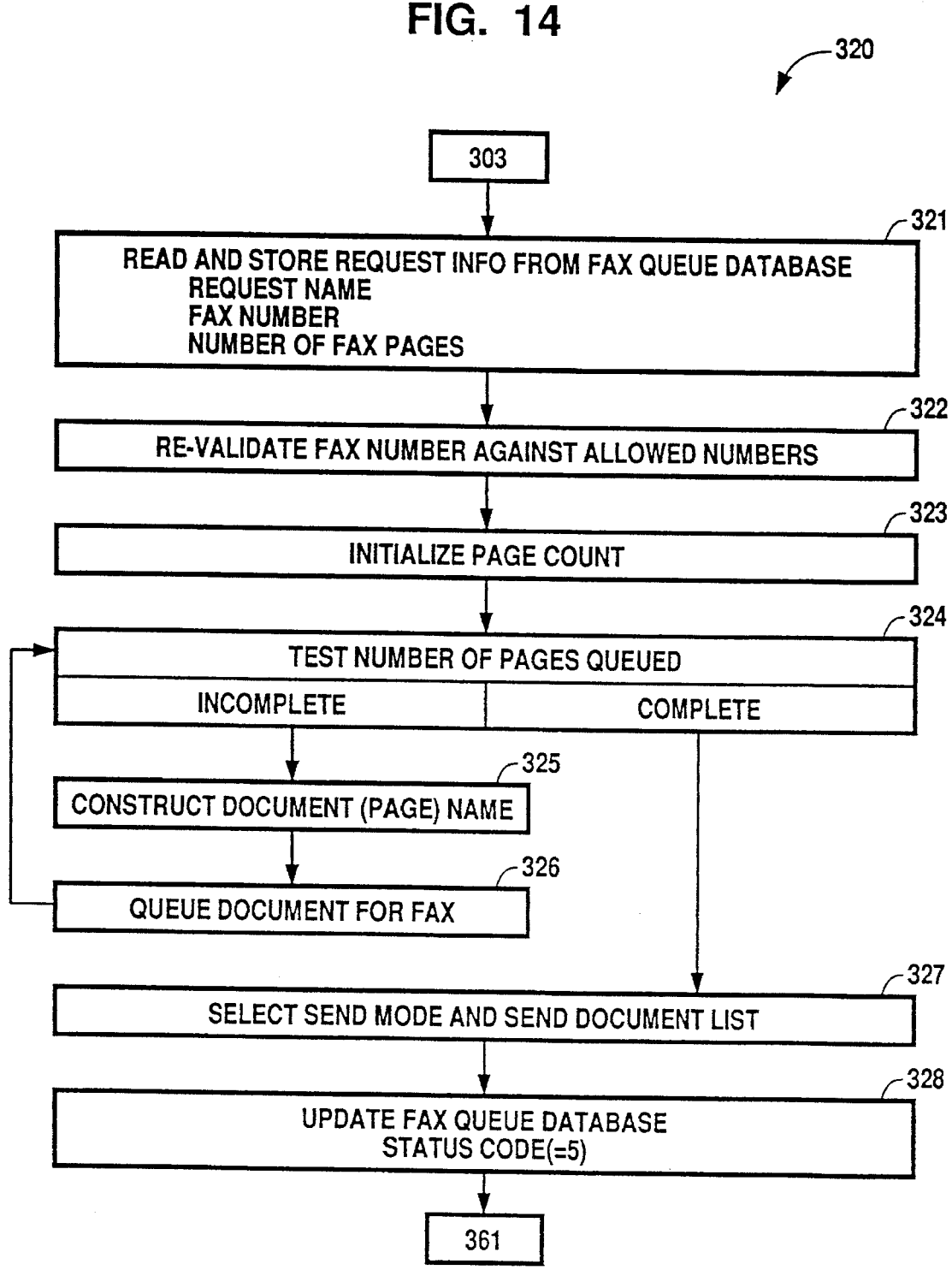
FIG. 14 is a detail flow diagram of document queue and transmission module of the fax processing control loop.

Document queue and transmission module 320 is detailed in FIG. 14. Document queue and transmission module 320 is invoked by the test for the new work in queue 303 and reads and stores request information from the fax queue database at 321. This information includes the request name, the fax number and the number of fax pages. At 322, the module re-validates the fax number against allowed fax numbers. At 323, the page count is initialized and the number of pages queued is tested at 324. If the number of pages queued is incomplete, the document name is constructed at 325 and the document file is queued for facsimile transmission at 326. Step 326 loops back to step 324 until the number of pages queued is determined to be complete. Once complete, step 327 selects the send mode and sends the document list before invoking step 328. Step 328 updates the fax queue database and sets the status code to 5. Control of fax processing is then passed to the fax call monitoring module 360 at step 361.

Figure 15:
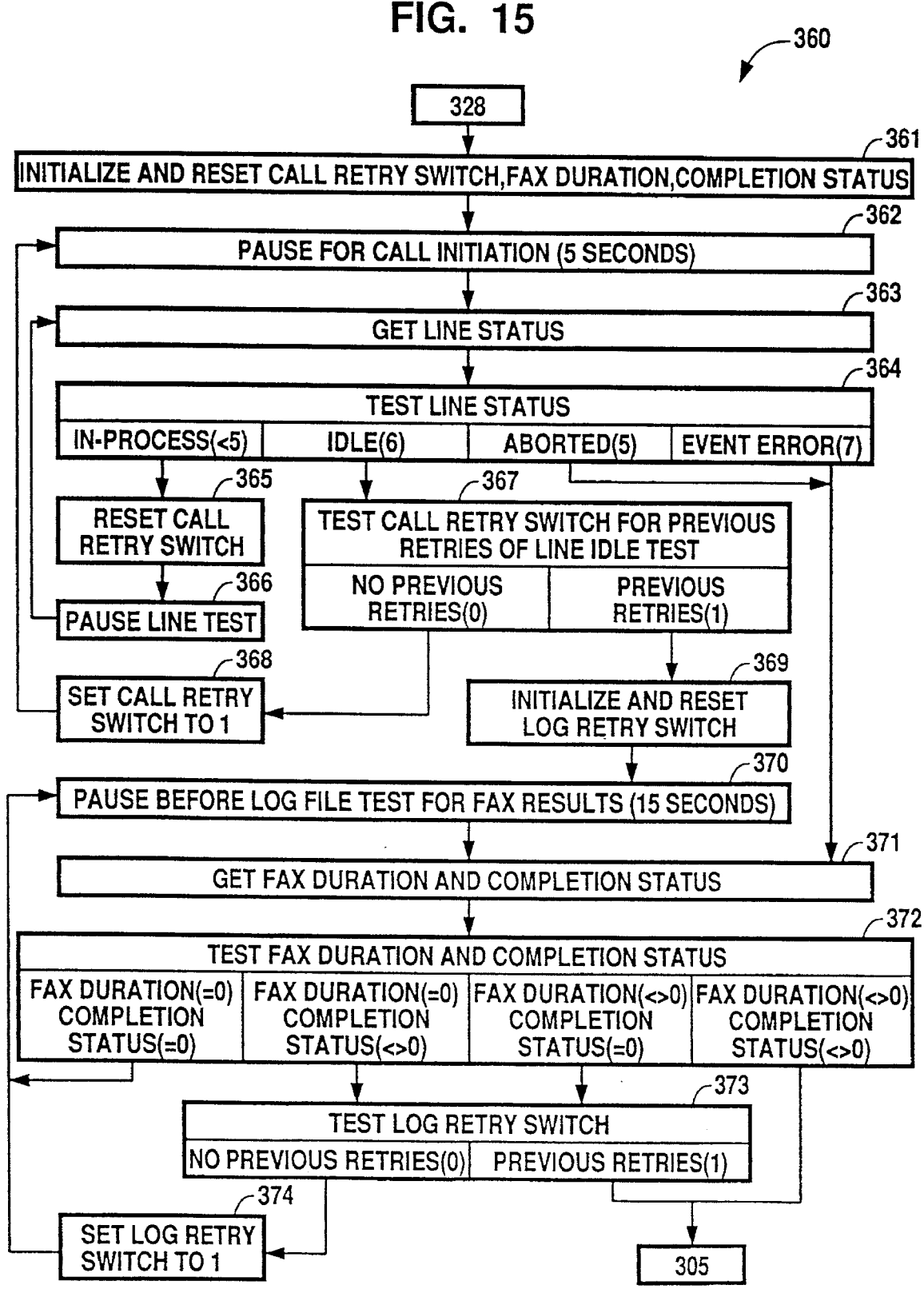
FIG. 15 is a detail flow diagram of fax call monitoring module of the fax processing control loop.

Fax call monitoring module 360 is detailed in FIG. 15. At step 361, the call retry switch, fax duration, and completion status variables are initialized and reset. A pause is made at 362 for call initiation. At 363 the line status is obtained, and then tested at 364. If the line status test indicates "in process", the call retry switch is reset at 365, and the line test is paused for 10 seconds at 366 before looping back to get line status at step 363. If line status test 364 indicates idle, the call retry switch is tested for previous retries of the line idle test at 367. If no previous retries are encountered, the call retry switch is set to 1 at step 368 before looping back to get line status at step 363. If test step 367 determines the previous retries switch to be set to 1, a log retry switch is initialized and reset at step 369. After initializing step 369 is conducted, a pause is made for 15 seconds at step 370 before testing the log file for fax results. Following the pause at 370, the fax duration and completion status are obtained from the log file at 371, and a test made at 372 to test the fax duration and completion status. If the fax duration is zero and the completion status is zero, indicating the log file has not been updated, a loop returns execution to step 370. If the fax duration is zero and the completion status is not zero, or if the fax duration is not equal to zero and the completion status is equal to zero, (indicating a successful send) the log retry switch is tested at 373. If no previous retries are encountered, the log retry switch is set to 1 at 374 and a loop returns execution to step 370. If the fax duration is not equal to zero and the completion status is not equal to zero, or if log retry switch test step 373 determines the previous retries switch to be set to 1, the update of the fax queue database step at 305 previously discussed in FIG. 5 is invoked. Referring back to line status test step 364, if a fax error code 7 or fax aborted code 5 is detected, execution passes to step 371, get fax duration and completion status.

The new request process module 400, introduced in the new request test loop as outlined in FIG. 11, is outlined in FIG. 16. Process new request module 400 is comprised of six sequentially invoked modules: Update request files 410; extract listings module 490; create listings page module 800; center map data module 900; create map pages module 1250; and module 1720 which performs several files management functions. Update request files 410 is invoked by step 221 preceding. Update request files 410 invokes extract listings module 490. Extract listings 490 is further comprised of three sequentially invoked modules: initialize parameters module 500, which also processes requests consisting of four listings or less; processing for more than four listings module 600; and extract and update databases module 700. After execution of module 490, execution passes to create listings page module 800, which in turn invokes center map data module 900. Center map data 900 is comprised of five subordinate modules. Module 901 initializes and creates map level 3 database and initializes map level 2 database. Module 970 creates map level 2 database, which contains the detail map center points. Module 1030 updates map level 3 database with detail map center points and initializes map level 1 database. Module 1050 creates map level 1 database, which contains the area map center points. Module 1160 updates map level 2 database with the area map center point and creates the individual request map data file. Sequentially invoked after center map data module 900 is create map pages module 1250, comprised of three subordinate modules: initialize files/set up functions module 1260; main processing loop 1290; and complete and close files module 1700. After the map pages are created, module 1250 invokes module 1720, which converts PostScript™ files to PCX format, renames and copies PCX files, deletes intermediary working files, and updates fax queue and request databases. The several component modules of the process new request module are discussed in detail as follows:

Update request files module 410 is detailed in FIG. 17. After being invoked by the new request test loop step 221 module 410, update request files, is invoked at step 411. Step 411, which updates the request queue database with the request number, invokes step 412, which reads and stores from the request queue database the call duration, location file record number, target price, and fax number of the request before invoking step 413. Step 413 closes the request queue database and invokes step 414, which updates the request database with the following information from the request queue: request date, request time, call duration, location file record number, target price, and fax number. After updating the request files, module 410 invokes module 500, extract listings—initialize parameters/processing for four listings or less.

Figure 18:
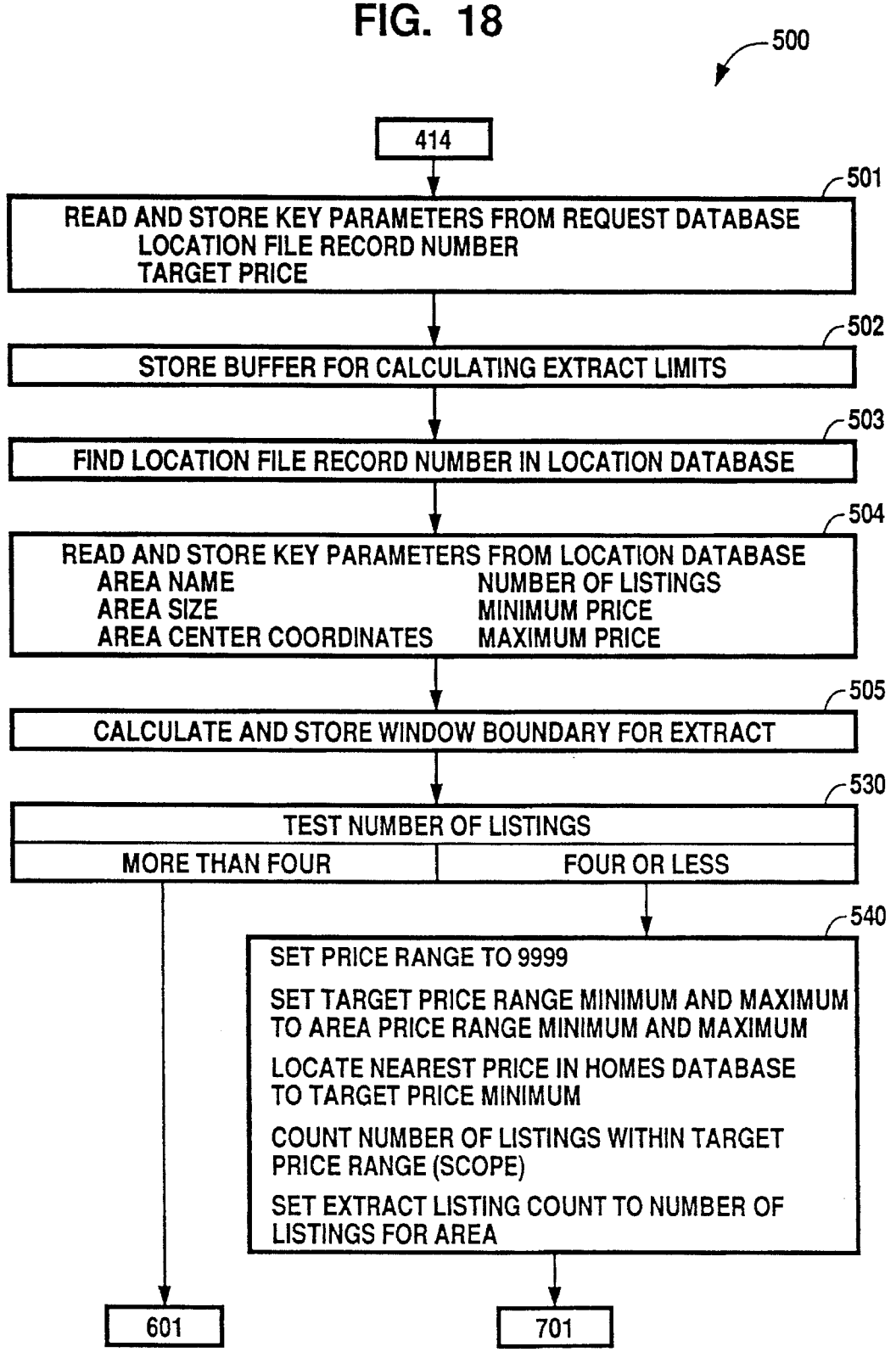
FIG. 18 is a detail flow diagram of the extract listings—initialize parameters—process for four listings or less module of the process new request module.

Module 500, initialize parameters/processing for four listings or less, is detailed in FIG. 18. After being invoked by step 414, step 501 reads and stores key parameters from the request database, specifically the location file record number and target price. Once this information is stored, the buffer used for calculating extract limits is stored at step 502. Extract limits are used to determine the geographical or locational scope of the extract. Step 503 finds the location file record number in the location database. Step 503 then invokes step 504 which reads and stores key parameters from the location database; specifically, the area name, area size, area center coordinates, number of listings, minimum price, and maximum price are stored at this step. Step 504 invokes step 505 which calculates and stores the window boundaries for the extract. Window boundaries define the geographical or locational scope of the extract. Step 505 invokes step 530 to test the number of listings. If there are four or fewer listings in the homes database for the selected area, step 540 is invoked by step 530. Step 540 sets several variables: the price range factor is set to 9999 and the target price range minimum and maximum are set to the area price range minimum and maximum. The nearest price in the homes database to the target price minimum is located; the number of listings within the target price range is counted; and the extract listing count is set to the number of listings for the area. After this setting, step 540 invokes extract and update databases module 700 at step 701. If test step 530 determines the number of available listings exceeds four, processing module 600 is invoked at step 601 which processes requests when there are more than four available listings.

Figure 19:
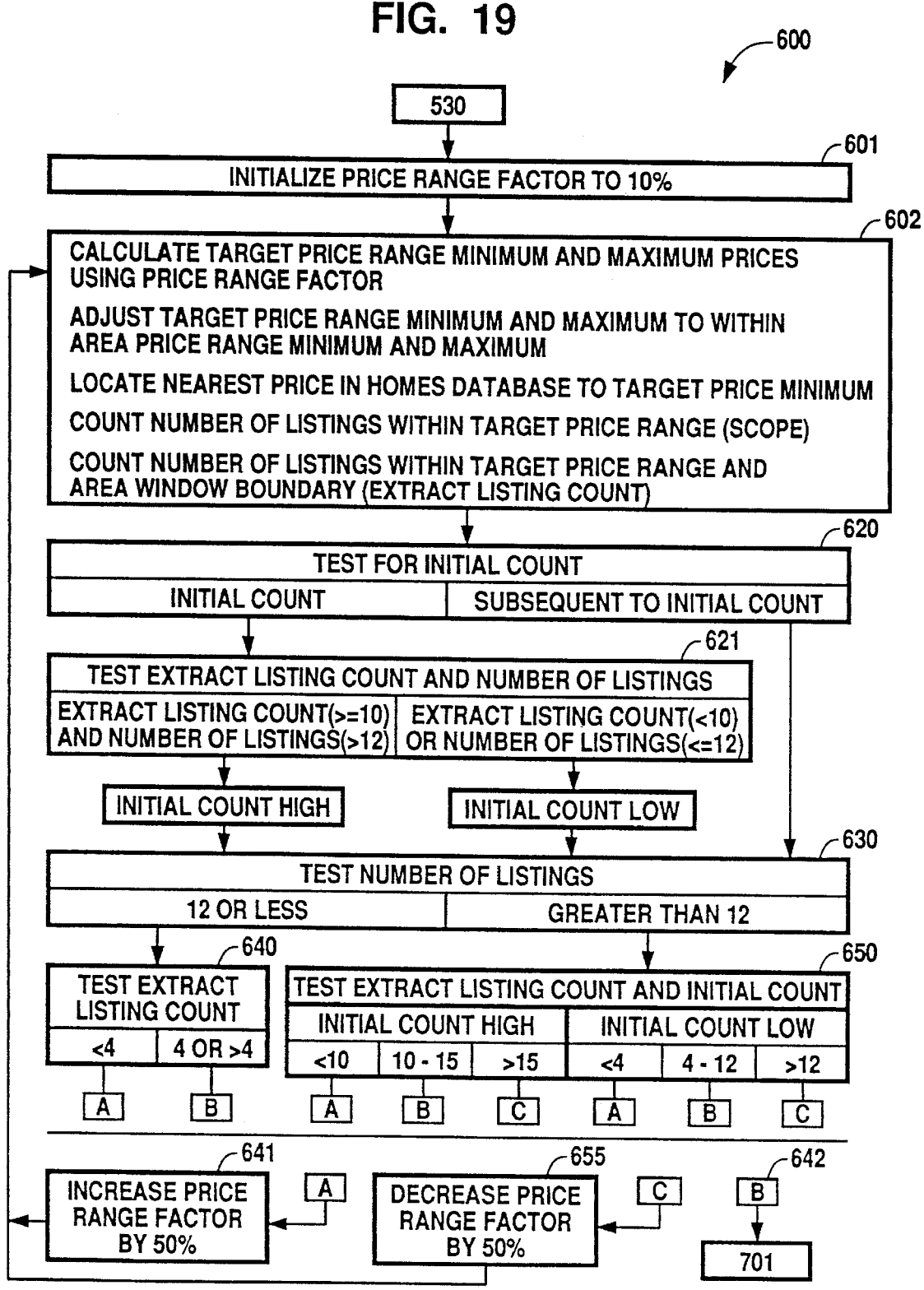
FIG. 19 is a detail flow diagram of the extract listings—processing for more than four listings module of the process new request module.

Module 600, processing for more than four listings, is detailed in FIG. 19. After being invoked by step 530 of the preceding module, the purpose of this module is to provide a reasonable number of listings for a user's request. It is desirable that the number of listings provided to the user fall between the range of a minimum of four and a maximum of 15. To accomplish this goal, the initial price range factor is set to plus or minus 10% of the target price input by the user at step 601. After which, step 602 is invoked, which calculates the target price range minimum and maximum prices using the price range factor, adjusts the target price minimum and maximum to within the area price range minimum and maximum, locates the nearest price in the homes database to the target price minimum, counts the number of listings within the target price range, and counts the number of listings within the target price and area window boundary, i.e., the extract listing count. After these computations are completed, at step 620 a test for initial count is made. If the count provided is an initial count, step 621 tests the extract listing count and the number of listings. If the extract listing count is greater than or equal to 10 and the number of listings is greater than 12, the initial count is set to high. If the extract listing count is less than 10 or the number of listings is less than or equal to 12, the initial count is set to low. After test step 621 tests the initial count, or if test step 620 determines that this effort is subsequent to the initial count, test step 630 tests the number of listings. If the number of listings is 12 or less, a test is made at 640 of the extract listing count. If the extract is less than 4, the price range factor is increased by 50% at step 641 and execution of the program returns to step 602. If the extract listing count is more than 4 at step 640, module 700 extract and update databases, is invoked at step 642. If test step 630 determines the number of listings to be greater than 12, a test of the extract listing count and the initial count is made at step 650. If test step 650 determines that the initial count is high and the extract listing count is less than 10, step 641 is again invoked. If the initial count is high and the extract listing count falls in the range 10 to 15, step 642 is again invoked. If the initial count is high and the extract listing count is greater than 15, the price range factor is decreased by a factor of 50% at step 655 and execution of the program is again returned back to step 602. If test step 650 determines that the initial count is low and the extract listing count is less than 4, step 641 is again invoked. If the initial count is low and the extract listing count falls in the range 4 through 12, step 642 is again invoked. If the initial count is low and the extract listing count is greater than 12, step 655 is again invoked.

Figure 20:
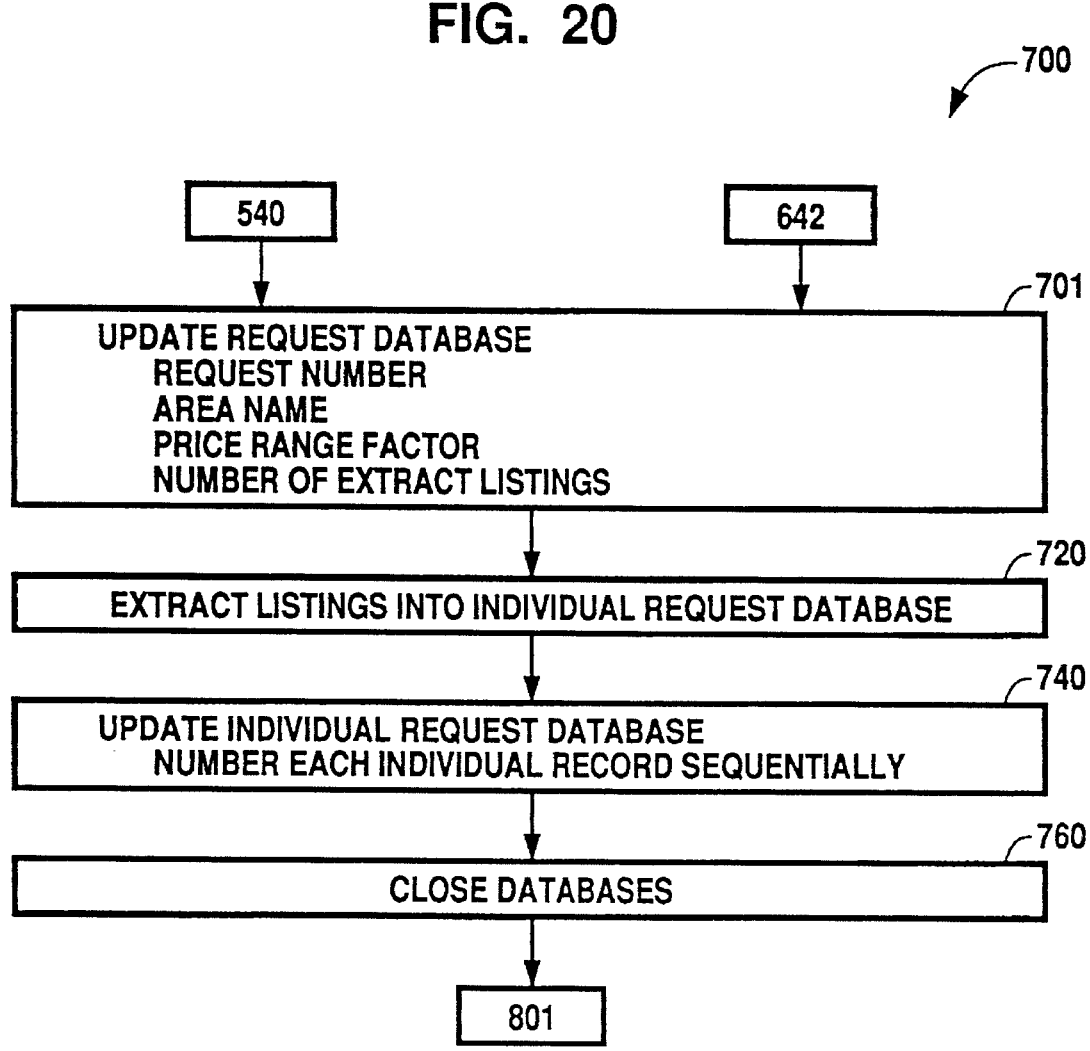
FIG. 20 is a detail flow diagram of the extract listings—extract and update databases module of the process new request module.

Invoked by step 642 of module 600, extract and update databases module 700 is detailed in FIG. 20. Invoked at step 701, this module updates the request database with the request number, area name, price range factor, and number of extract listings. At step 720 listings are extracted into the individual request database. At step 740, the individual request database is updated and each individual record therein numbered sequentially. At step 760, the databases are closed and module 800, which creates the listings page, is invoked.

Figure 21:
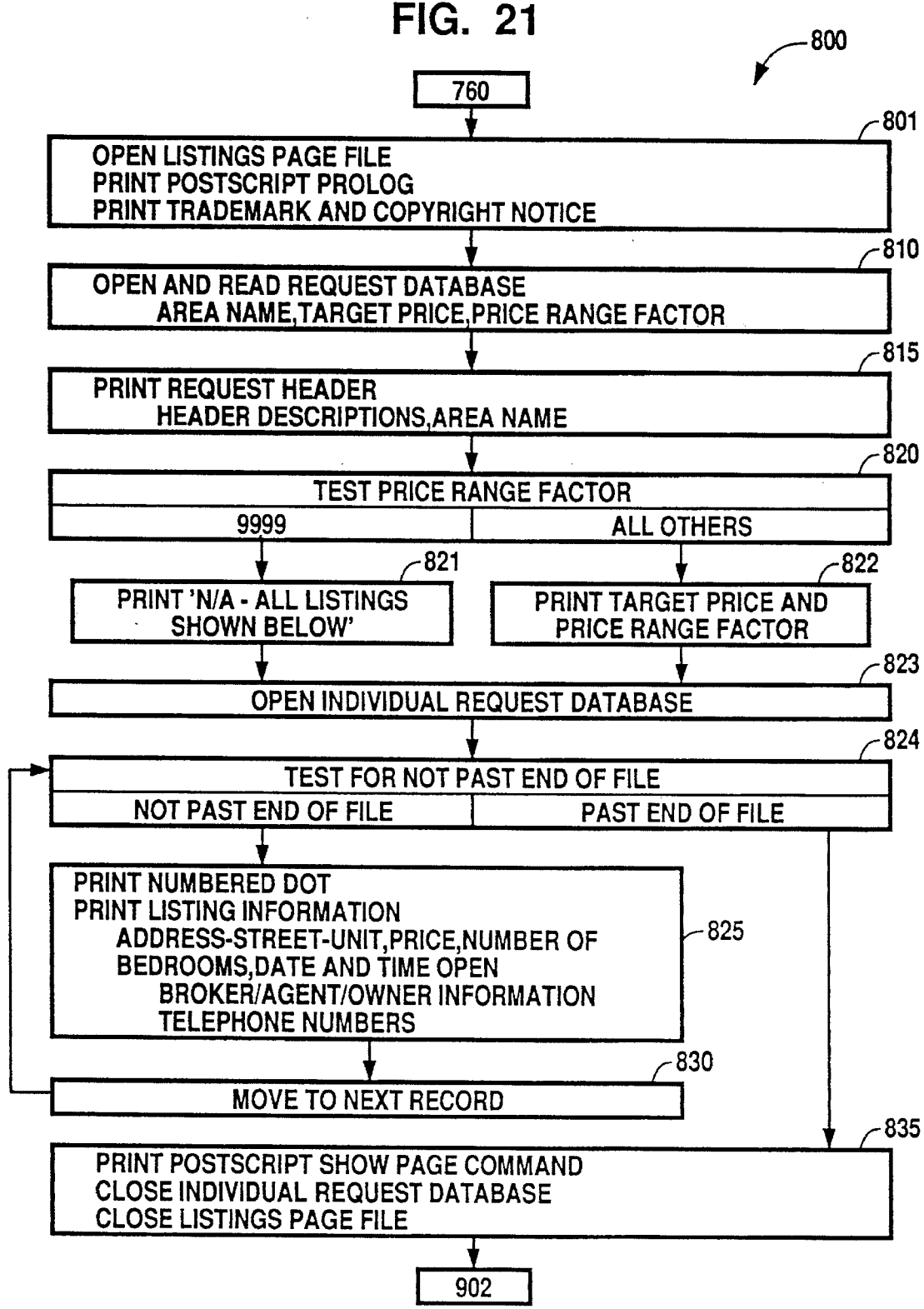
FIG. 21 is a detail flow diagram of the create listings page module of the process new request module.

Module 800, invoked at step 801, is detailed in FIG. 21. At step 801, the listings page file is opened and the PostScript™ prologue is printed as is the trademark and copyright notice. Step 810 opens and reads the request database, extracting therefrom the area name and target price input by the user, and price range factor calculated by extract listings module 600. At step 815 the request header is printed, including the header descriptions and the area name. Step 820 tests the price range factor. This is a binary test. If the price range factor is set to the value 9999, the module prints "N/A—All Listings Shown Below". If test step 820 determines the price range factor to be of value other than 9999, it prints the target price and price range factor at step 822. After either step 821 or 822 is executed, step 823 opens the individual request database at step 823. A test is made at step 824 to ensure the current record is not past the end of the file. If it is not past end of file, step 825 prints the numbered dot assigned to the listed property and prints listing information. Step 825 invokes step 830 which moves to the next record before looping back to step 824. Once step 824 determines the current record is past end of file, step 835 prints the PostScript™ show page command, closes the individual request database, and closes the listings page file.

After creating a listings page at module 800, the system of the present invention centers the map data on each of the maps created in the following manner: The numbered dots 75 are centered on the detail maps 80 shown on FIGS. 34 and 35. The detail maps 80 are centered on the area map 85 and the area map 85 is centered on the general map 90. Where more than one numbered dot or map outline is located on a given map, the present invention recalculates a new map center for that map each time a new numbered dot or map outline is added to the map. The new map center is based on the midpoints between the longitudinal extremes and latitudinal extremes of all the data points associated with that map. For a map outline, the relevant data point is the map center point for that outline. After a new map center is calculated, it is used to determine if any new dots or outlines can be added to that particular map. If a new data point cannot fit within the boundaries of any map previously defined during the map centering process, a new map is created to accommodate that data point. This new map plus those previously defined during the map centering process are then used for positioning any subsequent additional data points. Center map data module 900 is comprised of five main modules: Initialize and create map level 3 database and initialize map level 2 database module 901, create map level 2 database module 970, updata map level 3 database with detail map center points and initialize map level 1 database module 1030, create map level 1 database module 1050, and update map level 2 database with area map center point and create individual request map data file module 1160. Each of these modules will be discussed below.

Figure 22:
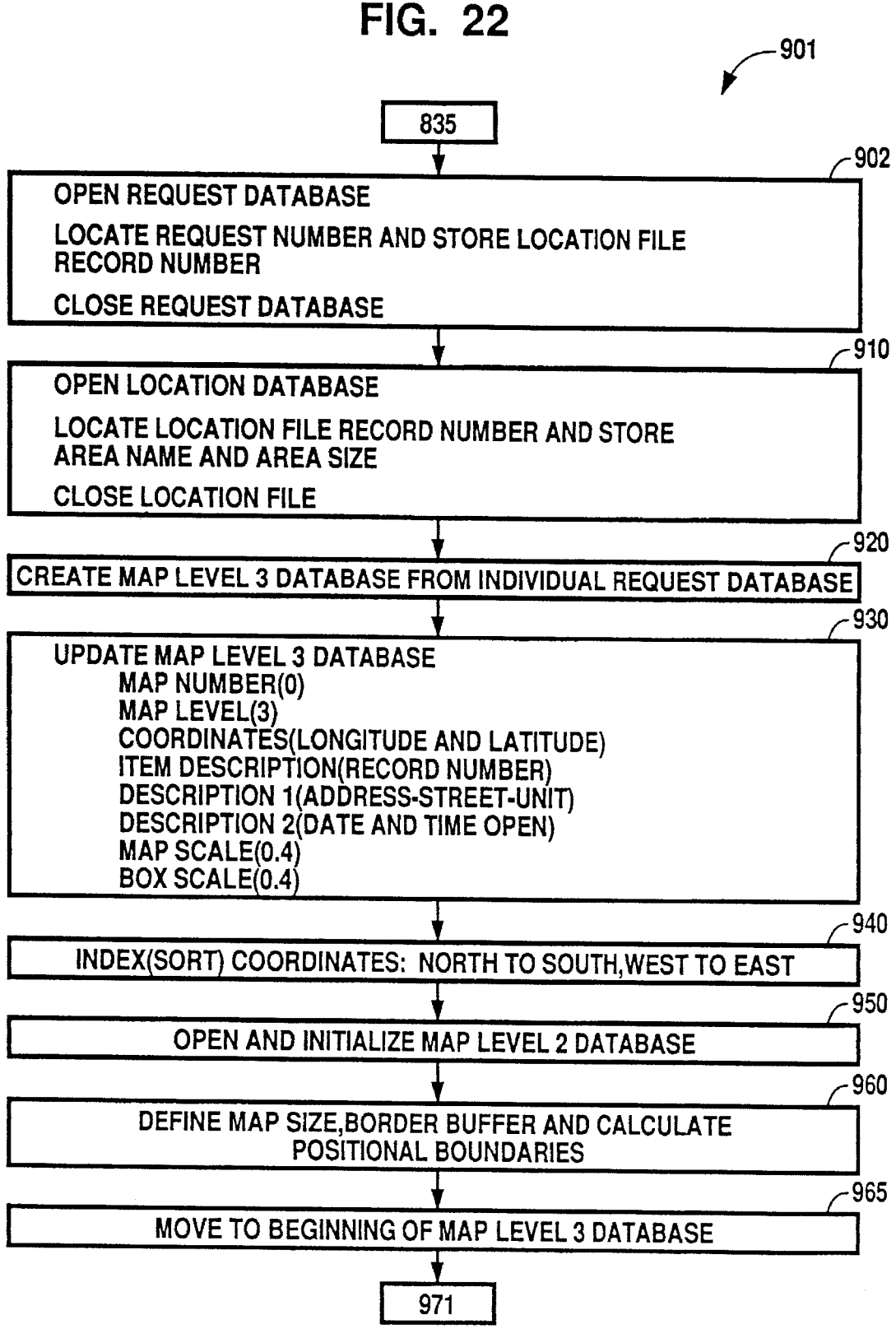
FIG. 22 is a detail flow diagram of the center map data—initialize and create ML3 database/initialize ML2 database module of the process new request module.

Center map data module 900 is accessed at module 901, which initializes and creates the map level 3 database and initializes the map level 2 database. Module 901 is detailed at FIG. 22. Module 901 is initiated at step 902 which opens the request database, locates the request number and stores the corresponding location file record number, and then closes the request database. Execution then passes to step 910 which opens the location database, locates the location file record number and stores the area name and area size before closing the location file. At step 920, map level 3 database is created from the individual request database. At step 930, the map level 3 database is updated to include the map level, the map number, the coordinates as latitude and longitude, location dot number, description line 1 which includes address, street and unit, and description line 2 which includes the date and time the listed property is open for viewing, the map scale, and the box scale. At step 940, the coordinates of each of the listed properties are sorted from north to south and west to east. At step 950, map level 2 database is opened and initialized. At step 960 the map size and border buffer are defined and the position of boundaries is calculated. Positional boundaries are the map size dimension less the border buffer dimension—for both latitude and longitude. The positional boundaries represent the maximum distance from the center point of a map that a given point can be and still be associated with that particular map. Step 965 moves to the beginning of the map level 3 database, before passing control to module 970 at step 971.

Figure 23:
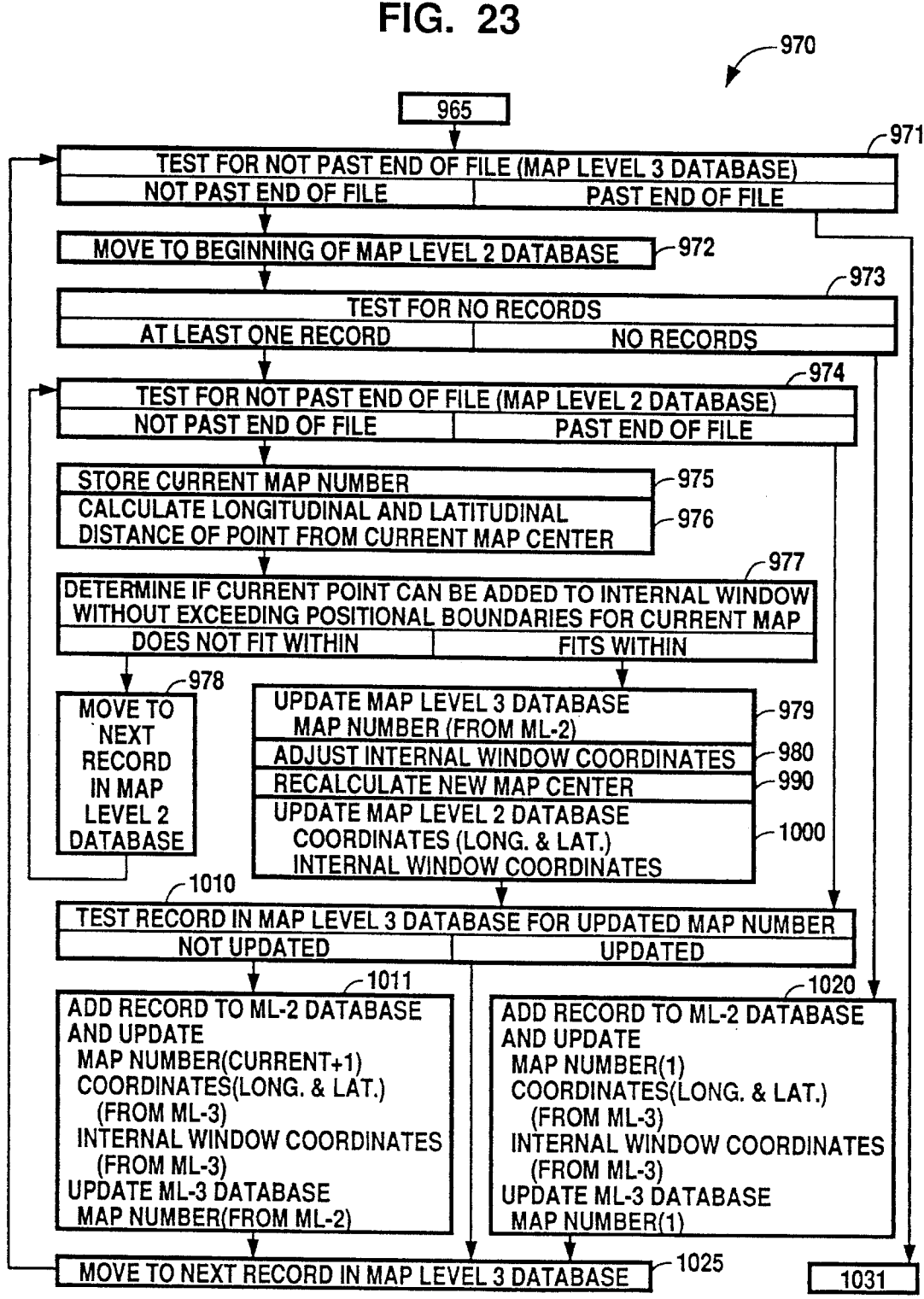
FIG. 23 is a detail flow diagram of the center map data—create ML2 database module of the process new request module.

Module 970 detailed at FIG. 23 creates the map level 2 database containing the detail map center points. The module is invoked by step 965 of the preceding module. At step 971, a test is made of the map level 3 database to determine that the current record is not past the end of the file. If the current record is not past end of file, map level 2 database is accessed at the beginning of the database at step 972. At step 973 a test is made for records in the map level 2 database. If at least one record exists, a test is made at step 974 that the current record is not past the end of the file, again referring to map level 2 database. If the record is not past the end of the file, the current map number is stored as a variable at step 975. Step 976 calculates the latitudinal and longitudinal distance of the individual listing point from the current map center. At step 977, a determination is made if the current point can be added to the internal window without exceeding the positional boundaries for the current map. If the current point does not fit within the positional boundaries, execution passes to step 978 which moves to the next record in the map level 2 database before looping back to step 974. If the determination at step 977 finds that the current point will fit within the internal window, four actions are taken: Map level 3 database is updated with the map number from map level 2 at step 979. The internal window coordinates are adjusted at step 980 and a new map center recalculated at step 990. At step 1000, map level 2 database is updated to include latitude and longitude coordinates as well as the internal window coordinates. After step 1000 executes, step 1010 is invoked, where a test is made of the record in the map level 3 database for an updated map number. Referring back to step 974 where map level 2 database is tested for being not past the end of the file, if the test determines that the database is past the end of the file, step 1010 is likewise invoked. If test step 1010 determines that the record in the map level 3 database does not have an updated map number, step 1011 adds a record to the map level 2 database and updates the map number by incrementing the current map number by 1, updates location coordinates with latitude and longitude from the map level 3 database, and updates internal window coordinates. Step 1011 then updates the map level 3 database with the map number from the map level 2 database before passing to step 1025. Step 1025 moves to the next record in the map level 3 database before executing a loop back to step 971. Referring back to step 973, if the test for no records determines that no records are present in the map level 2 database, step 1020 is invoked, which adds a record to the map level 2 database and updates the map number, updates location coordinates with latitude and longitude from the map level 3 database, and updates internal window coordinates. Step 1020 then updates the map level 3 database to include the map number before passing to step 1025. Referring back to test step 1010, if the test step determines that the map level 3 database record has an updated map number, control is directly passed to step 1025 without invoking either step 1011 or step 1020. Referring back to step 971, once the test of the map level 3 database determines that the record is past the end of the file, module 970 is terminated and module 1030 is invoked.

Figure 24:
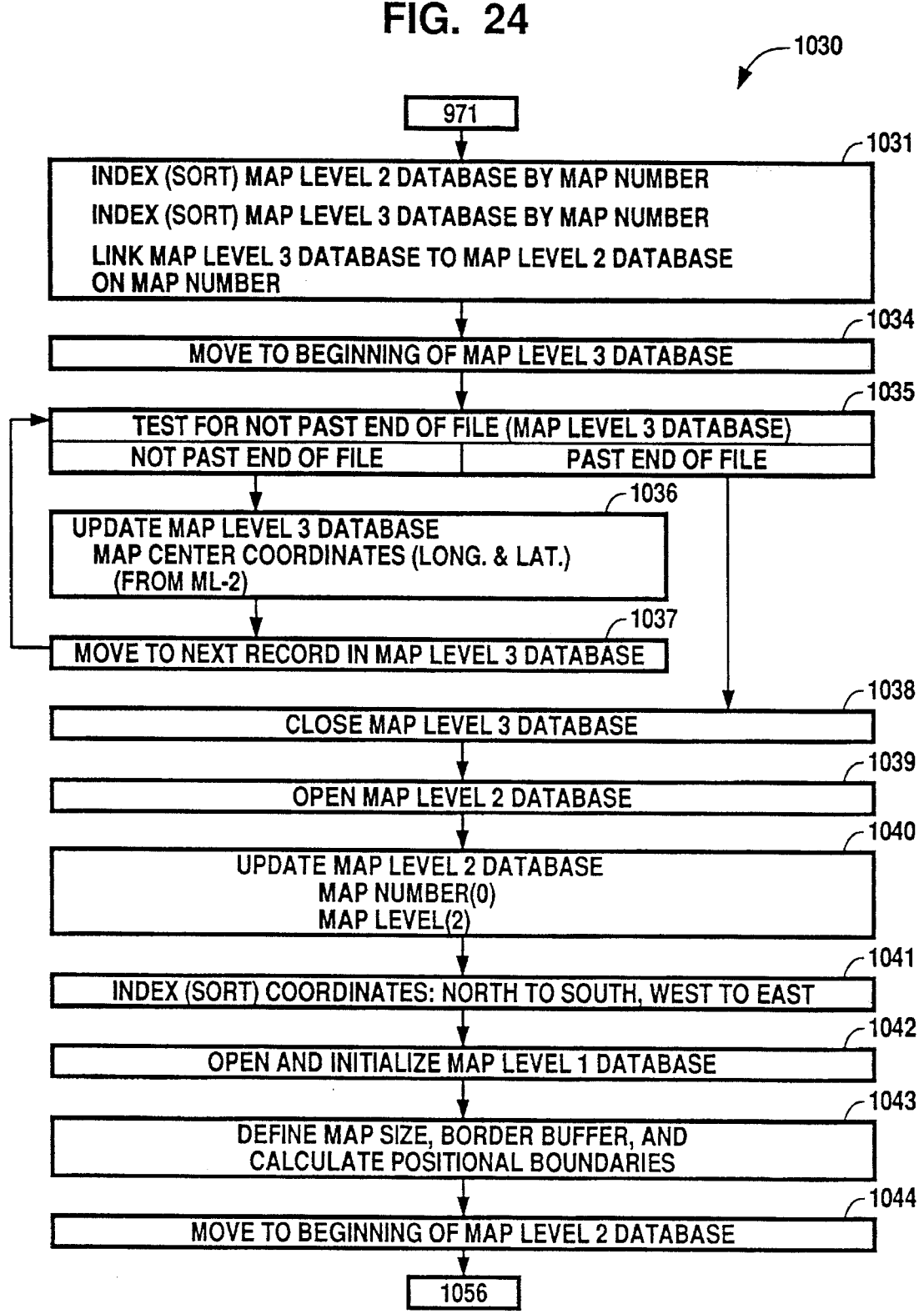
FIG. 24 is a detail flow diagram of the center map data—update ML3 database with detail map centerpoints/ initialize ML1 database module of the process new request module.

Module 1030, detailed at FIG. 24, updates map level 3 database with detail map center points and initializes the map level 1 database. Module 1030 is accessed from step 971 of module 970 at step 1031. Step 1031 indexes the map level 2 database by map number, indexes the map level 3 database by map number, and links the map level 3 database to the map level 2 database on the map number before passing to step 1034. Step 1034 moves to the beginning of the map level 3 database. At step 1035, a test is made of the map level 3 database to determine that the current record is not past the end of file. If it is not past the end of the file, at step 1036 map level 3 database is updated to include the map center coordinates from map level 2 before the present invention accesses the next record in the map level 3 database at step 1037. Step 1037 loops execution of the program back to step 1035. If step 1035 determines that the record in map level 3 database is past the end of the file, step 1038 closes the map level 3 database and step 1039 opens the map level 2 database. Step 1040 updates the map level 2 database with the map number and map level before passing control to step 1041 which indexes coordinates from north to south and west to east. At step 1042, map level 1 database is opened and initialized. Step 1043 defines the map size, border buffer, and calculates positional boundaries of a new record in the map level 1 database before moving to step 1044. Step 1044 moves to the beginning of the map level 2 database and invokes module 1050.

Figure 25:
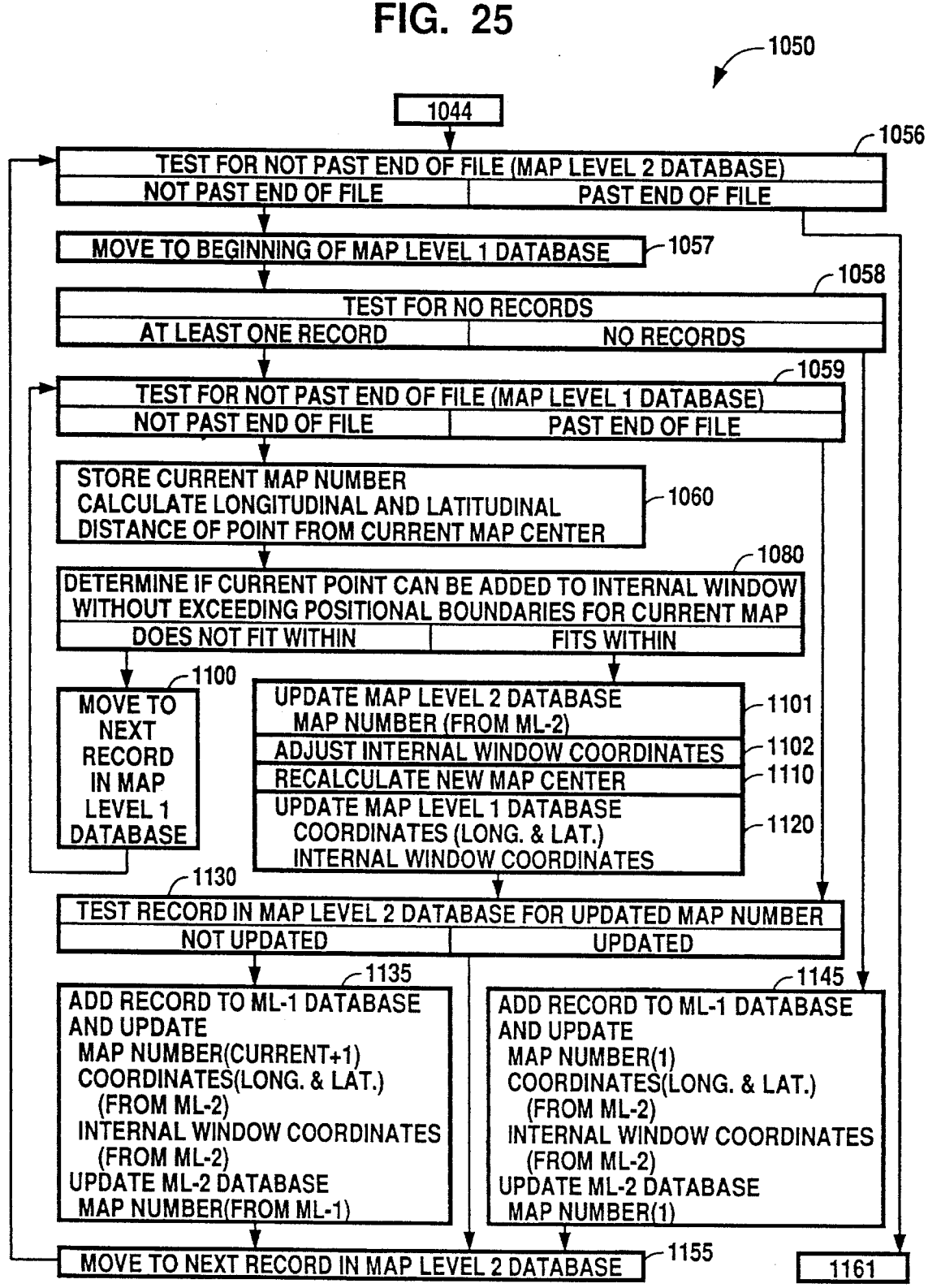
FIG. 25 is a detail flow diagram of the center map data—create ML1 database module of the process new request module.

Module 1050, detailed at FIG. 25, creates the map level 1 database containing the area map center point. The module is invoked at step 1056 by step 1044 of the preceding module. At step 1056, a test is made of the map level 2 database to determine that the current record is not past the end of the file. If the current record is not past end of file, map level 1 database is accessed at the beginning of the database at step 1057. At step 1058 a test is made for records in the map level 1 database. If at least one record exists, a test is made at step 1059 that the current record is not past end of file, again referring to map level 1 database. If the record is not past the end of the file, the current map number is stored as a variable at step 1060. Step 1060 also calculates the latitudinal and longitudinal distance of the detail map center point from the current map center. At step 1080, a determination is made if the current point can be added to the internal window without exceeding the positional boundaries for the current map. If it does not fit within the positional boundaries, execution passes to step 1100 which moves to the next record in the map level 1 database before looping back to step 1059. If the determination at step 1080 finds that the current point will fit within the internal window, four actions are taken: Map level 2 database is updated with the map number from map level 1 at step 1101. The internal window coordinates are adjusted at step 1102 and a new map center recalculated at step 1110. At step 1120, map level 1 database is updated to include latitude and longitude coordinates as well as the internal window coordinates. After step 1120 executes, step 1130 is invoked, where a test is made of the record in the map level 2 database for an updated map number. Referring back to step 1059 where map level 1 database is tested for being not past the end of the file, if the test determines that the database is past the end of the file, step 1130 is likewise invoked. If test step 1130 determines that the record in the map level 2 database does not have an updated map number, step 1135 adds a record to the map level 1 database and updates the map number by incrementing the current map number by 1, updates the location coordinates with the latitude and longitude from the map level 2 database, and updates the internal window coordinates. Step 1135 then updates the map level 2 database with the map number from the map level 1 database before passing to step 1155. Step 1155 moves to the next record in the map level 2 database before executing a loop back to step 1056. Referring back to test step 1058, if the test for no records determines that no records are present in the map level 1 database, step 1145 is invoked, which adds a record to the map level 1 database and updates the map number, updates the location coordinates with latitude and longitude from the map level 2 database, and updates internal window coordinates. Step 1145 then updates the map level 2 database with the map number before passing to step 1155. Referring back to test step 1130, if the test step determines that the map level 2 database record has an updated map number, control is directly passed to step 1155 without invoking either step 1135 or step 1145. Referring back to step 1056, once the test of the map level 2 database determines that the record is past the end of the file, module 1050 is terminated and module 1160 is invoked.

Figure 26:
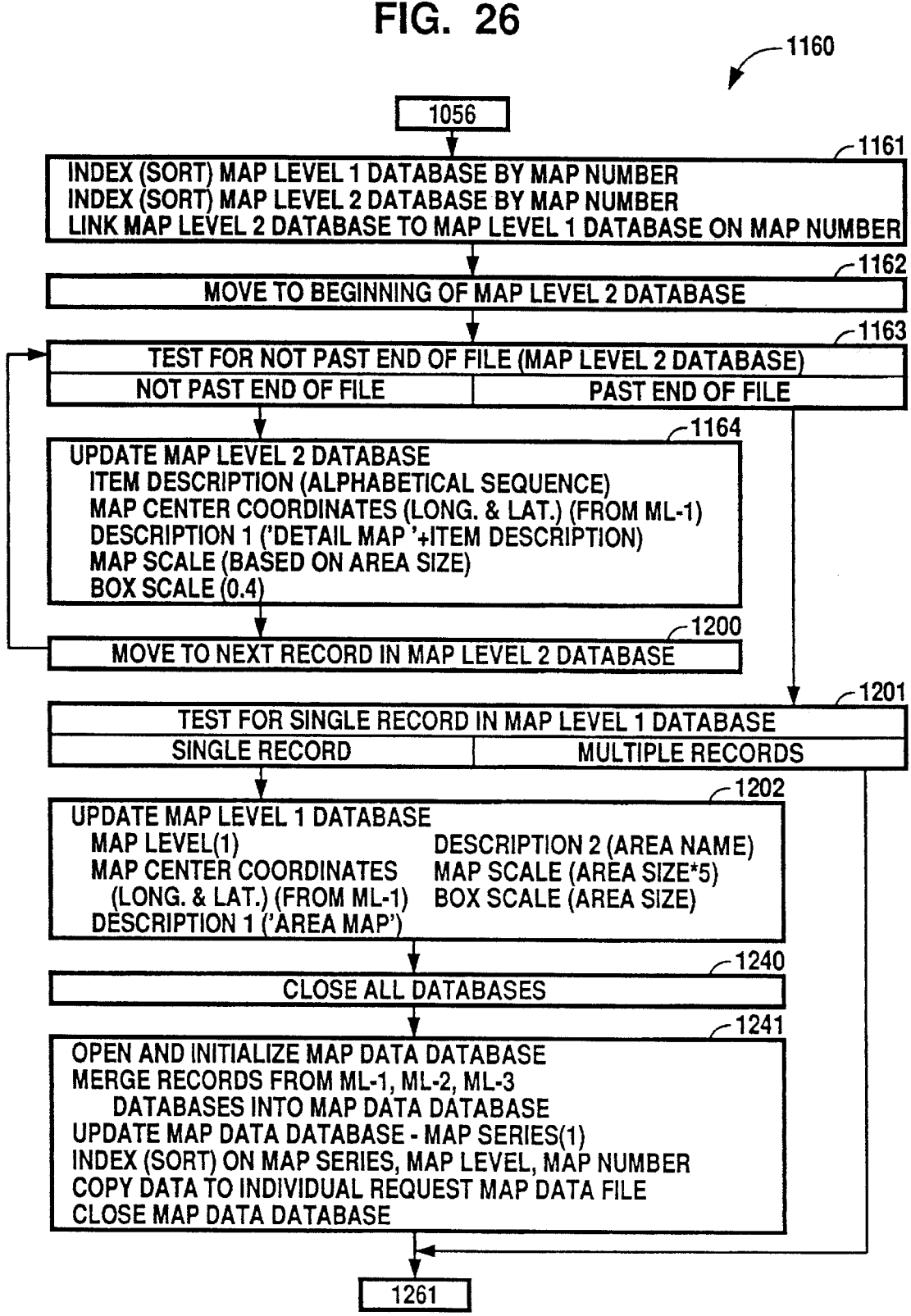
FIG. 26 is a detail flow diagram of the center map data—update ML2 database with area map center point/ create individual request map data file module of the process new request module.

Module 1160, detailed at FIG. 26, updates map level 2 database with the area map center point and creates the individual request map data file. Module 1160 is accessed from step 1056 of module 1050 at step 1161. Step 1 161 indexes the map level 1 database by map number, indexes the map level 2 database by map number, and links the map level 2 database to the map level 1 database on the map number before passing execution to step 1162. Step 1162 moves to the beginning of the map level 2 database. At step 1163, a test is made of the map level 2 database to determine that the current record is not past the end of file. If it is not past the end of the file, at step 1164 map level 2 database is updated to include: the item description, the map center coordinates from map level 1, description line 1, map scale, and box scale. After update step 1164 is complete, step 1200 accesses the next record in the map level 2 database. Step 1200 loops execution of the program back to step 1163. Once step 1163 determines that the current record is past the end of the file in map level 2 database, step 1201 is invoked. Step 1201 tests for a single record in the map level 1 database. If a single record exists in map level 1 database, step 1202 is invoked, which updates that database with: the map level; map center coordinates; description line 1, i.e., the phrase "Area Map"; description line 2, which is the area name; map scale; and box scale before closing all databases at step 1240. Step 1240 invokes step 1241 which: opens and initializes the map data database; merges records from map level 1, map level 2, and map level 3 databases into the map data database. Steps 1241 then updates the map data database with the map series; indexes the map data database on the map series, map level, and map number; copies data to the individual request map data file; and closes the map data database. After completing the foregoing actions, step 1241 invokes module 1250. Referring back to test step 1201, if multiple records are determined to exist in the map level 1 database, module 1250 is invoked directly.

Module 1250 creates the map pages responsive to a user's request using the data generated by the preceding modules.

Module 1250 is comprised of three principal subordinate modules: module 1260 initializes files and sets up functions; module 1290 is the main processing loop for map page creation; and module 1700 completes and closes files.

Figure 27:
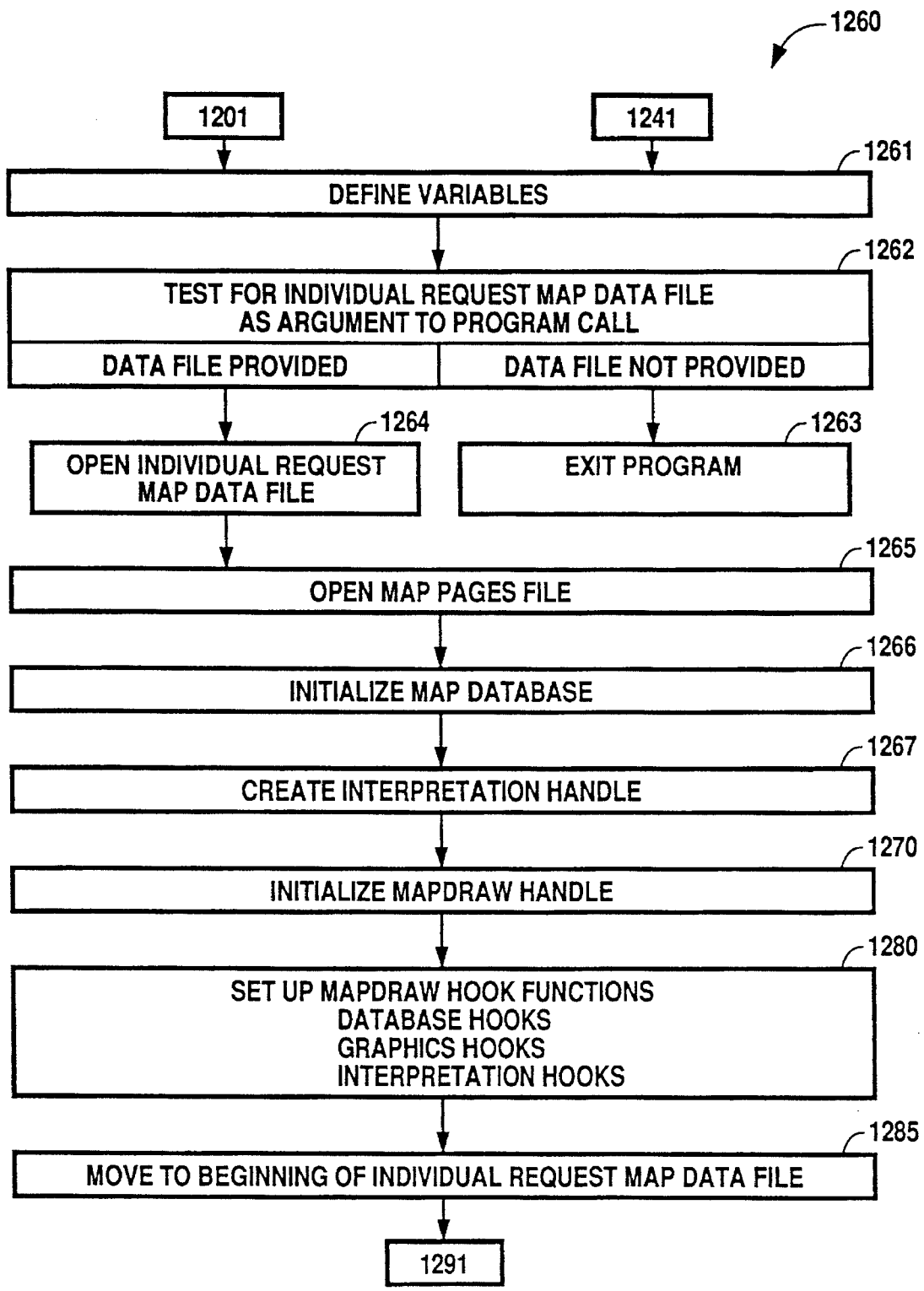
FIG. 27 is a detail flow diagram of the create map pages—initialize files/set up functions module of the process new request module.

Module 1260, detailed at FIG. 27, initializes files and sets up functions in the creation of map pages. Invoked from steps 1201 or 1241 from module 1160, module 1260 is first invoked at step 1261, which defines the variables before testing for the individual request map data file as an argument to a program call in step 1262. If the data file is not provided, the program exits at step 1263. If the data file is provided, the individual request map data file is opened at step 1264 and the map pages file is opened at step 1265 before initializing the map database at step 1266. After the map database is initialized, an interpretation handle is created at step 1267, and a MapDraw handle is initialed at step 1270. MapDraw hook functions are set up at step 1280 to include database hooks, graphic hooks and interpretation hooks. At step 1285, the system moves to the beginning of the individual request map data file before invoking the main processing loop 1290.

Figure 28:
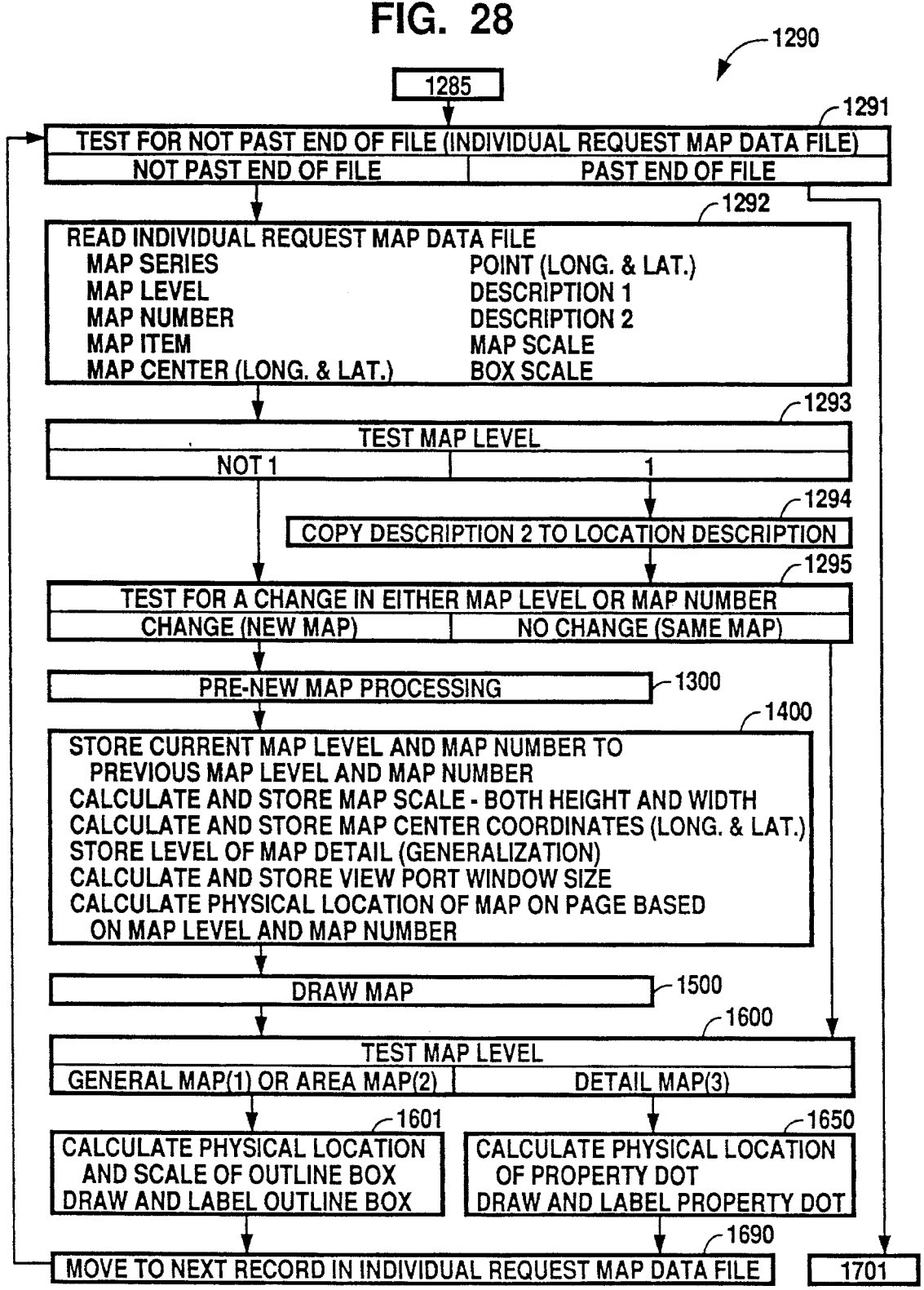
FIG. 28 is an overview flow diagram of the create map pages—main processing loop module of the process new request module.

Main processing loop 1290 is detailed at FIG. 28. Invoked by step 1285 of module 1260, step 1291 tests the individual request map data file for not past end of file. If the individual request map data file is not past the end of file, the individual map data file is read at step 1292 and the map series, map level, map number, map item, map center as latitude and longitude, the point as latitude and longitude, description lines 1 and 2, the map scale and box scale are all read. At step 1293, the map level is tested. If the map level is found to be 1, step 1294 is invoked, which copies description line 2 to the location description and invokes step 1295, which tests for a change in either the map level or the map number. Referring back to step 1293, if the map level is found not to be 1, step 1295 is again invoked. If the determination by step 1295 indicates that a change has been made in either the map level or the map number, pre-new map processing module 1300 is invoked, after which step 1400 is sequentially invoked. Step 1400 stores the current map level and map number to previous map level and map number, calculates and stores the map scale, both in terms of height and width, calculates and stores the map center coordinates as latitude and longitude, stores the level of map detail, calculates and stores the viewport window size, and calculates the physical location of the map on the page based on the map level and the map number, after which the draw map module 1500 is invoked. After execution of module 1500, the map level is tested at step 1600. Referring back to step 1295, if no change is determined to exist in either the map level or the map number, step 1600 is invoked directly. Step 1600 tests the map level as either a detail map or a general map or area map. If the map is a detail map, step 1650 is invoked, which calculates the physical location of the property dot and draws and labels the property dot. If step 1600 determines the map level to be either a general map level 1 or area map level 2, step 1601 calculates the physical location and scale of the outline box and draws and labels the outline box. After execution of either step 1601 or 1650, step 1690 is invoked, which moves to the next record in the individual request map data file. It returns control of the execution of this module to step 1291 as a loop. When step 1291 determines that the individual request map data file is past the end of the file, module 1700 is invoked and the main processing loop is exited.

Figure 29:
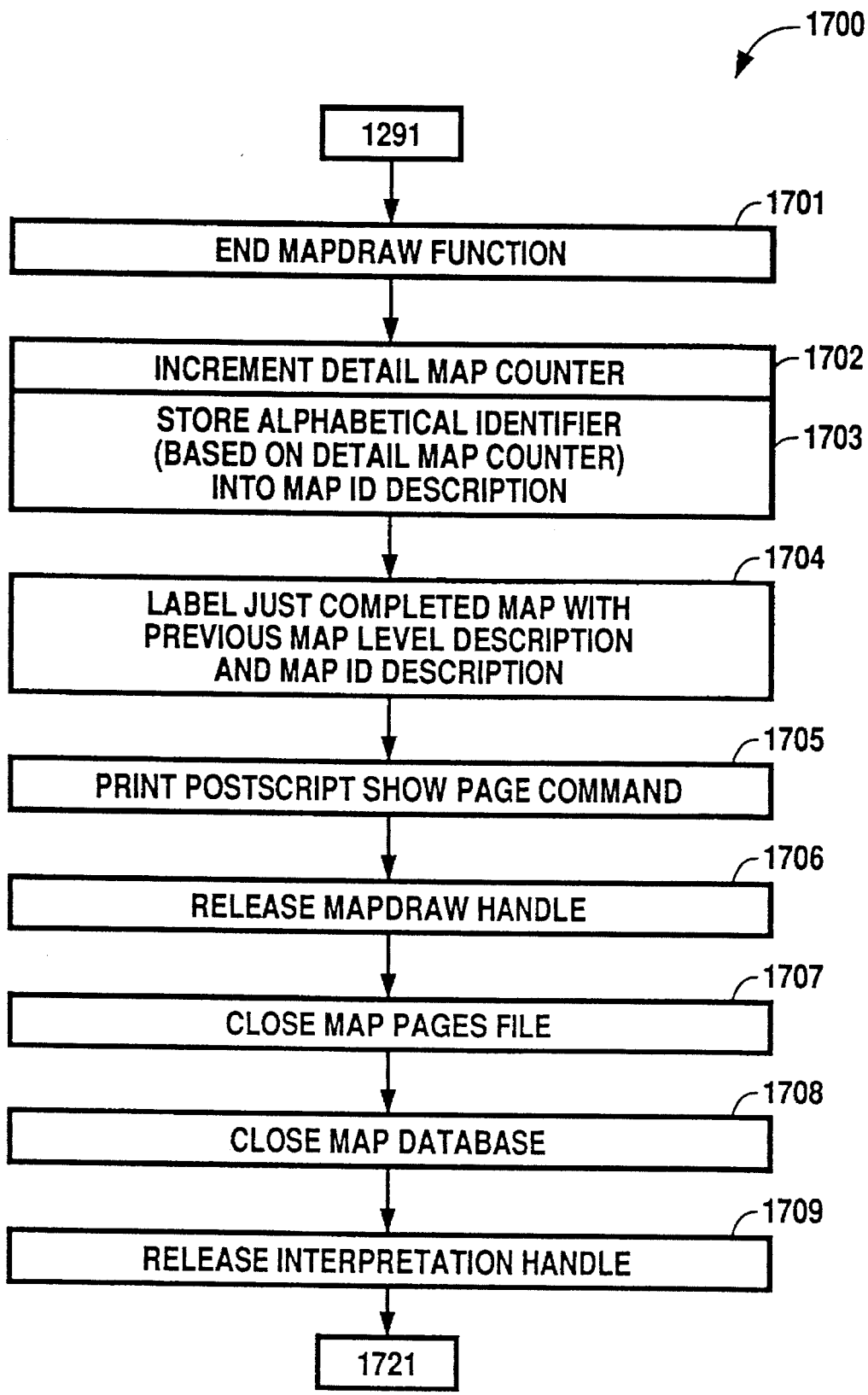
FIG. 29 is a detail flow diagram of the create map pages—complete and close files module of the process new request module.

Module 1700, detailed at FIG. 29, completes and closes the files. This module is accessed from step 1291 of the main processing loop 1290 at step 1701. Step 1701 ends the map drawing function before invoking steps 1702 and 1703 which increment the detail map counter and store the alphabetical identifier based on the detail map counter into the map ID description. Step 1704 is next invoked, which labels the just completed map with the previous map level description and map ID description before printing the PostScript™ show page command at step 1705. Step 1706 releases the MapDraw handle before step 1707 closes the map pages file. Step 1708 then closes the map database and step 1709 releases the interpretation handle before exiting the module and invoking module 1720.

Figure 30:
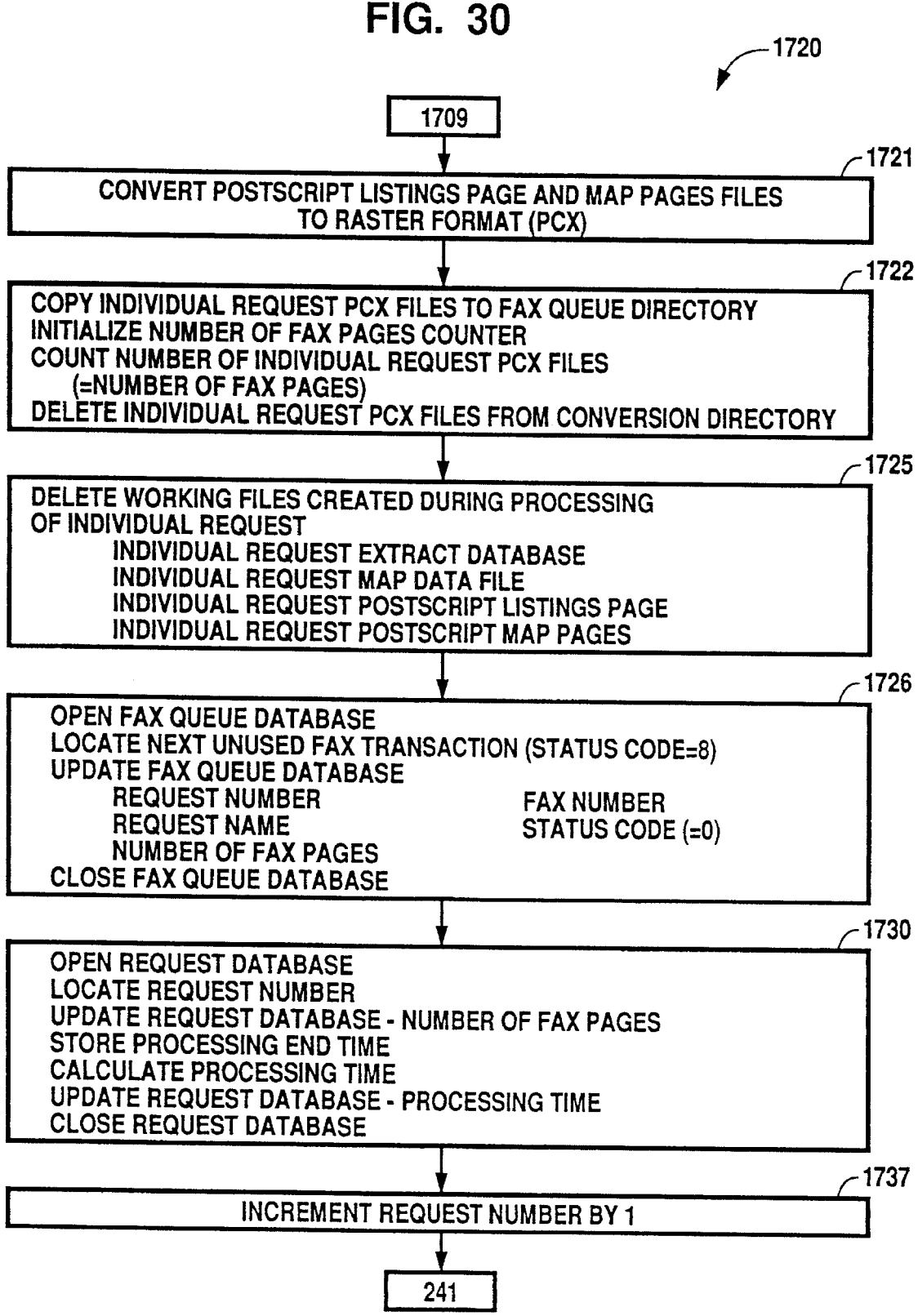
FIG. 30 is a detail flow diagram of the module in the process new request module which converts PostScript™ files to PCX format, renames and copies PCX files, deletes intermediate working files, and updates fax queue and request files.

Module 1720, detailed at FIG. 30 performs several functions, specifically, it: converts PostScript™ files to raster format PCX files; renames and copies PCX files; deletes intermediate working files; and updates the fax queue and request files. Module 1720 is invoked from step 1709 of module 1700 at step 1721, which converts PostScript™ listings page and map pages files to raster format (PCX). At step 1722, individual request PCX files are copied to the fax queue directory; the number of the fax pages counter is initialized; the number of individual request PCX files is counted; and the individual request PCX files are deleted from the conversion directory. At step 1725, the working files, created during processing of the individual requests, are deleted. These working files include the individual request extract database, the individual request map data file, the individual request PostScript™ listings page, and the individual request PostScript™ map pages. Step 1726 opens the fax queue database, locates the next unused fax transaction; and updates the fax queue database with the request number, request name, number of fax pages, fax number, and status code set to 0 before closing the fax queue database. Means are provided at step 1730 for several record keeping functions of import to the system operator. Step 1730 opens the request database, locates the request number, updates the request database with the number of fax pages, stores the processing end time, calculates the processing time, updates the request database with the processing time, and closes the request database. At step 1737, the request number is incremented by 1 before the module is exited and control is returned to the fax monitoring test loop 240 at step 241.

Figure 31:
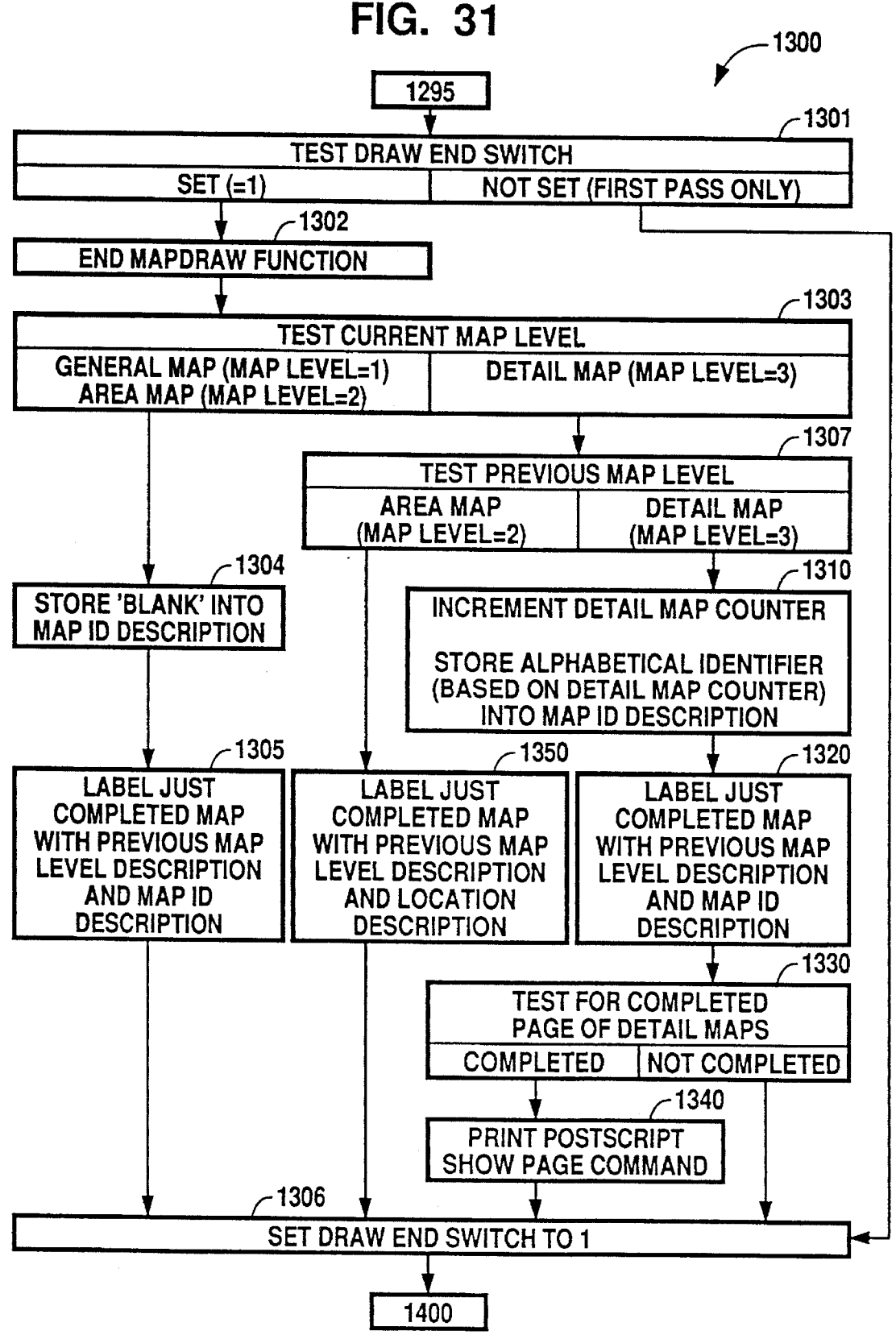
FIG. 31 is a detail flow diagram of the create map pages—pre new map processing module of the create map pages—main processing loop module.

Referring back to module 1290 detailed at FIG. 28, pre-new map processing, module 1300 is detailed at FIG. 31. Invoked by step 1295 of the main processing loop 1290, step 1301 tests the draw end switch. If the draw end switch is set to 1, the draw map function is terminated at 1302 and the current map level tested at 1303. If the current map level is either a general map, i.e. the map level equals 1, or an area map, i.e., the map level equals 2, a 'blank' is stored into the map ID description at step 1304 and the just completed map is labelled with the previous map level description and map ID description at 1305 before setting the draw end switch to 1 at step 1306. Referring back to step 1303, if the current map level is a detail map, i.e., the map level equals 3, step 1307 is invoked, which tests the previous map level. If the previous map level is also set to 3, step 1310 is invoked, which increments the detail map counter and stores the alphabetical identifier based on the detail map counter into the map ID description. Step 1320 labels the just completed map with the previous map level description and map ID description before testing at step 1330 for a completed page of detail maps. Step 1330 determines if the detail map page is completed. If so, step 1340 is invoked, which prints the PostScript™ show page command before invoking step 1306. If test step 1330 determines the page of detail maps is not completed, step 1306 is invoked directly without printing the PostScript™ show page command. Referring back to step 1307, if the previous map level test determines that the previous map level is set to 2, i.e., an area map, step 1350 is invoked, which labels the just completed map with the previous map level description and location description before invoking step 1306. Referring back to step 1301, if the draw end switch test determines that the draw end switch is not set, step 1306 is invoked directly. Step 1306 invokes step 1400, previously discussed in the main processing loop at FIG. 28.

Figure 32:
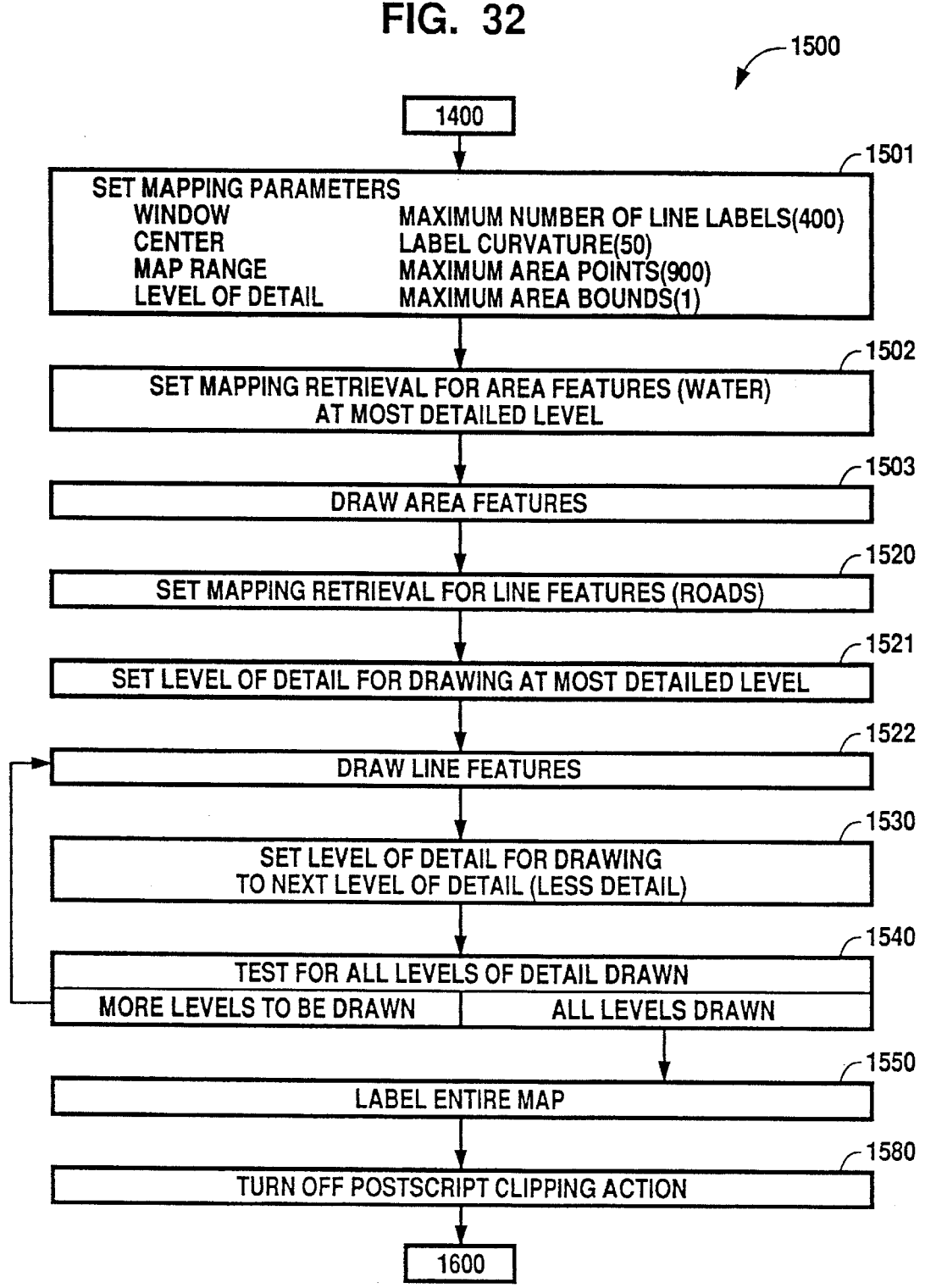
FIG. 32 is a detail flow diagram of the create map pages—draw map module of the create map pages—main processing loop module.

After execution of step 1400, draw map module 1500 is invoked at step 1501. Draw map module 1500 is detailed at FIG. 32. Invoked by step 1400, this step sets the mapping parameters, including window, center, map range, level of detail, maximum number of line labels, label curvature, maximum area points, and maximum area bounds. Step 1501 then invokes step 1502, which sets mapping retrieval for area features at the most detailed level. Step 1503 then draws the area features before step 1520 sets the mapping retrieval for line features, i.e., roads. Step 1521 then sets the level of detail for drawing at the most detailed level. Step 1522 draws the line features before step 1530 sets the level of detail for drawing to the next level of detail, i.e., less detail. After setting the next level of detail, a test is made at step 1540 to determine if all levels of detail have been drawn. If more levels remain to be drawn, a loop is set up and step 1522 is again invoked. Once all levels have been drawn, step 1550 is invoked by step 1540, which labels the entire map and step 1580 turns off the PostScript™ clipping action before returning control to the main processing loop at step 1600.

The document set produced by a real estate sales support tool embodiment of the present invention is illustrated in FIGS. 33 through 37.

Referring now to FIG. 33, an example of a listings sheet generated by the present invention is disclosed. Listings sheet 40 comprises header 41, area 42, target price 43 as input by user, price range factor 44, property location column 45, price column 46, bedroom column 47, date and time open column 48, and individual listings corresponding to map points 75.

Figure 34:
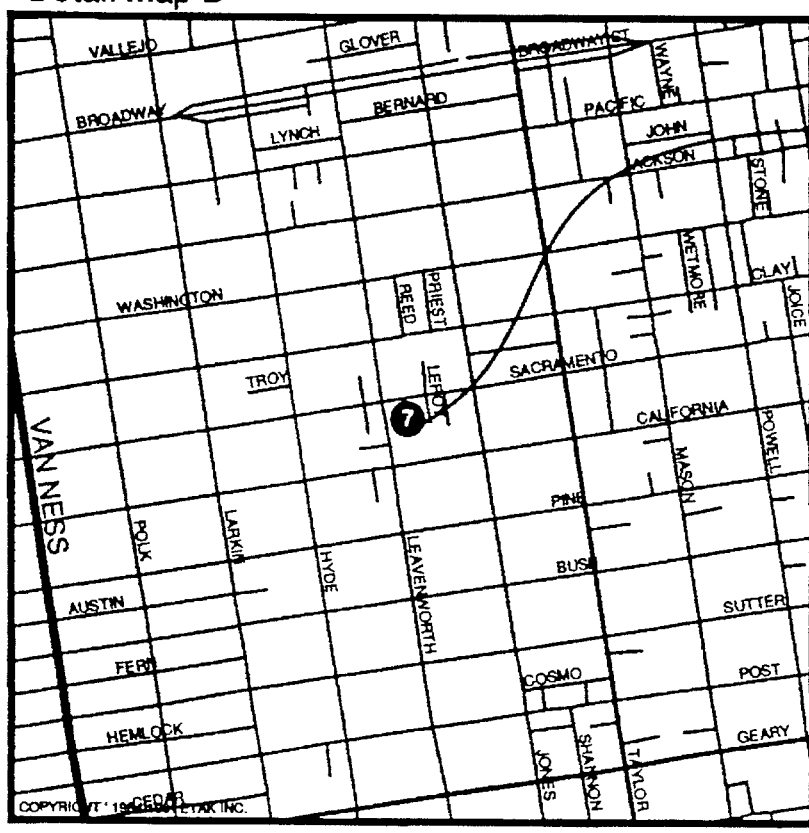
FIG. 34 is a detail map, having one location thereon, created in response to a user's request.

Shown at FIG. 34 is a detail map 80, generated by the present invention, having on it one map point 75, centered on the detail map.

Figure 35:
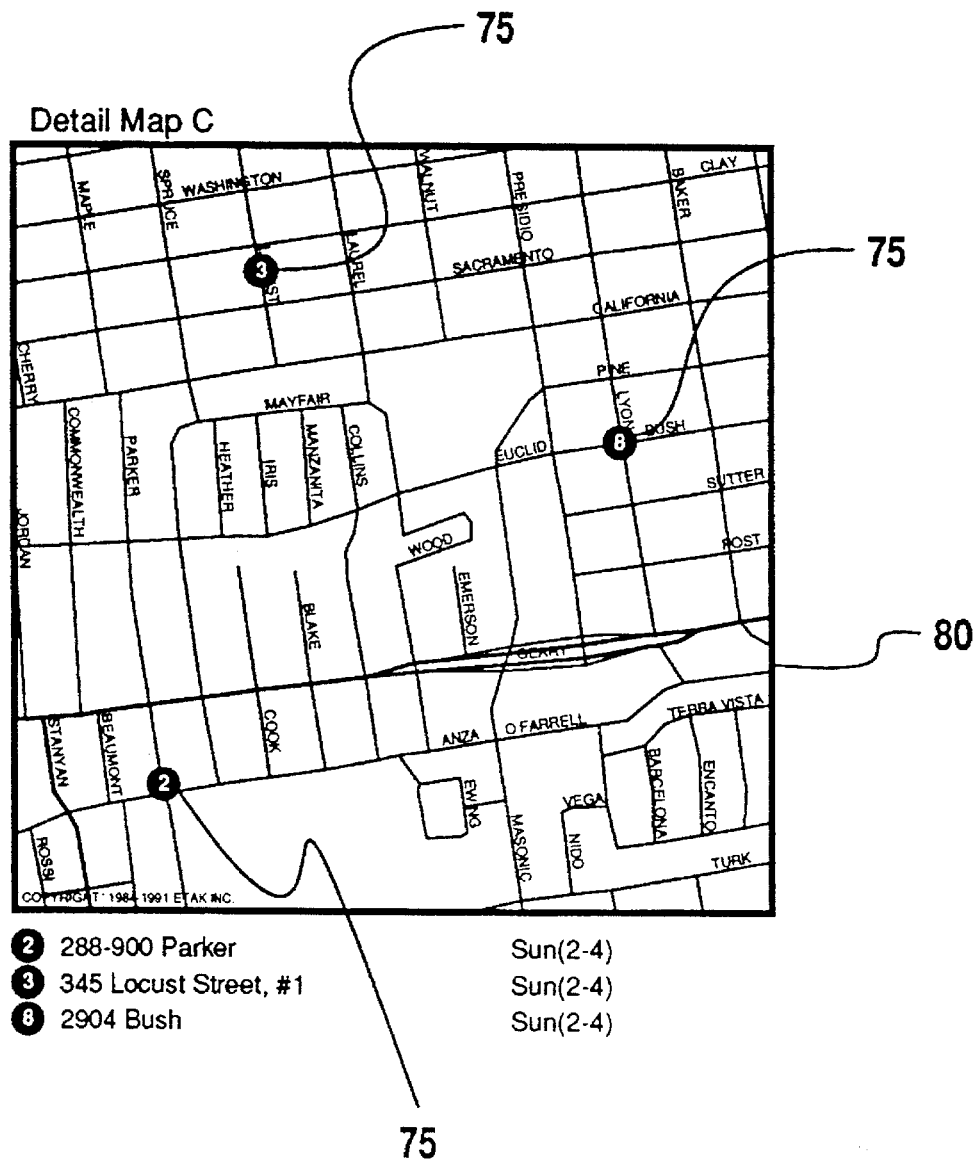
FIG. 35 is a detail map, having multiple locations thereon, created in response to a user's request.

Shown at FIG. 35 is a second detail map 80 having on it several points 75 generated by the present invention.

Figure 36:
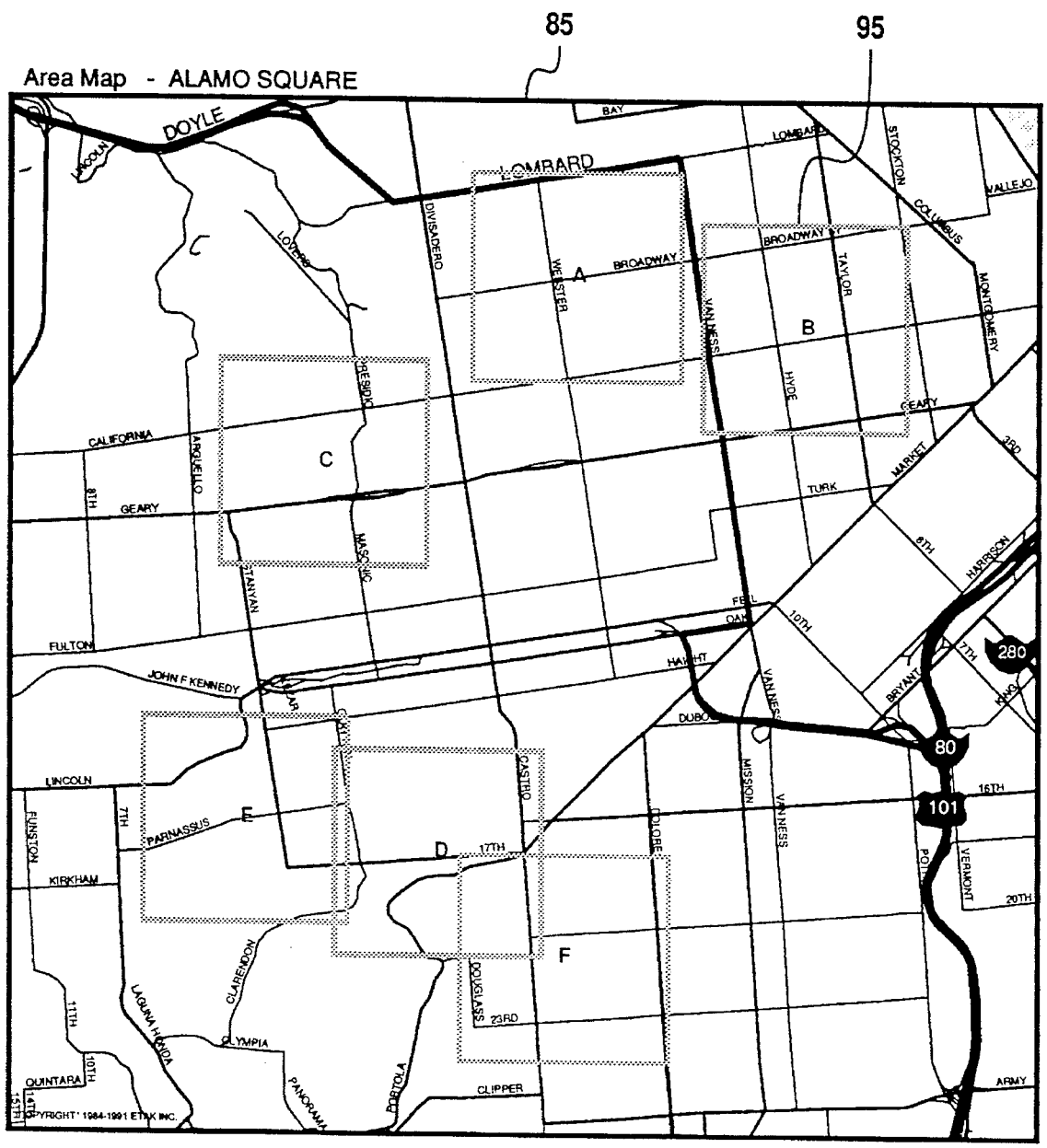
FIG. 36 is an area map with detail map locations superimposed thereon created in response to a user's request.

Shown at FIG. 36 is an area map 85 according to the present invention having outlines 95 corresponding to detail maps imprinted thereon.

Figure 37:
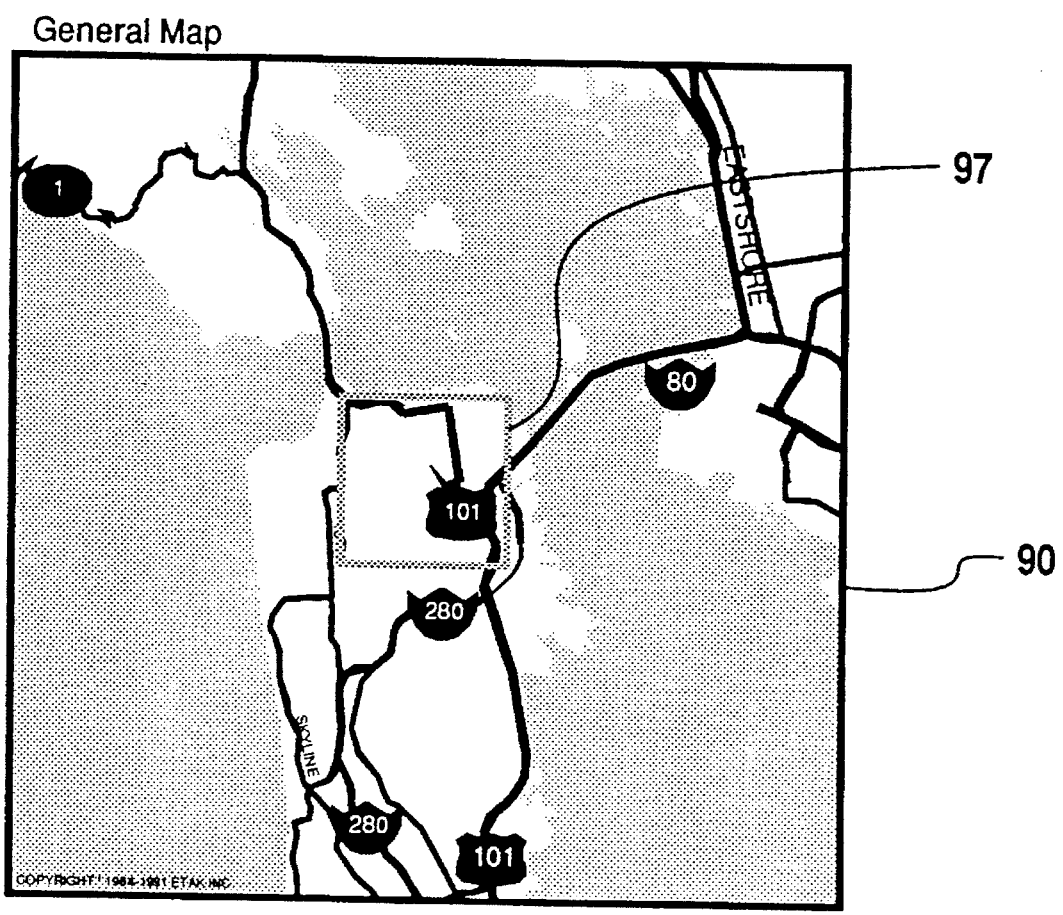
FIG. 37 is a general map with an area map location superimposed thereon created in response to a user's request.

Shown at FIG. 37 is a general map 90 created according to the present invention having a second outline 97 corresponding to the area map imprinted thereon.

Figure 38:
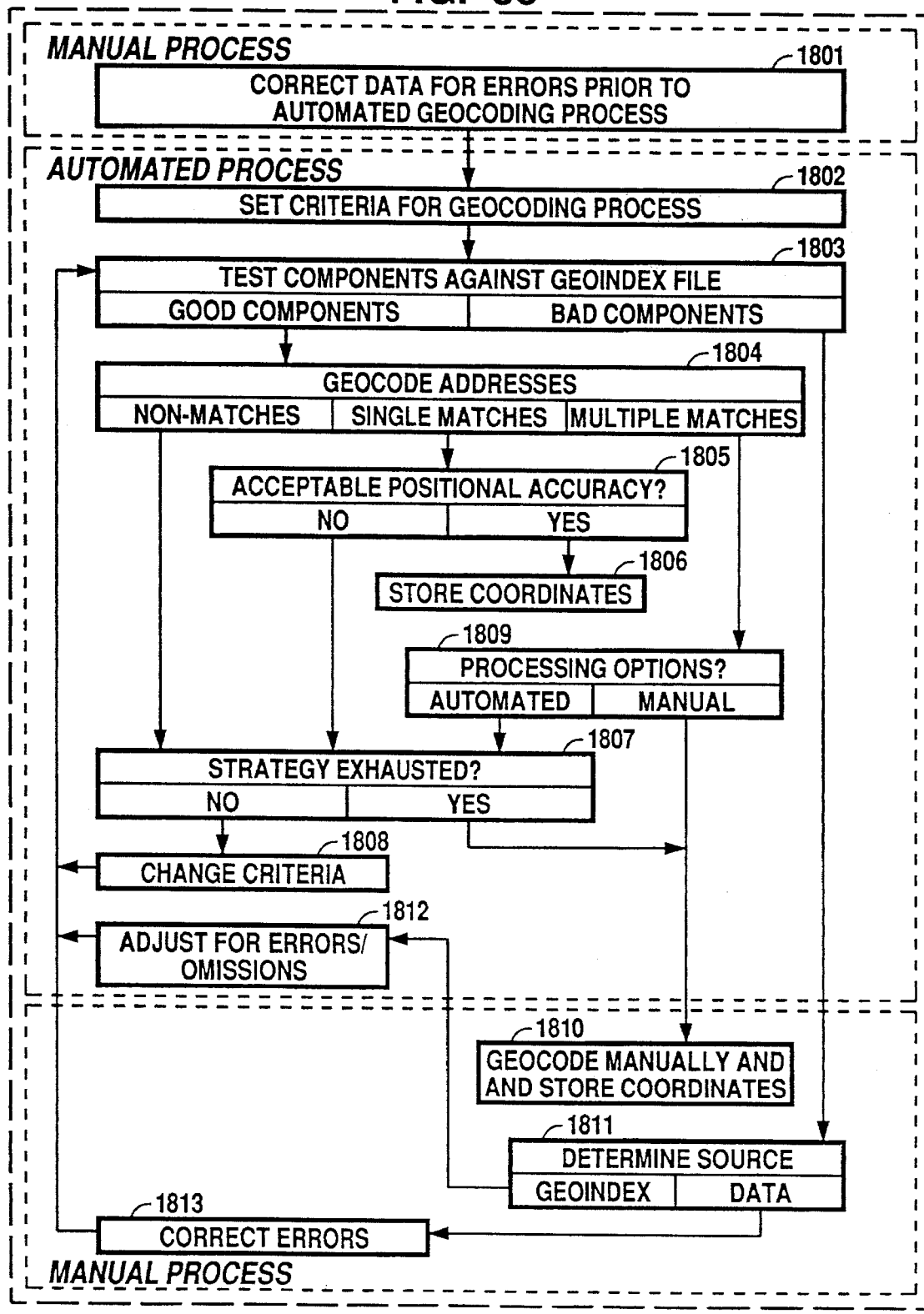
FIG. 38 is an overview of the geocoding process of the present invention.

One methodology for semi-automated geocoding of a real estate listings database, by a system operator, is shown at FIG. 38. As a preliminary to automated geocoding, the system operator, at step 1801, corrects the data provided by subscribers interested in listing their properties. After correcting any errors, the data is submitted to the automated portion of the geocoding process at step 1802 where the initial criteria defined by the geocoding strategy is set. This criteria defines the parameters that determine the degree of accuracy to be applied while geocoding addresses, e.g., search flags on each address component requiring either an exact match or allowing a wildcard match. At step 1803, the individual address components, i.e., address, street, city, postal ZIP code, and state, are validated against the GeoIndex file. If each component is found to be valid or "good, the entire address combination is submitted for geocoding at step 1804. If the geocoding at step 1804 results in a single match between the address combination submitted and the GeoIndex file, an assessment is made at step 1805 regarding the positional accuracy as determined by the geocoding strategy criteria. If the positional accuracy is acceptable, the coordinates are stored at step 1806. If the positional accuracy is not acceptable, a determination is made at step 1807 regarding whether or not the geocoding strategy has been exhausted. If it has not, the criteria are changed at step 1808 before looping back to test the components at step 1803. Referring back to step 1804, if the geocoding results in no match between the address combination submitted and the GeoIndex file, step 1807 is directly invoked. Referring again back to step 1804, if the geocoding results in multiple matches between the address combination submitted and the GeoIndex file, processing options are checked at step 1809. If automated processing options are available, step 1807 is again directly invoked. If only manual processing options are available, geocoding is performed manually at step 1810 and the resulting coordinates are stored. Referring back to the component test at step 1803, if any of the components is found to be invalid or in error, a determination is made at step 1811 as to the probable source of the problem. If the source of the problem is the GeoIndex file, adjustments for errors and/or omissions are made at step 1812 before looping back to test the components at step 1803. If the source of the problem at step 1811 is the submitted data, errors are corrected manually at step 1813 before looping back to test the components at step 1803. Referring back to step 1807, if the geocoding strategy has been exhausted, all defined approaches to geocoding have been unsuccessfully tried, then geocoding is performed manually at step 1810 on all remaining items that have not yet been geocoded.

The present invention has been particularly shown and described with respect to certain preferred embodiments of features thereof. However, it should be readily apparent to those of ordinary skill in the art that various changes and modifications in form and detail may be made without departing from the spirit and scope of the invention as set forth in the appended claims. The invention disclosed herein may be practiced without any element which is not specifically disclosed herein.

What is claimed is:

1. Programmable computer-based apparatus for dynamically creating a map responsive to a remote user's request received on a telephone receiving and transmitting means, said map including at least one map page, and for transmitting said map to said user via said telephone transmitting means, the apparatus comprising:

a programmed computer having memory;

data storage and retrieval means operatively associated with said computer;

format conversion means for converting document data presented in a page description format into a format suitable for facsimile transmission;

a mapping database, containing alphanumeric map data which define map features in terms of geographic coordinates, stored in said data storage and retrieval means;

a plurality of listings stored in said data storage and retrieval means, each of said listings being defined in terms of geographic coordinates;

display means operatively associated with said computer;
voice processing means operatively associated with said computer; and a computer implemented process for receiving said user's request as a first DTMF telephonic signal via said telephone receiving means, said request being formed in response to prerecorded voice message prompts from said voice processing means, comparing said request with said listings stored in said data storage and retrieval means, selecting ones of said listings which most closely approximate said user's request, dynamically creating a map page in a page description format using alphanumeric map data from said mapping database, said map page containing map information specific to said selected ones of said listings, converting the dynamically created map page into a format suitable for facsimile transmission using said format conversion means, storing said converted map page in said data storage and retrieval means, and transmitting, as a second telephonic signal via said telephone transmitting means, said map page from said data storage and retrieval means to said user.

2. For a programmed computer having memory, data storage and retrieval means, a plurality of listings stored in said data storage and retrieval means, each of said listings being defined in terms of geographic coordinates, a mapping database containing alphanumeric map data which define map features in terms of geographic coordinates stored in said data storage and retrieval means, display means, telephone receiving and transmitting means, and voice processing means for playing back prerecorded voice message prompts in response to DTMF signal input, a computer implemented process for dynamically creating a locator map responsive to a remote user's request received on said telephone receiving means, said locator map including at least one map page, and for transmitting said locator map to said user via said telephone transmitting means, the process comprising the steps of:

responsive to prerecorded voice message prompts from said voice processing means, receiving said user's request as a first DTMF telephonic signal via said telephone receiving means;

comparing said request with said listings;

selecting ones of said listings which most closely approximate said user's request;

dynamically creating a map page in a page description format using alphanumeric map data from said mapping database, said map page containing map information specific to said selected listings;

converting the dynamically created map page from said page description format into a format suitable for facsimile transmission;

storing converted map page in said data storage and retrieval means; and transmitting to said user said converted map page from said data storage and retrieval means, as a second telephonic signal via said telephone transmitting means.

3. The computer implemented process of claim 2, wherein said map page further includes a map point corresponding to a selected one of said listings, said map point correlating to a unique latitude and longitude, wherein said step of creating said map page further comprises the steps of:

defining said map point as said selected one of said listings; and centering said map page around said map point.

4. The computer implemented process of claim 3, wherein said step of centering said map page further comprises the steps of:

generating an internal window corresponding to, and smaller than, said map page;

calculating the positional boundaries of said map page, using said internal window, available for adding a subsequent map point to said map page;

deriving the centerpoint of said map page from said map point; and defining the centerpoint of said map page as the said latitude and said longitude of said map point.

5. The computer implemented process of claim 4, wherein said map page further includes a plurality of said map pages, said step of centering said map page further comprising the steps, for each of said subsequent map points, of:

determining if said subsequent map point can be added to said map page;

responsive to the determination, by said step of determining if said map point can be added to said map page, that a subsequent map point can be added to said map page, including said subsequent map point on said map page and recalculating said internal window centered on the midpoint between the latitudinal and longitudinal extremes of all the map points associated with said map page;

responsive to the determination, by said step of determining if said map point can be added to said map page, that said subsequent map point cannot be added to said map page, determining if said subsequent map point can be added to any previously defined map pages of Said plurality of map pages;

responsive to the determination, by said step of determining if said subsequent map point can be added to any previously defined map pages, that said subsequent map point can be added to at least one of said previously defined map pages, including said subsequent map point on said one of said previously defined map pages and recalculating said internal window of said one of said previously defined map pages centered on the midpoint between the latitudinal and longitudinal extremes of all the map points associated with said map page; and responsive to the determination, by said step of determining if said subsequent map point can be added to said map page, that said subsequent map point cannot be added to at least one of said previously defined map pages, creating a subsequent map page, defining the centerpoint of said subsequent map page as said latitude and said longitude of said subsequent map point, and calculating the internal window of said subsequent map page centered on said subsequent map point.

6. The computer implemented process of claim 5, wherein said plurality of map pages further comprises a series of maps of decreasing scale, said series of maps including at least one each of a general map of small scale, an area map of intermediate scale, and a detail map of large scale, wherein said step of centering said map page around said map point further comprises the steps of:

defining a first alternate map point for display on said area map, said first alternate map point comprising the outline of said detail map; and defining a second alternate map point for display on said general map, said second alternate map point comprising the outline of said area map.

7. The computer implemented process of claim 6 wherein said plurality of map pages further comprises a cover page summarizing information represented on said map.

8. The computer implemented process of claim 4, wherein said step of generating an internal window further comprises the steps of:

defining said map page size; and defining a border buffer for said map page, said border buffer for defining a portion of said map page which, while displayed, contains none of said map points.

9. The computer implemented process of claim 3, wherein said step of creating said map page further comprises the steps of:

calculating the scale of said map page;

drawing said map page, displaying thereon said map point; and labeling said map page.

10. For a programmed computer having memory, data storage and retrieval means, a plurality of listings stored in said data storage and retrieval means, each of said listings being defined in terms of geographic coordinates, a mapping database containing alphanumeric map data which define map features in terms of geographic coordinates stored in said data storage and retrieval means, display means, telephone receiving and transmitting means, and voice processing means, a computer implemented process for dynamically creating a map comprising a plurality of map pages including a series of maps of decreasing scale and a cover page summarizing information represented on said map, said series of maps including at least one each of a general map of small scale, an area map of intermediate scale, and a detail map of large scale, said plurality of maps created responsive to a remote user's request received on said telephone receiving means, and for transmitting said map to said user via said transmitting means, the process comprising the steps of:

responsive to prerecorded voice message prompts from said voice processing means, receiving said user's requests as a first DTMF telephonic signal via said telephone receiving means;

comparing said request with said listings;

selecting ones of said listings which most closely approximate said user's request;

dynamically creating said cover page as a graphical image using said selected ones of said listings;

storing said cover page as an image file in said data storage and retrieval means;

defining a map point for each selected one of said listings, said map point having a particular set of latitude and longitude coordinates, and correlating to one of said listings;

defining a first alternate map point for display on said area map, said first alternate map point comprising the outline of said detail map;

defining a second alternate map point for display on said general map, said second alternate map point comprising the outline of said area map;

for each said detail, area and general map pages;
  a.) generating an internal window corresponding to, and smaller than, said map page, said internal window for calculating the positional boundaries of said map page available for adding a subsequent map point to said map page;
  b.) generating a border buffer for said map page, said border buffer for defining a portion of said map page which, while displayed, contains none of said map points;
  c.) generating the positional boundaries of said map page available for adding to said map page the appropriate one of said map point, said first alternate map point and said second alternate map point;
  d.) deriving the centerpoint of each of said map pages from said map point, and;
  e.) initially defining the centerpoint of each of said map pages as said latitude and said longitude of said map point;
  f.) for each of said subsequent map points,
    1.) determining if said subsequent map point can be added to said map page,
    2.) responsive to the determination, by said step of determining if said map point can be added to said map page, that a subsequent map point can be added to said map page, including said subsequent map point on said map page and recalculating said internal window centered on the midpoint between the latitudinal and longitudinal extremes of all the map points associated with said map page,
    3.) responsive to the determination, by said step of determining if said map point can be added to said map page, that said subsequent map point cannot be added to said map page, determining if said subsequent map point can be added to any previously defined map pages of said plurality of map pages,
    4.) responsive to the determination, by said step of determining if said subsequent map point can be added to any previously defined map pages, that said subsequent map point can be added to at least one of said previously defined map pages, including said subsequent map point on said one of said previously defined map pages and recalculating said internal window of said one of said previously defined map pages centered on the midpoint between the latitudinal and longitudinal extremes of all the map points associated with said map page, and
    5.) responsive to the determination, by said step of determining if said subsequent map point can be added to said map page, that said subsequent map point cannot be added to at least one of said previously defined map pages, creating a subsequent map page, defining the centerpoint of said subsequent map page as said latitude and said longitude of said subsequent map point, and calculating the internal window of said subsequent map page centered on said subsequent map point;
  g.) calculating the scale of each said map pages,
  h.) dynamically creating each of said map pages as graphical images using alphanumeric data from said mapping database, said map pages containing map information specific to said selected ones of said listings,
  i.) labeling each of said map pages with said selected ones of said map points;

storing each of said map pages in said data storage and retrieval means as an image file; and transmitting, as a second telephonic signal via said telephone transmitting means, said cover page and said map pages from said data storage and retrieval means to said user, in a format suitable for facsimile reception.

11. A method for dynamically creating a document containing information on real estate listings in response to a remote user's telephonic request and for transmitting the dynamically created document to the user via facsimile transmission, the method comprising the steps of:

a) electronically maintaining a listings database containing real estate listings, each of said listings being defined in terms of geographic coordinates;

b) electronically maintaining a mapping database containing alphanumeric map data which define map features in terms of geographic coordinates;

c) receiving via telephone a remote user's request as a first DTMF telephonic signal;

d) comparing said request with said listings stored in said listings database;

e) selecting ones of said listings which most closely approximate said user's request;

f) dynamically creating a document in a page description format which includes at least one map page using alphanumeric map data from the mapping database, said at least one map page providing map locator information specifically tailored to said selected ones of said listings;

g) converting the format of the dynamically created document from said page description format into a format suitable for facsimile transmission;

h) electronically storing said map page; and i) transmitting, as a second telephonic signal, said converted document including said at least one map page via facsimile to the user.

* * * * *